Figure 1:
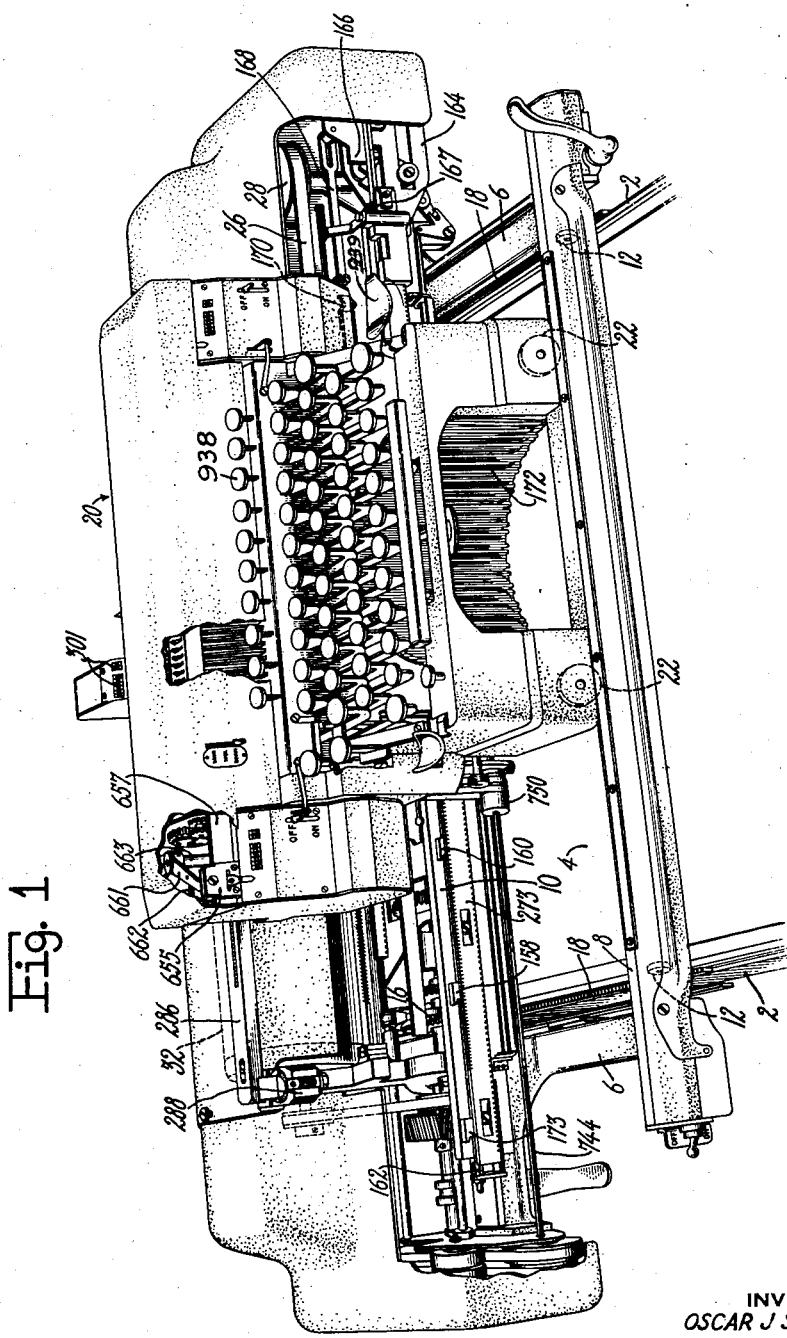

Feb. 27, 1945.　　O. J. SUNDSTRAND　　2,370,505
TYPEWRITING AND ACCOUNTING MACHINE
Filed June 29, 1939　　19 Sheets-Sheet 1

INVENTOR
OSCAR J SUNDSTRAND
BY
ATTORNEY

Feb. 27, 1945. O. J. SUNDSTRAND 2,370,505
TYPEWRITING AND ACCOUNTING MACHINE
Filed June 29, 1939 19 Sheets-Sheet 2
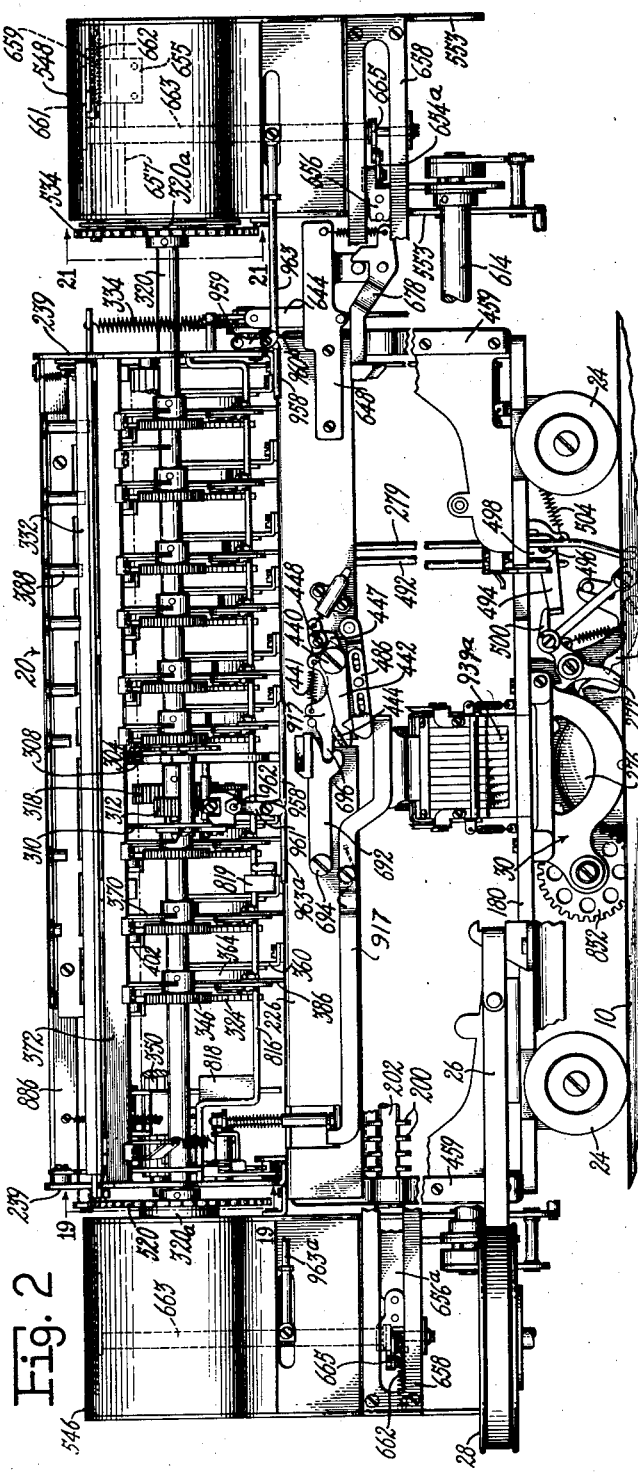
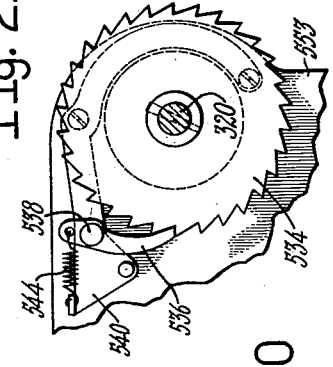
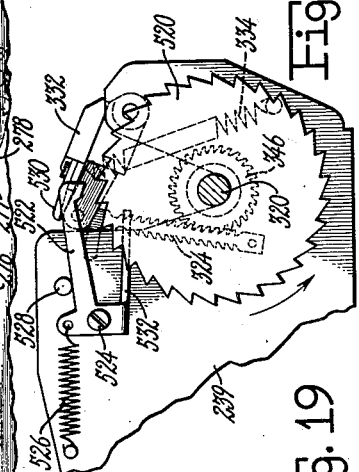
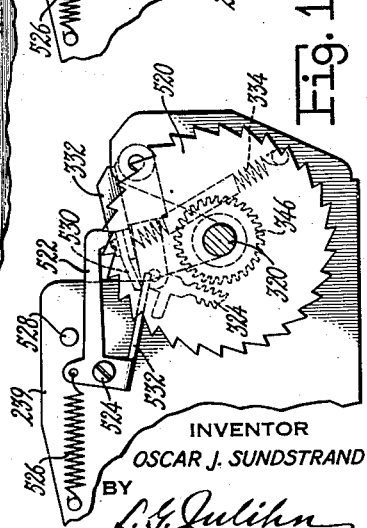
INVENTOR
OSCAR J. SUNDSTRAND
BY
ATTORNEY Feb. 27, 1945.   O. J. SUNDSTRAND   2,370,505
TYPEWRITING AND ACCOUNTING MACHINE
Filed June 29, 1939   19 Sheets-Sheet 3
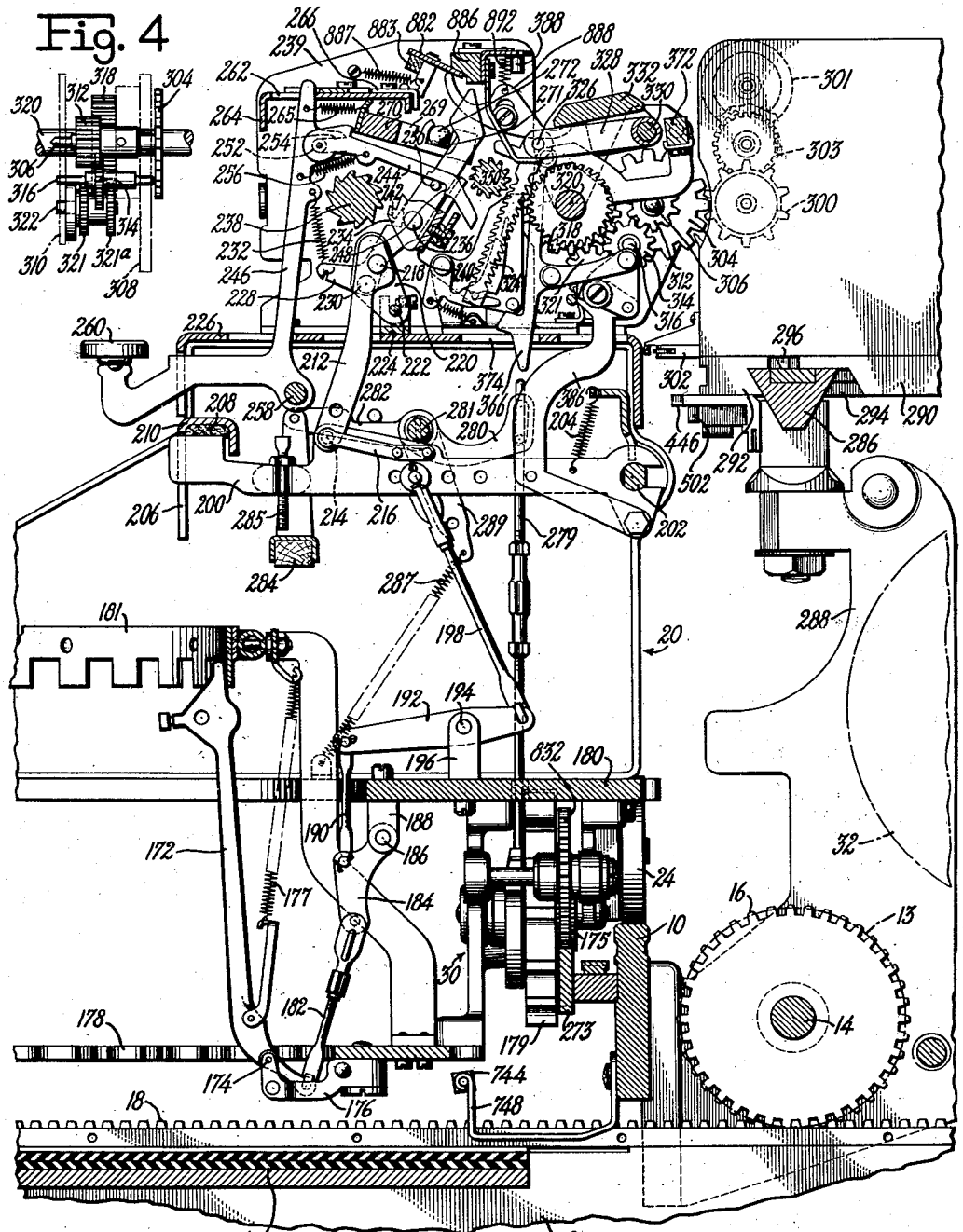
INVENTOR
OSCAR J. SUNDSTRAND
BY
*L. G. Julihn*
ATTORNEY Feb. 27, 1945.   O. J. SUNDSTRAND   2,370,505
TYPEWRITING AND ACCOUNTING MACHINE
Filed June 29, 1939   19 Sheets-Sheet 4
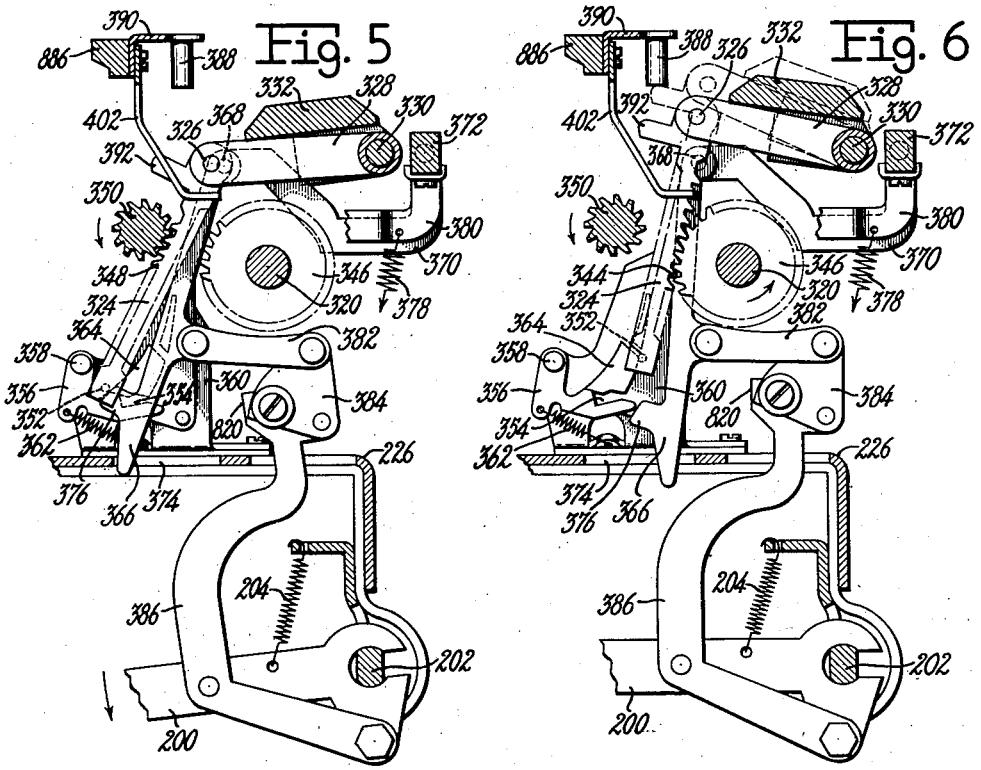
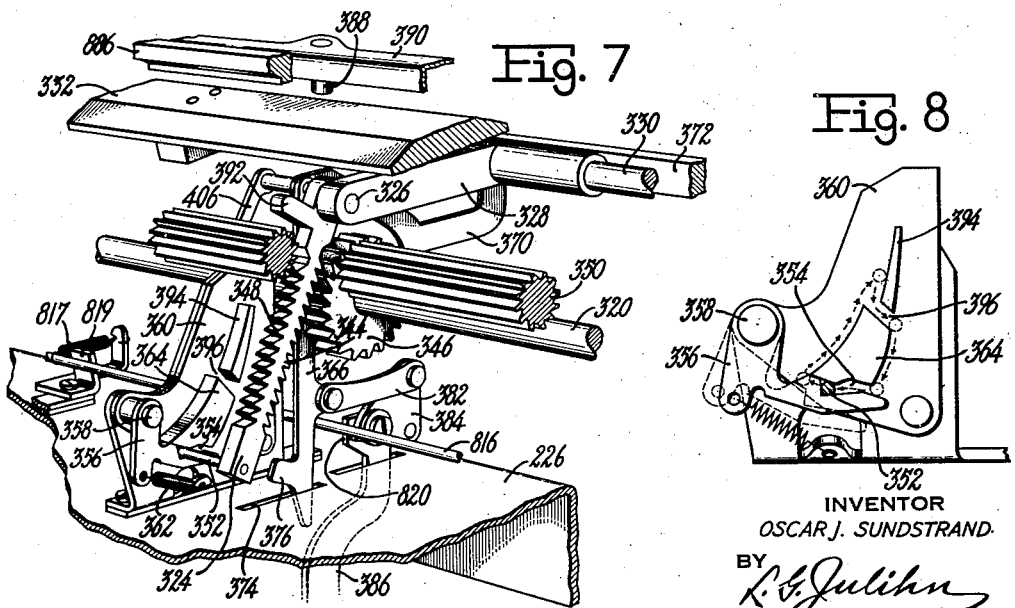
INVENTOR
OSCAR J. SUNDSTRAND
BY
*L. G. Julihn*
ATTORNEY

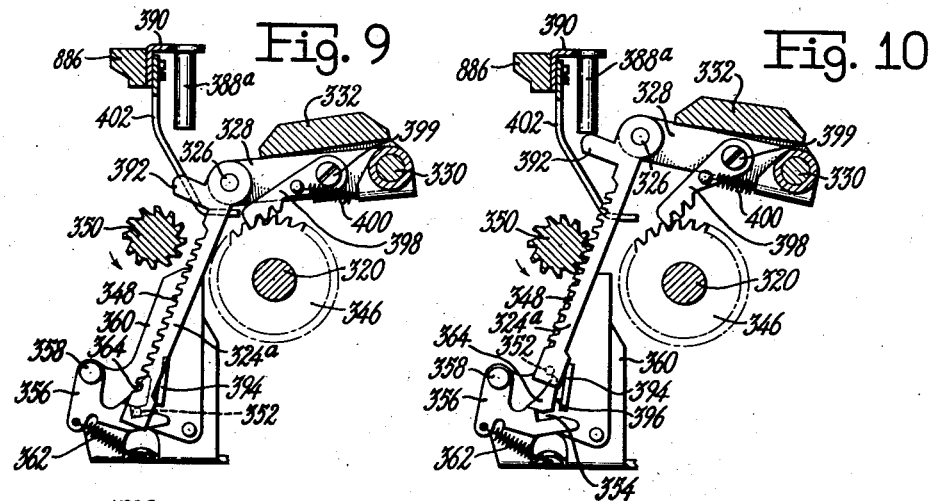
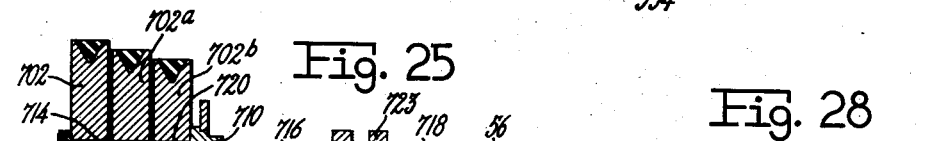
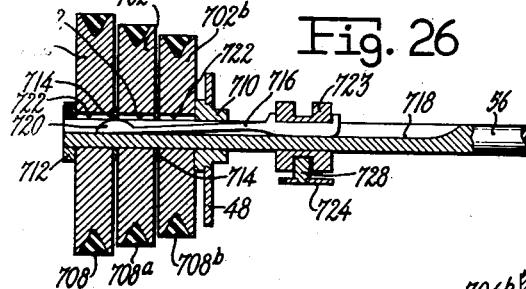
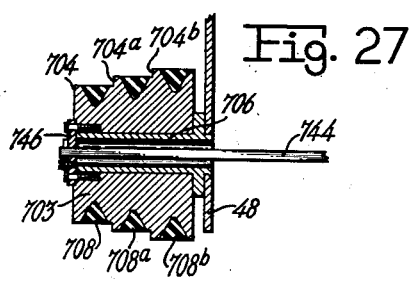

Feb. 27, 1945.    O. J. SUNDSTRAND    2,370,505
TYPEWRITING AND ACCOUNTING MACHINE
Filed June 29, 1939    19 Sheets-Sheet 6
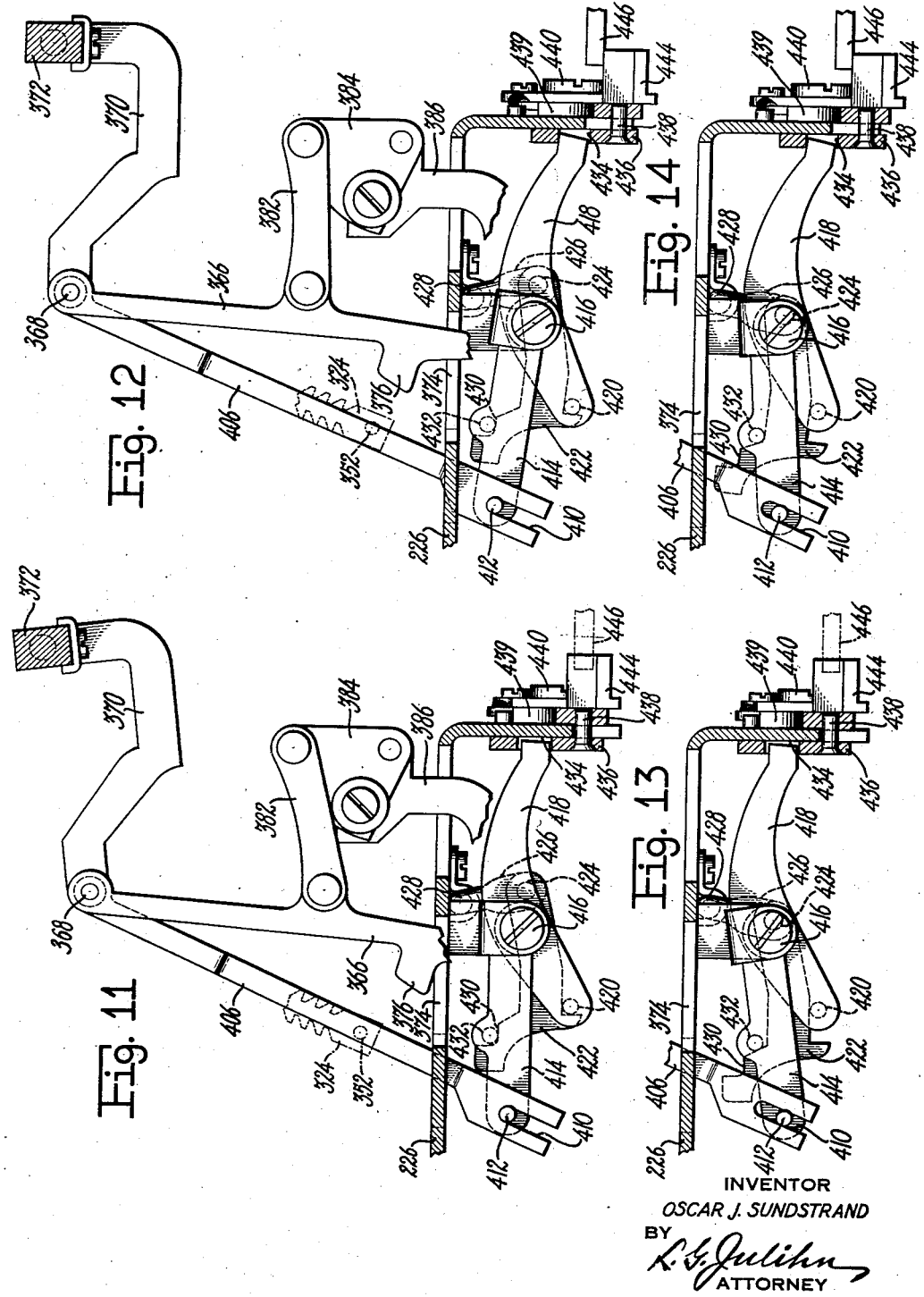
INVENTOR
OSCAR J. SUNDSTRAND
BY
*L. G. Julihn*
ATTORNEY Feb. 27, 1945. O. J. SUNDSTRAND 2,370,505
TYPEWRITING AND ACCOUNTING MACHINE
Filed June 29, 1939 19 Sheets-Sheet 8
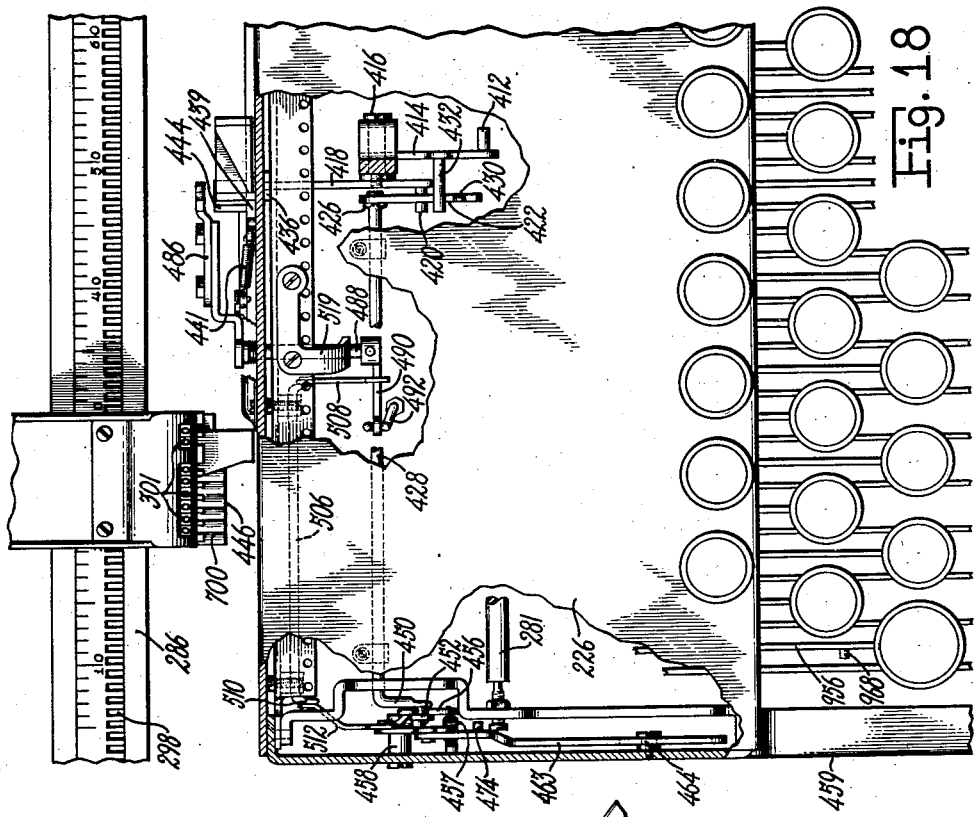
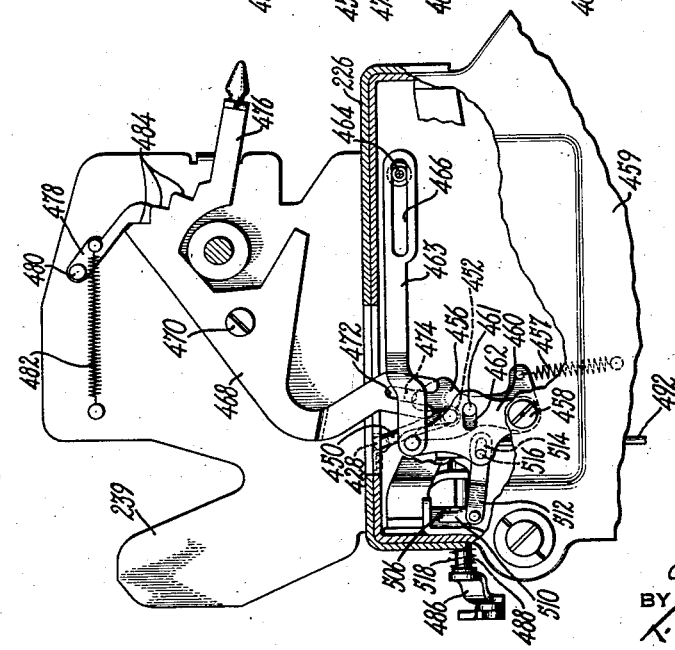
INVENTOR
OSCAR J. SUNDSTRAND
BY
ATTORNEY Feb. 27, 1945. O. J. SUNDSTRAND 2,370,505
TYPEWRITING AND ACCOUNTING MACHINE
Filed June 29, 1939 19 Sheets-Sheet 9
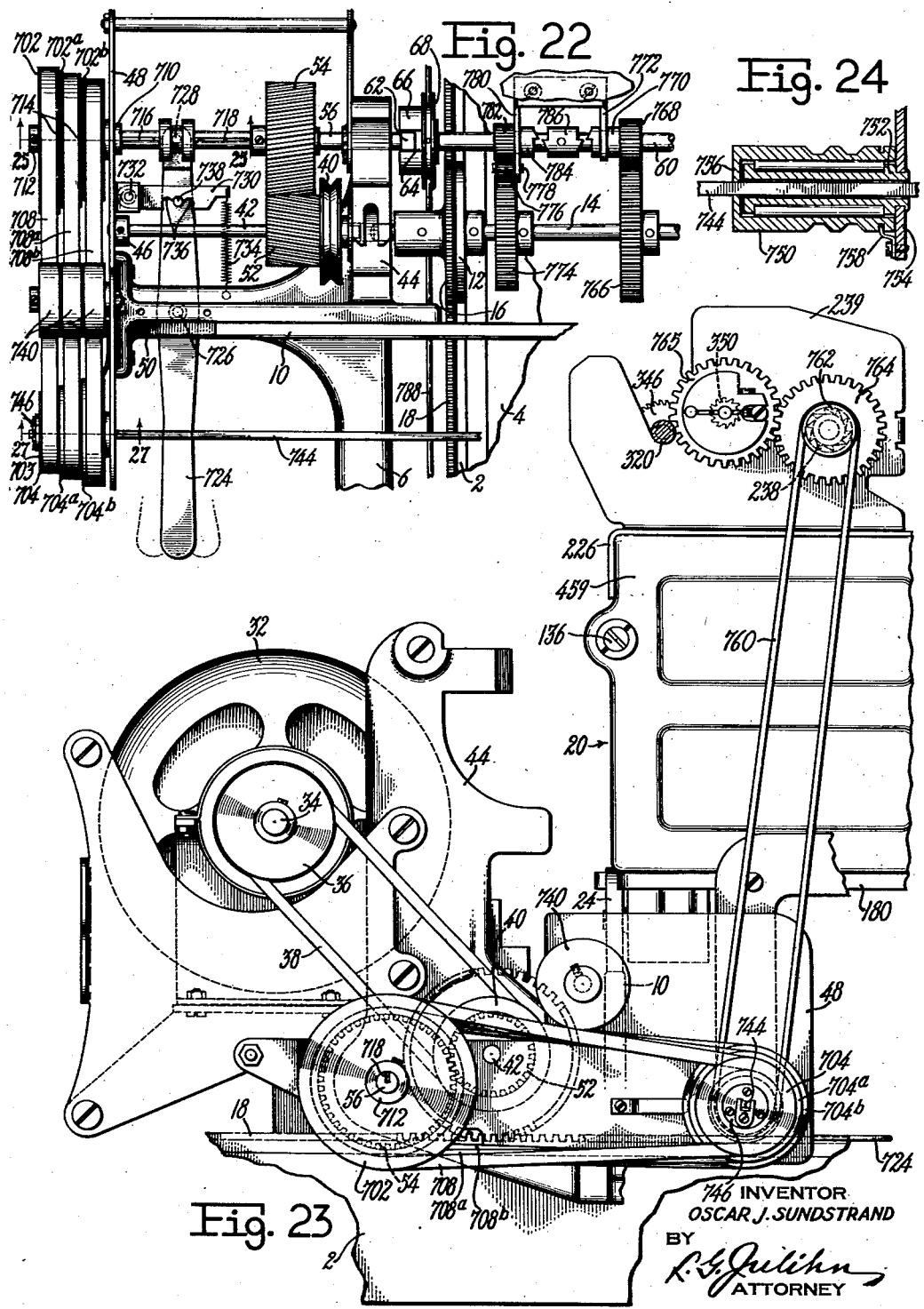

Feb. 27, 1945. O. J. SUNDSTRAND 2,370,505
TYPEWRITING AND ACCOUNTING MACHINE
Filed June 29, 1939. 19 Sheets—Sheet 10
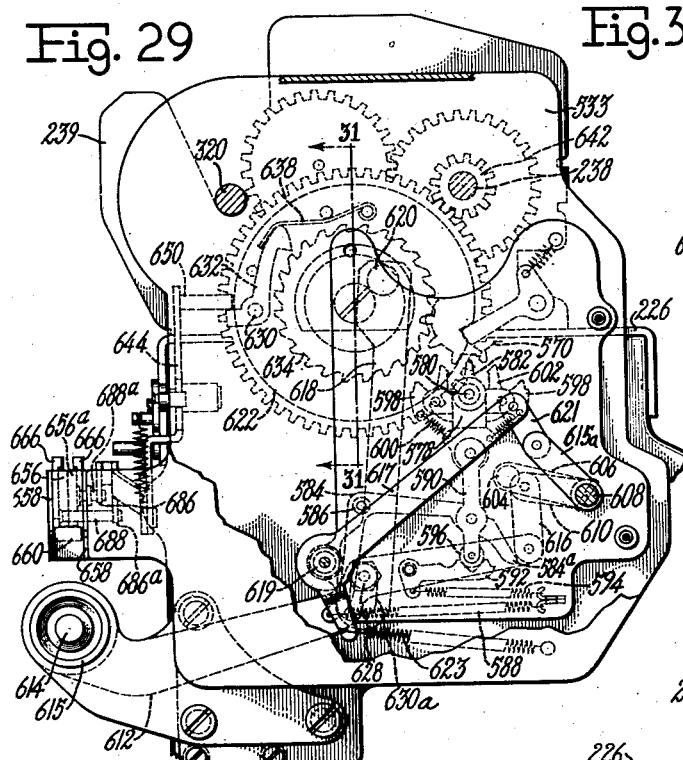
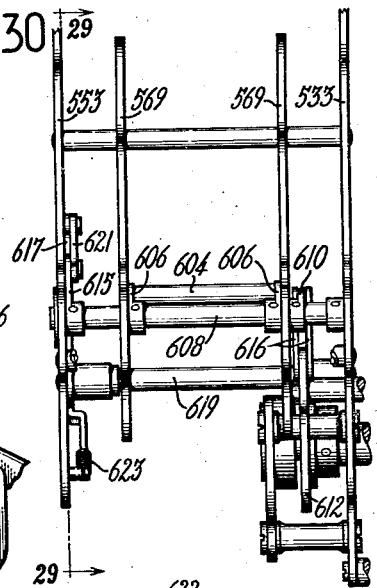
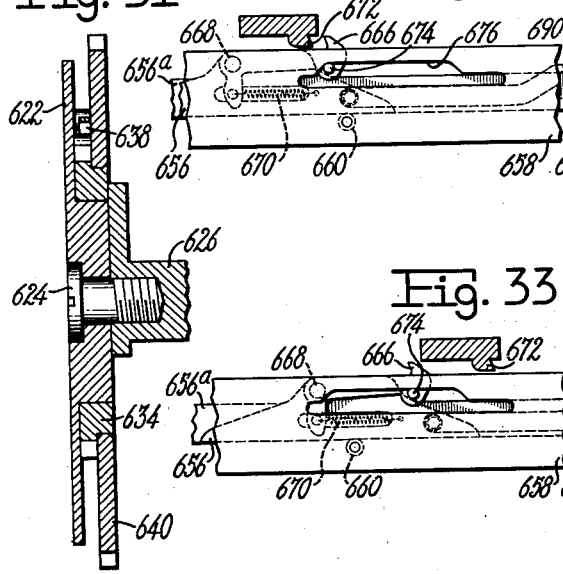
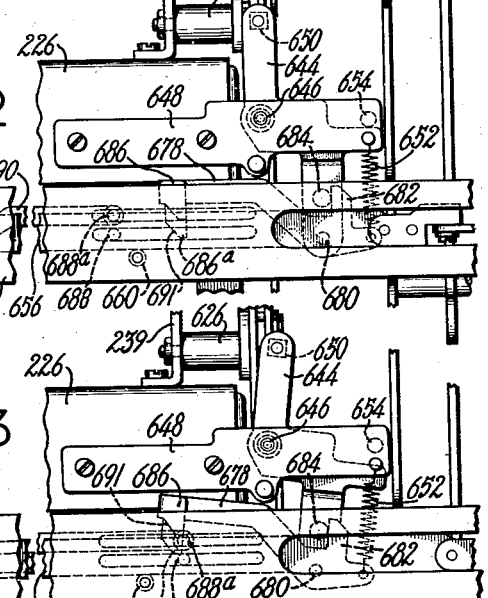
INVENTOR
OSCAR J. SUNDSTRAND
BY
*R. G. Julihn*
ATTORNEY

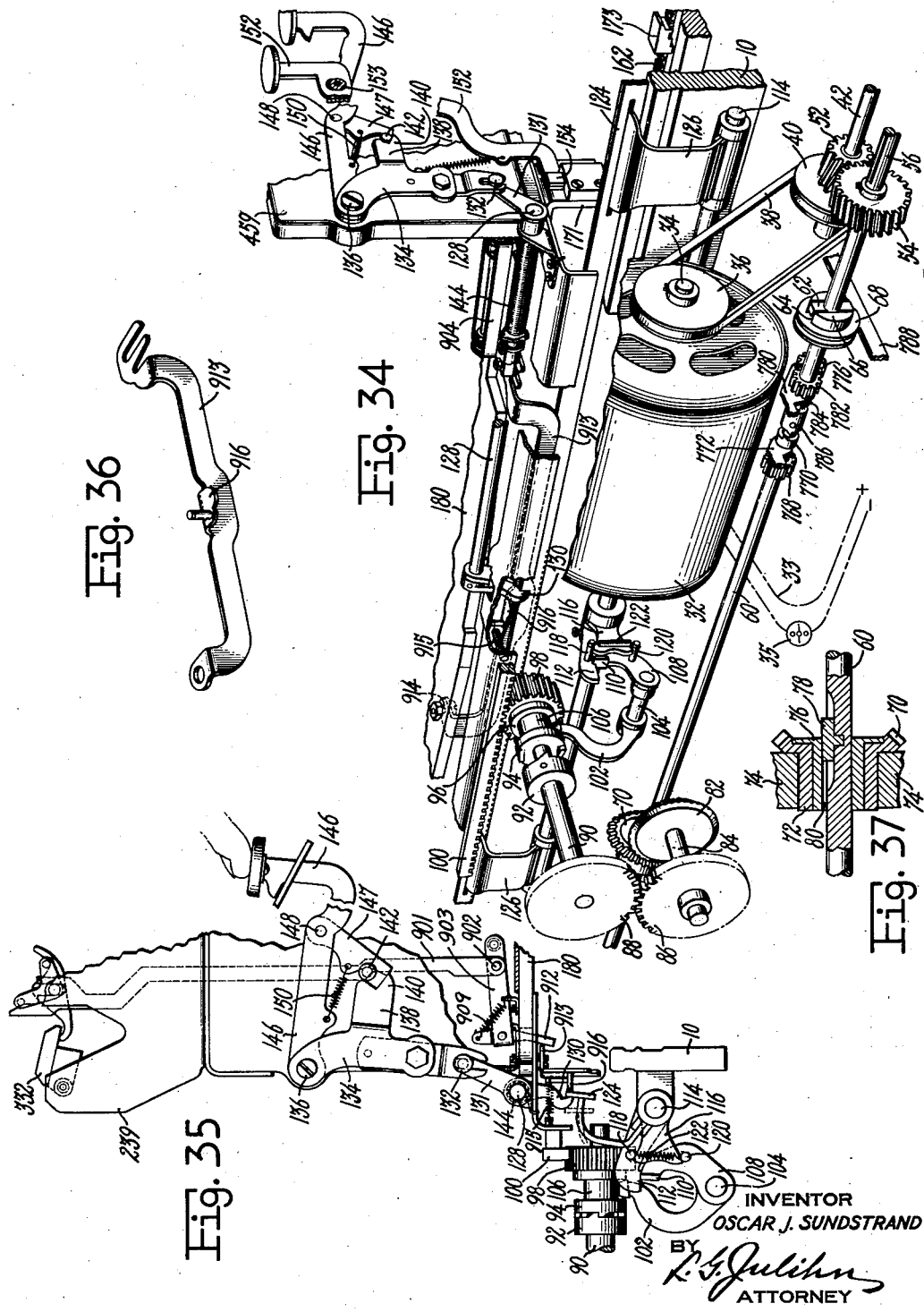

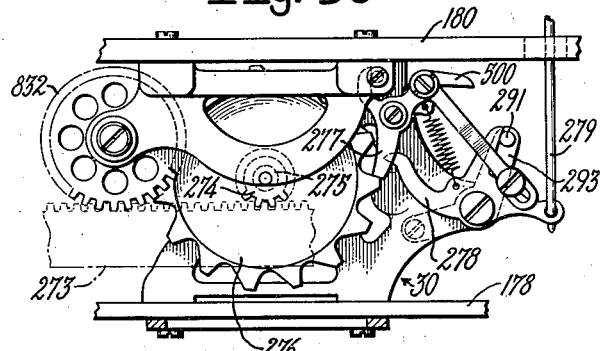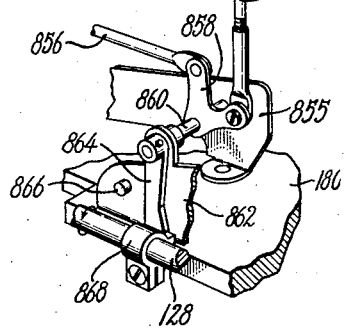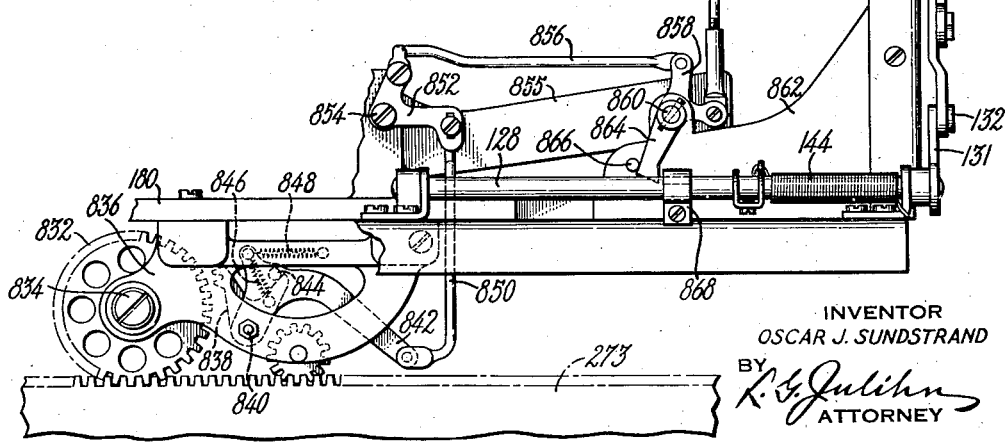

Feb. 27, 1945. O. J. SUNDSTRAND 2,370,505
TYPEWRITING AND ACCOUNTING MACHINE
Filed June 29, 1939 19 Sheets-Sheet 13
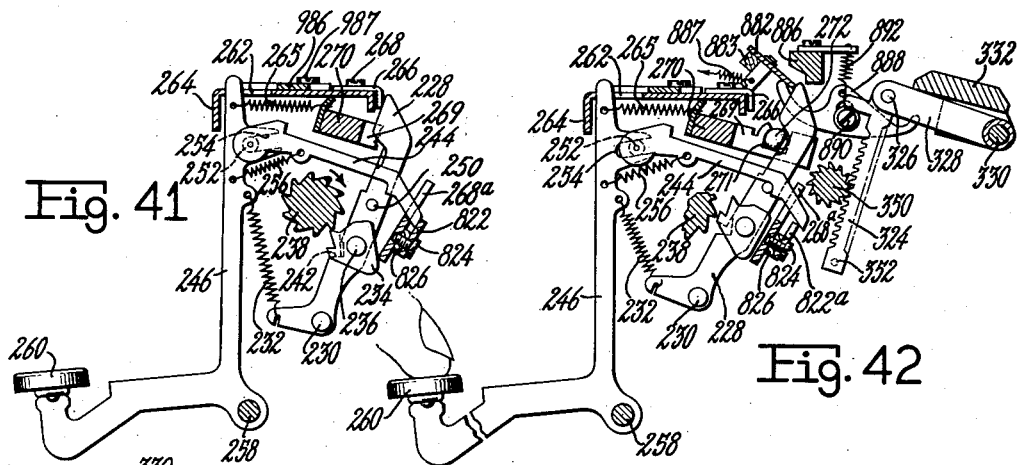
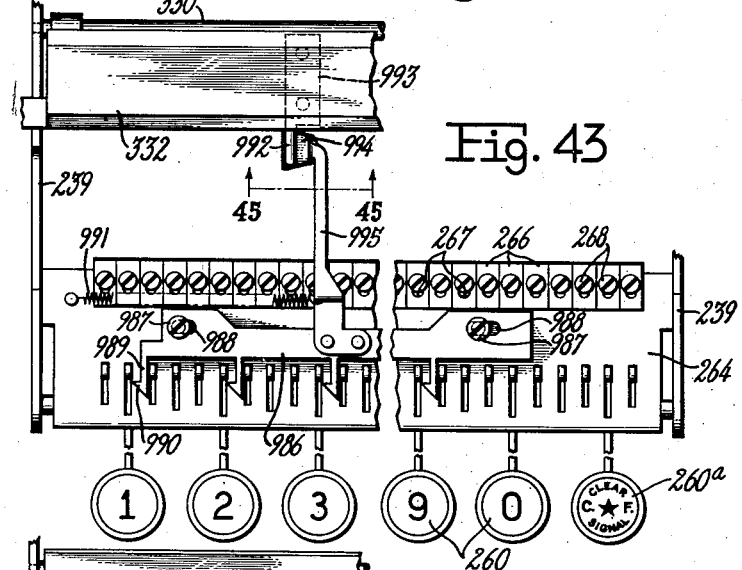
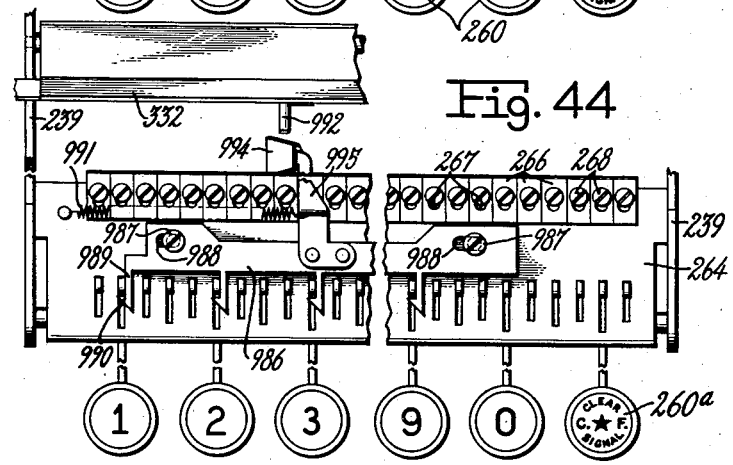
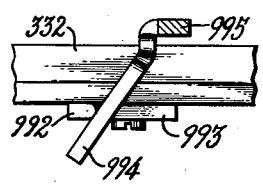
INVENTOR
OSCAR J. SUNDSTRAND
BY
L. G. Julihn
ATTORNEY Feb. 27, 1945.  O. J. SUNDSTRAND  2,370,505
TYPEWRITING AND ACCOUNTING MACHINE
Filed June 29, 1939  19 Sheets-Sheet 14
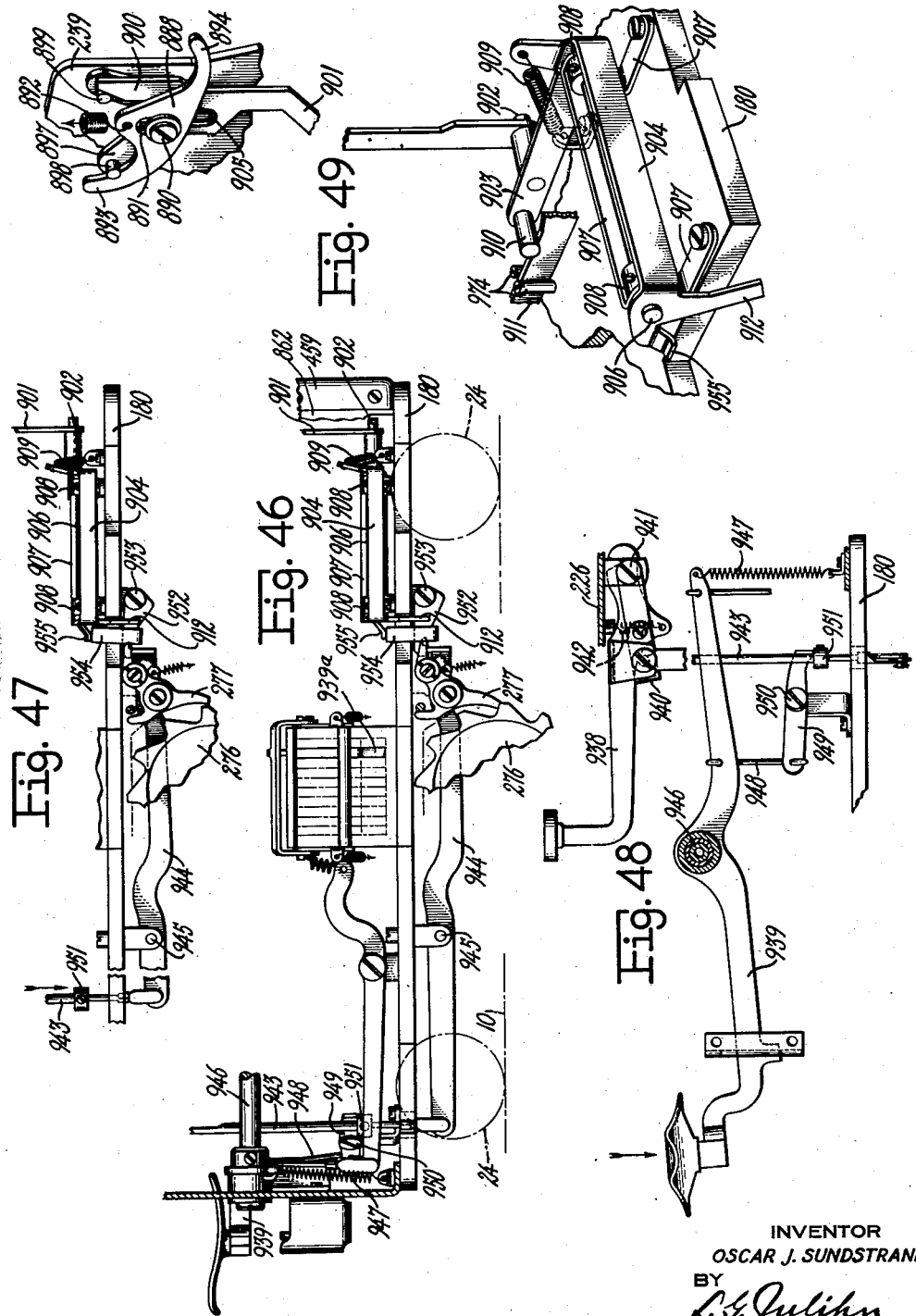
INVENTOR
OSCAR J. SUNDSTRAND
BY
ATTORNEY Feb. 27, 1945. O. J. SUNDSTRAND 2,370,505
TYPEWRITING AND ACCOUNTING MACHINE
Filed June 29, 1939 19 Sheets-Sheet 15
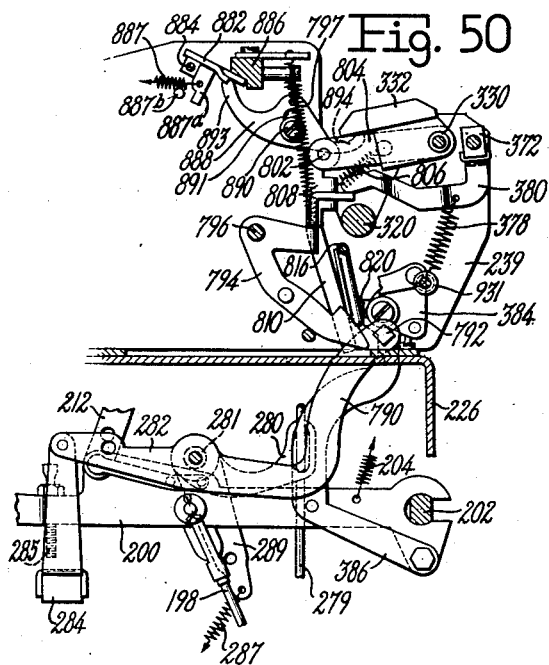
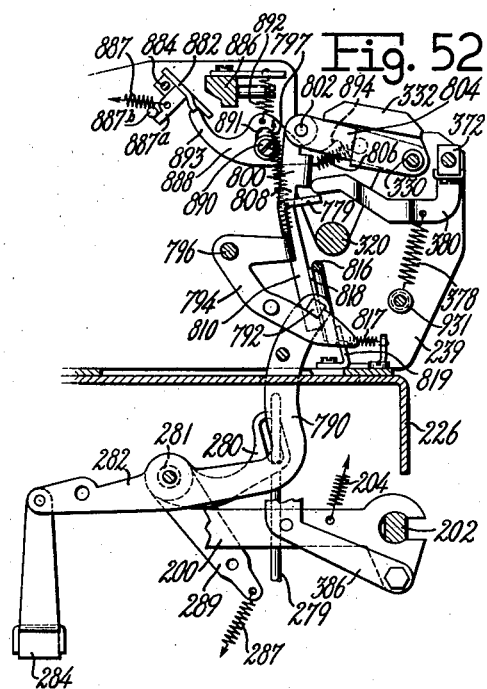
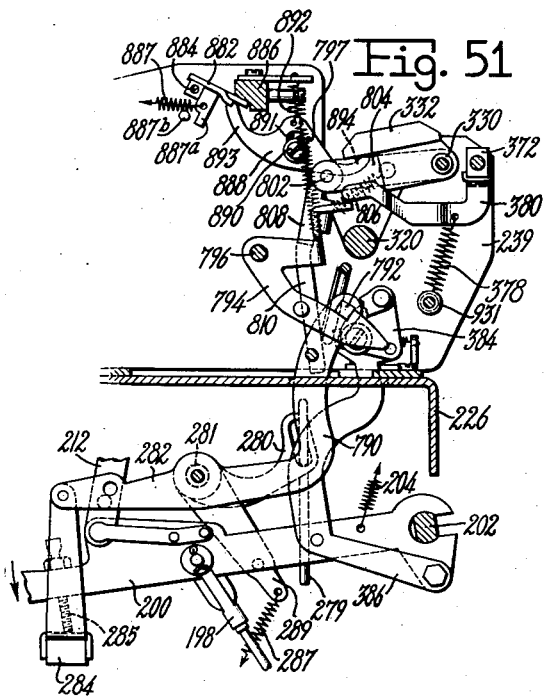
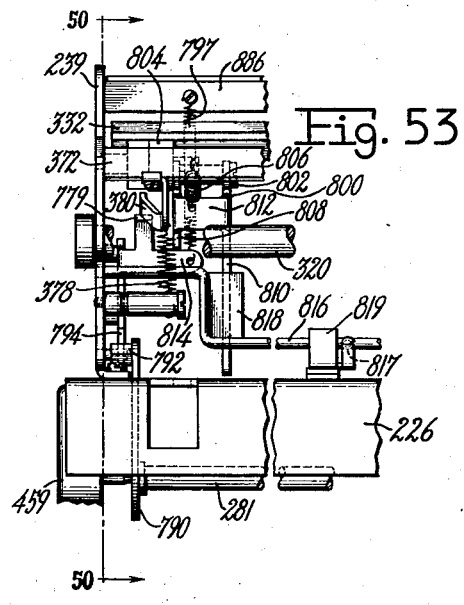
INVENTOR
OSCAR J. SUNDSTRAND
BY
L. G. Julihn
ATTORNEY Feb. 27, 1945. O. J. SUNDSTRAND 2,370,505
TYPEWRITING AND ACCOUNTING MACHINE
Filed June 29, 1939 19 Sheets-Sheet 16
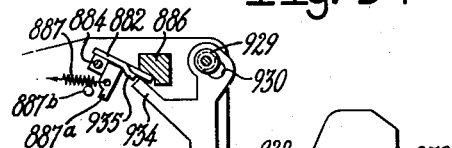
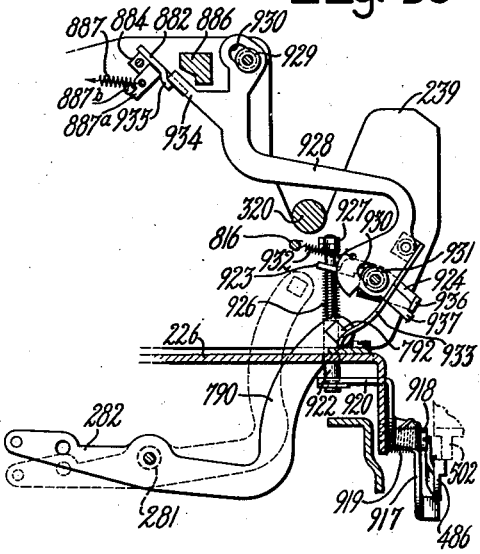
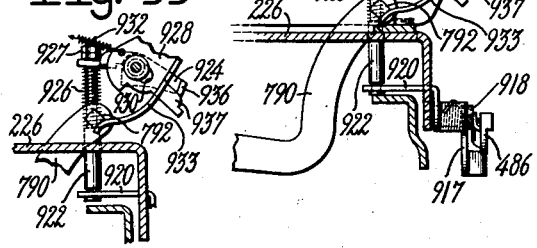
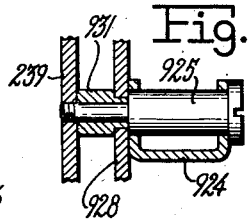
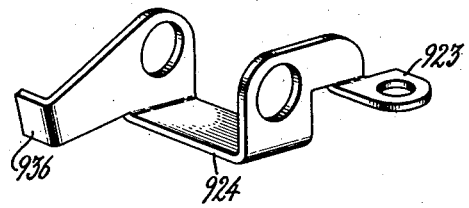
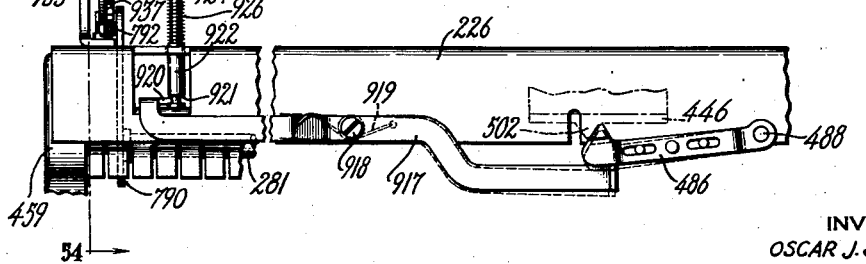
INVENTOR
OSCAR J. SUNDSTRAND
BY
ATTORNEY

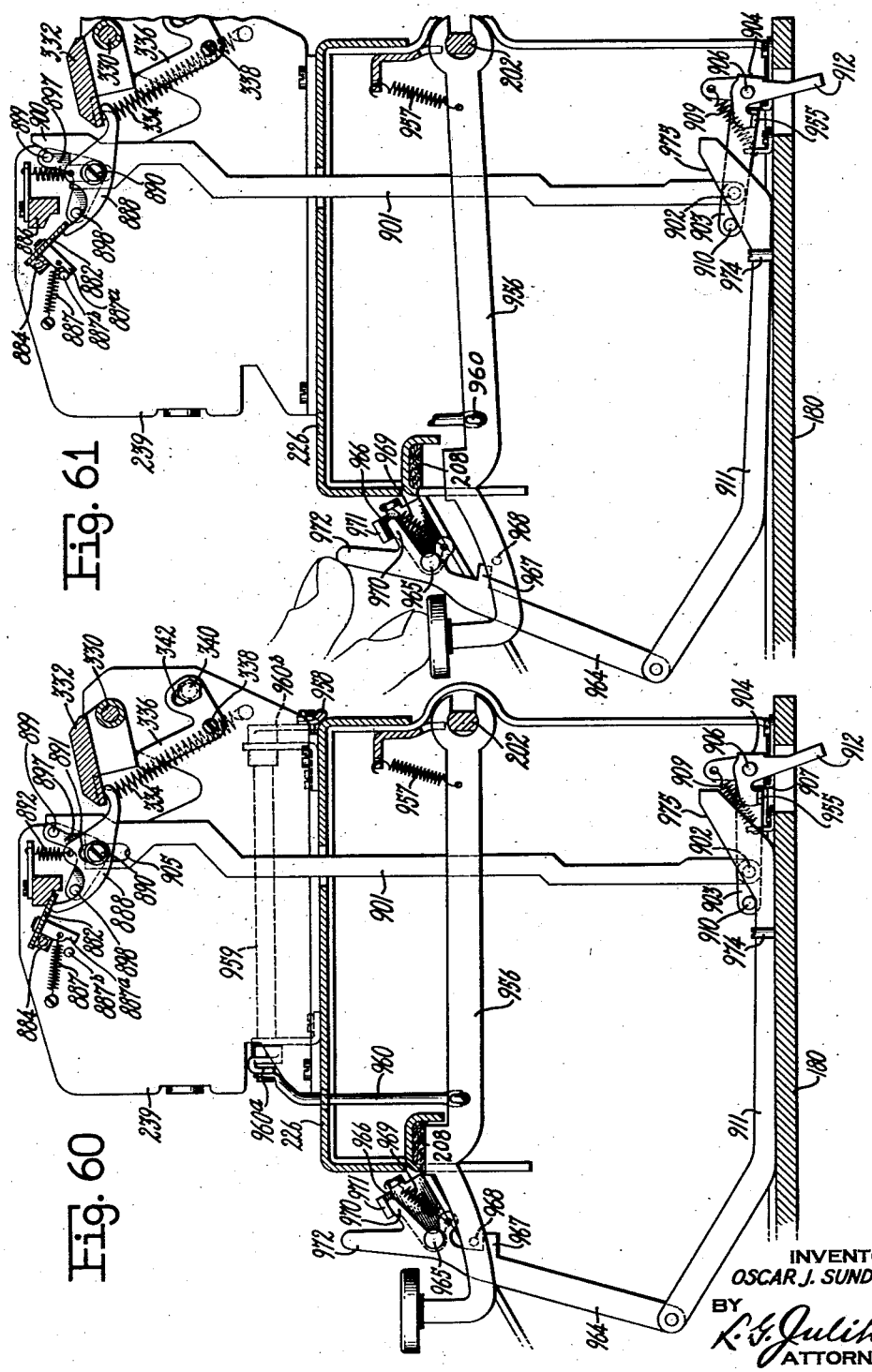

Feb. 27, 1945. O. J. SUNDSTRAND 2,370,505
TYPEWRITING AND ACCOUNTING MACHINE
Filed June 29, 1939 19 Sheets-Sheet 18
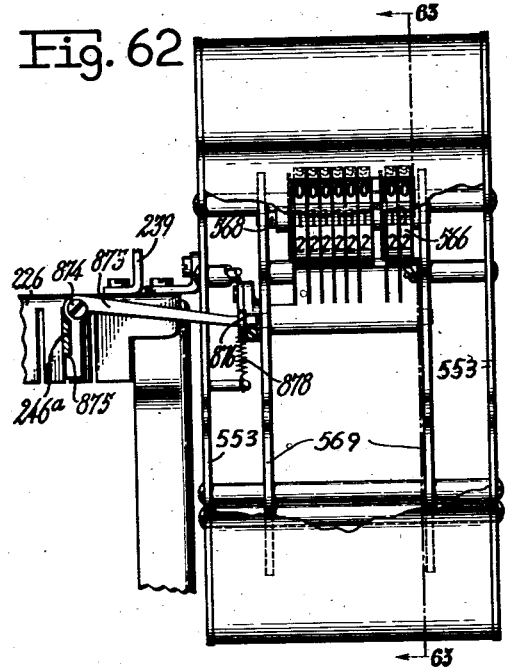
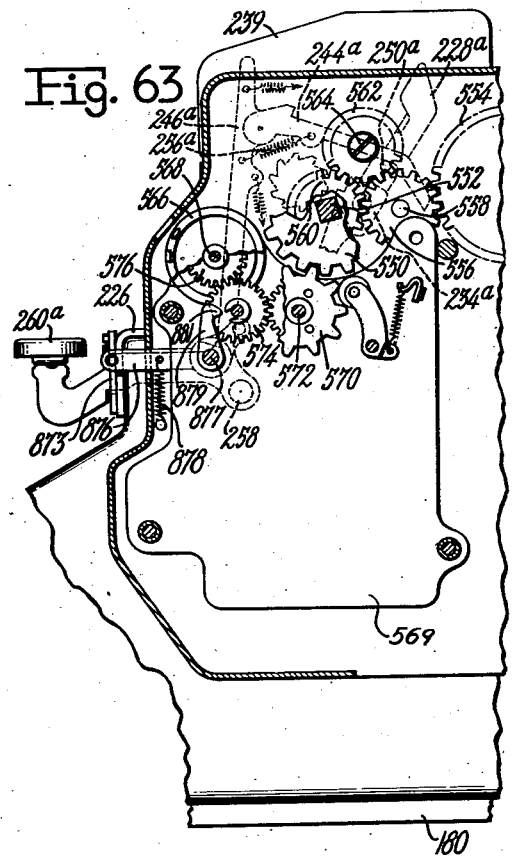
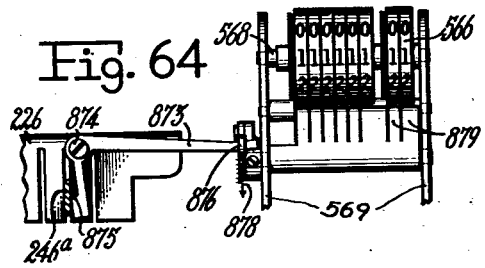
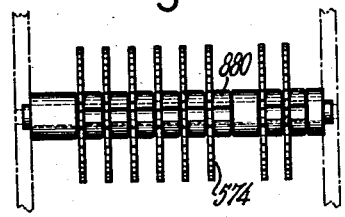
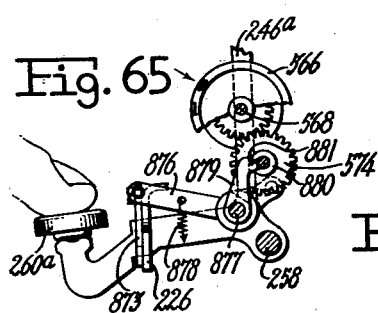
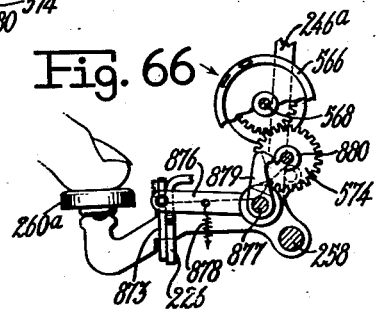
INVENTOR
OSCAR J. SUNDSTRAND
BY
ATTORNEY Feb. 27, 1945. O. J. SUNDSTRAND 2,370,505
TYPEWRITING AND ACCOUNTING MACHINE
Filed June 29, 1939 19 Sheets-Sheet 19
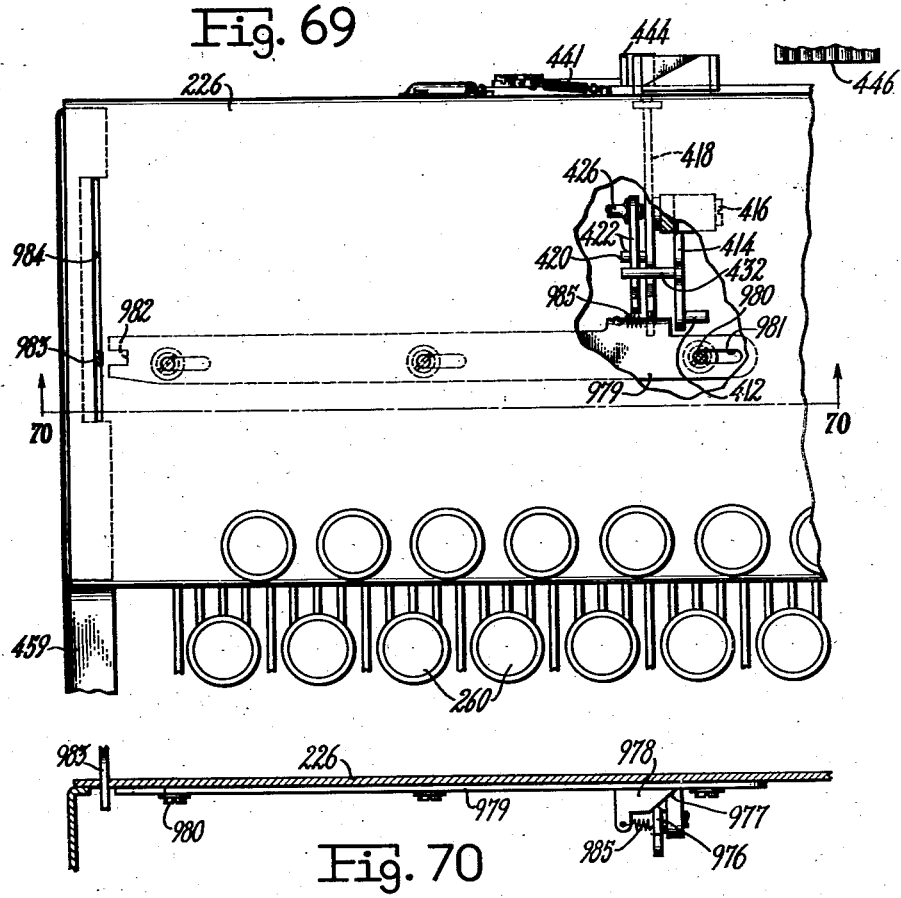
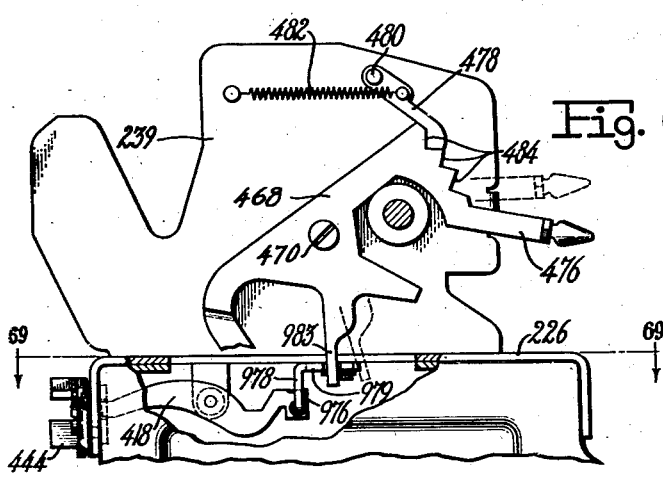
INVENTOR
OSCAR J. SUNDSTRAND
ATTORNEY Patented Feb. 27, 1945

2,370,505

UNITED STATES PATENT OFFICE 2,370,505

TYPEWRITING AND ACCOUNTING MACHINE

Oscar J. Sundstrand, Hartford, Conn., assignor to Underwood Elliott Fisher Company, New York, N. Y., a corporation of Delaware Application June 29, 1939, Serial No. 281,772

44 Claims. (Cl. 235—59)

This invention relates to typewriting machines, to accounting machines and to combined typewriting and accounting machines, and more particularly to machines of the combined typewriting and accounting machine type in which numbers are set up, denomination by denomination, in the registers or totalizers and are printed, digit by digit, under control of the numeral keys of the typewriting mechanism.

In general, the objects of the invention are to improve the construction and mode of operation of machines of the above type and to produce a machine in which both the typewriting mechanism and the totalizer mechanism are operated in a certain and reliable manner by power controlled by keys which may be actuated by a light and easy touch to set the type bar operating mechanism and the totalizer operating mechanism in operation and in which errors in the entering of the numbers in the totalizers and the typing of the numbers or letters are reduced to a minimum.

One of the particular objects of the invention is to produce a machine of the above type having novel and improved mechanism for operating the totalizers differentially by power under control of the numeral keys to enter the numbers in the totalizers.

With this object in view, the invention comprises a differential operating mechanism for the totalizers embodying various novel and improved features, constructions and combinations of parts hereinafter described and particularly pointed out in the claims.

In the present form of the invention, the totalizer operating mechanism comprises a series of actuators which are selectively connected with the power drive by mechanism controlled by the numeral keys to move the actuators in one direction. When the actuators have been moved in said direction to the positions required for their subsequent action, they are returned in the opposite directions preferably by spring actuated mechanisms. During their return movement these actuators are connected with the totalizers for differential intervals determined by suitable mechanism to cause the actuators to operate the totalizers to enter the desired digits therein. In the machine illustrated, the same mechanism comprises a series of fixed differential cams. The actuators are preferably actuated to connect the same with the power drive by power-actuated mechanisms. In the present machine, upon the depression of the keys, the type bar mechanisms are selectively connected with the power means to drive the types into typing contact with the work sheet and the differential actuators for the totalizers are arranged to be moved respectively by the type bar mechanisms during the latter part of the operating strokes of the several type bars to carry the actuators into connection with the power mechanism.

Another object of the invention is to provide various mechanisms for preventing misoperation of the parts under various conditions.

With this object in view, the machine is provided with locking devices for locking the mechanisms which normally are operated and controlled by the letter and numeral keys to connect the type bar mechanism and the differential mechanism with the power drive out of operation under various conditions. The machine is also provided with a number of other safety devices for preventing misoperations. All of these locking and safety devices are particularly adapted for the control of the various mechanisms in a power driven machine.

While the invention has been illustrated as embodied in a combined typewriting and accounting machine of the Elliott Fisher type, certain features of the invention are not limited to combined machines and certain features are not limited to machines of said type. It is, therefore, to be understood that, except as defined in the claims, the invention is not limited to any particular machine or type of machine.

The various features of the invention will be clearly understood from the accompanying drawings illustrating the invention in its preferred form and the following detailed description of the constructions therein shown.

Figure 15:
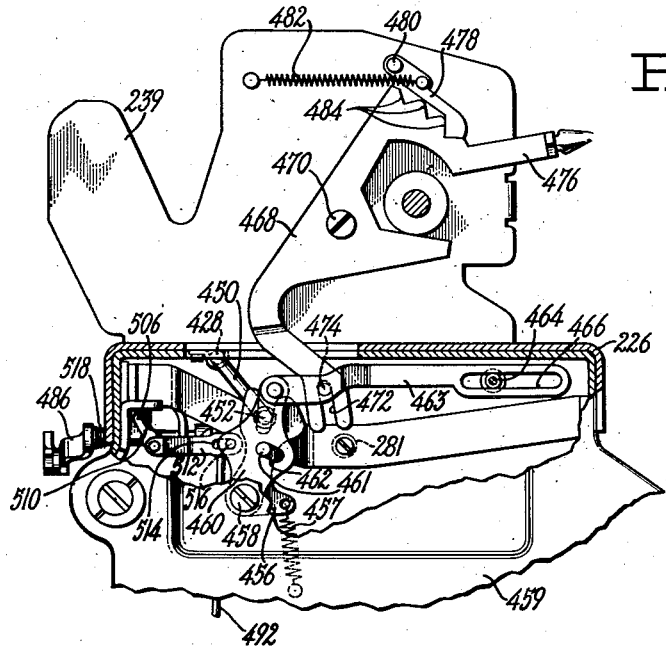
Figure 16:
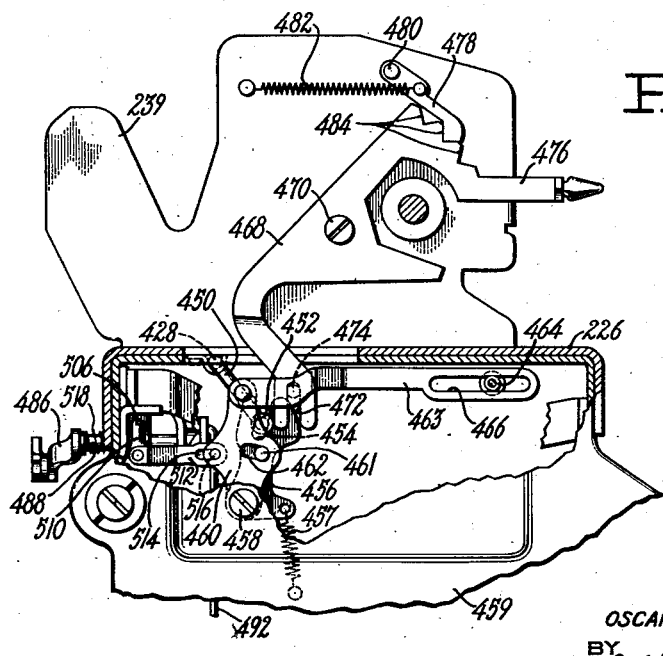

In the drawings:

Figure 1 is a perspective view illustrating a machine embodying the invention,

Figure 2 is a view in rear elevation illustrating the head or type carriage of the machine, Figure 3 is a view in vertical section of the machine and illustrating particularly the type bar operating mechanism and the mechanism for operating the registers or totalizers to enter the numerals from 3 to 9, inclusive, Figure 4 is a detail view in rear elevation illustrating a reverse gearing forming part of the mechanism for driving a column totalizer, Figure 5 is a detail view in vertical section illustrating the mechanism for operating the totalizers, Figure 6 is a view similar to Figure 5 illustrating certain of the parts in different positions, Figure 7 is a detail perspective view illustrating the mechanism for operating the totalizers with certain of the parts in still different positions, Figure 8 is a detail view partly in side elevation and partly in section, illustrating certain parts of the mechanism shown in Figures 5, 6 and 7, Figure 9 is a detail view in vertical section illustrating the mechanism for actuating the totalizers to enter the numerals 1 and 2, Figure 10 is a view similar to Figure 9 illustrating certain of the parts in different positions, Figure 11 is a detail view in vertical section illustrating the control mechanism for enabling and disabling the mechanism for actuating the totalizers, Figure 12 is a view similar to Figure 11 illustrating certain of the parts in different positions, Figure 13 is a view similar to Figures 11 and 12 illustrating the lower portion of the mechanism shown in said figures with certain of the parts in still different positions, Figure 14 is a view similar to Figure 13 illustrating certain of the parts in still different positions, Figure 15 is a detail view in vertical section illustrating further parts of the control mechanism for enabling and disabling the mechanism for actuating the totalizers, Figure 16 is a view similar to Figure 15 illustrating certain of the parts in different positions, Figure 17 is a view similar to Figures 15 and 16 illustrating certain of the parts in still different positions, Figure 18 is a plan view partly broken away and partly in section illustrating particularly certain parts of the mechanisms shown in Figures 11 to 17, inclusive, Figure 19 is a detail sectional view taken substantially on the line 19—19 of Figure 2 and illustrating particularly the mechanism for preventing overthrow of the totalizer actuator shaft, Figure 20 is a view similar to Figure 19 illustrating certain of the parts in different positions, Figure 21 is a detail sectional view taken substantially on the line 21—21 of Figure 2 and illustrating mechanism for holding the totalizer actuator shaft from retrograde movement, Figure 22 is a detail plan view illustrating certain driving connections of the machine and particularly the mechanism for driving the toothed or fluted shaft for operating the type bars at varying speeds, Figure 23 is a view in side elevation illustrating the driving motor and the driving connections between the motor and the toothed shafts for operating respectively the type bar mechanism and the totalizer mechanism, Figure 24 is a detail view in vertical section illustrating a pulley forming an element of the driving connections between the motor and the toothed shafts, and certain associated parts, Figure 25 is a detail sectional view taken substantially on the line 25—25 of Figure 22, Figure 26 is a view similar to Figure 25 illustrating certain of the parts in different positions, Figure 27 is a detail sectional view taken substantially on the line 27—27 of Figure 22, Figure 28 is a view in side elevation showing one of the pulleys of the variable speed drive for the toothed shafts, Figure 29 is a detail view in side elevation illustrating particularly the mechanism for resetting the carry devices of the cross computing register or cross totalizer, Figure 30 is a view in front elevation illustrating certain parts of the mechanism shown in Figure 29, Figure 31 is a detail sectional view taken substantially on the line 31—31 of Figure 29, Figure 32 is a detail view in rear elevation, partly broken away and illustrating certain parts of the mechanism shown in Figure 29, Figure 33 is a view similar to Figure 32 illustrating certain of the parts in different positions, Figure 34 is a detail perspective view illustrating particularly the carriage return mechanism and certain parts of the means for locking the type bar operating mechanism out of operation during the return of the carriage, Figure 35 is a detail view in side elevation taken from the left hand side of the machine and illustrating a portion of the mechanism shown in Figure 34 and certain additional parts of the locking mechanism, with certain parts in different positions, Figure 36 is a detail perspective view illustrating one of the elements shown in Figures 34 and 35, Figure 37 is a detail sectional view illustrating certain parts of the driving connections shown in Figure 34, Figure 38 is a detail view in rear elevation illustrating the carriage feeding or escapement mechanism with certain of the operating parts omitted, Figure 39 is a detail view in rear elevation and illustrating particularly the mechanism for locking the carriage against back spacing or return movement and for locking the carriage return mechanism against operation when the carriage is in register operating position with the parts in normal or unlocking positions, Figure 40 is a detail perspective view illustrating a portion of the mechanism shown in Figure 39 with the parts in locking positions, Figure 41 is a detail view in vertical section illustrating particularly mechanism for delaying the return of the numeral keys to starting position, after having been depressed, Figure 42 is a detail view in vertical section illustrating particularly mechanism for locking the type bar actuating mechanisms out of operation during a cycle of the register actuating mechanism, Figure 43 is a detail plan view illustrating particularly mechanism for locking the numeral keys during a cycle of the register actuating mechanism, with the parts in normal or unlocking positions, Figure 44 is a view similar to Figure 43 illustrating the parts of the locking mechanism in locking positions, Figure 45 is a detail sectional view taken substantially on the line 45—45 of Figure 43, Figure 46 is a detail view in rear elevation illustrating a mechanism for locking the type bar actuating mechanisms out of operation during the tabulating movement of the carriage under control of the column tabulating key, with the parts in normal positions, Figure 47 is a view similar to Figure 46 illustrating a portion of the mechanism shown in Figure 46 with the parts in the positions assumed thereby when the column tabulating key is depressed, Figure 48 is a detail view in side elevation, looking from the left, of a portion of the mechanism shown in Figures 46 and 47 with the parts in positions corresponding to those in which they are shown in Figure 47, and showing, in addition, certain parts of the decimal tabulating mechanism, Figure 49 is a detail perspective view illustrating a portion of the mechanism shown in Figure 46 and certain additional parts of the locking mechanism, with the parts in the position shown in Figure 46, Figure 50 is a detail view in vertical section illustrating particularly the locking mechanisms for locking the type bar actuating mechanisms out of operation and for locking the escapement to prevent the carriage from advancing the second step in its escapement movement during a cycle of the register actuating mechanism, with the parts in normal positions, Figure 51 is a view similar to Figure 50 illustrating certain parts of the escapement locking mechanism in locking positions, Figure 52 is a view similar to Figures 50 and 51 illustrating the parts in locking positions, Figure 53 is a detail view in rear elevation illustrating the mechanism shown in Figures 50 to 52, inclusive, with the parts in normal positions, Figure 54 is a view in vertical section taken substantially on the line 54—54 of Figure 57 and illustrating mechanism for locking the type bar actuating mechanisms out of operation when the carriage is executing a decimal space movement, with the parts in normal positions, Figure 55 is a view similar to Figure 54 illustrating a portion of the mechanism shown in Figure 54 with certain of the parts in different positions, Figure 56 is a view similar to Figure 54 illustrating the parts in locking positions, Figure 57 is a view in rear elevation of the mechanism shown in Figures 54 and 56, with the parts in normal positions, Figure 58 is a detail perspective view illustrating one of the parts of the mechanism shown in Figures 54 to 57, inclusive, Figure 59 is a detail sectional view taken substantially on the line 59—59 of Figure 54, Figure 60 is a view in vertical section illustrating mechanisms for locking the type bar actuating mechanisms out of opreation when the subtraction key is partly depressed and for preventing depression of said key when said mechanisms are unlocked, with the elements in normal or unlocking positions, Figure 61 is a view similar to Figure 60 illustrating certain parts in locking positions, Figure 62 is a view in front elevation partly broken away and illustrating certain parts of the totalizer mechanism of the right hand cross computing totalizer or register and the clear signal mechanism, with the clear signal key in elevated position, Figure 63 is a view in section taken substantially on the line 63—63 of Figure 62 with certain parts of the cross computing totalizer omitted and also showing certain additional parts in dotted lines, Figure 64 is a view in front elevation illustrating a portion of the mechanism shown in Figures 62 and 63 with the clear signal key lever in depressed position and the parts of the totalizer mechanism in zero positions, Figure 65 is a view in side elevation illustrating substantially the mechanism shown in Figure 64, Figure 66 is a view similar to Figure 65 with the parts of the totalizer mechanism out of zero positions, thereby preventing depression of the clear signal key lever, Figure 67 is a detail view in front elevation illustrating certain parts of the totalizer mechanism controlling the clear signal mechanism, Figure 68 is a view in side elevation partly broken away and illustrating particularly mechanism for locking a state control lever in one position when the carriage is located in the zone of a register, this view showing modifications of the structures of certain parts shown in other views of the drawings, Figure 69 is a view partly in plan and partly in horizontal section taken substantially on the line 69—69 of Figure 68 illustrating the mechanism shown in said figure and certain additional parts, and Figure 70 is a sectional view taken substantially on the line 70—70 of Figure 69.

The invention is illustrated in this application as applied to a typewriting and accounting machine of the Elliott Fisher type.

The machine illustrated, has the same general construction, arrangement and mode of operation of parts as the machine illustrated and described in the patent to Foothorap, No. 1,904,127, dated April 18, 1933.

In the illustrated construction (see Figs. 1, 2, and 3) the machine comprises a platen frame provided with side rails or bars 2 connected together in spaced relation by transverse or cross bars (not shown) and a substantially flat platen 4 mounted for vertical movement in said frame. Upon the side rails 2 of the platen frame is supported a line space frame movable forwardly and rearwardly on tracks formed upon the upper edges of said rails to line space the type carriage with relation to the platen. The line space frame comprises side brackets or bars 6 connected by front and rear rails 8 and 10. The line space frame is provided with wheels or rollers 12 and 13 which engage respectively the upper edges of the rails 2 of the platen frame to enable the line space frame to move readily over the platen frame.

The mechanism for moving the line space frame comprises a shaft 14 rotatably mounted in bearings formed in said frame, the shaft extending substantially parallel with the front and rear rails of the frame. Upon the shaft are fixed gears 16 which mesh with the teeth of the racks 18 secured to the side rails 2 of the platen frame. The shaft is given a predetermined angular movement in a counter-clockwise direction, Figure 3, at the end of each return movement of the carriage to impart a line spacing movement to the line space frame. The mechanism for rotating the shaft 14 to impart a line spacing movement to the line space frame at the end of each return movement of the carriage has substantially the same construction, arrangement and mode of operation of parts as the corresponding mechanism illustrated and described in the patent to Elmer L. Wise, No. 2,248,152, dated July 8, 1941.

Upon the line space frame is mounted a type carriage or head indicated as a whole at 20 upon which are mounted the usual series of type bars each carrying one or more types for engaging the work sheets supported on the platen. The type bars are arranged to be operated by power driven mechanism in the present machine and this mechanism, in part, is carried by the carriage. The carriage also carries the usual series of keys forming the keyboard of the machine and controlling the co-action of the type bars with the power driven mechanism. The carriage also carries a master wheel by which the totalizers or registers are driven and mechanism for driving the master wheel differentially by power to set up or enter successively the various digits of a number step by step in a register.

The type carriage is mounted for movement forwardly and rearwardly with the line space frame and is also mounted for lateral movement on said frame in a right hand direction to letter space during a typing operation and for return movement in a left hand direction to restore the carriage to position for starting the typing of a line. The carriage is provided with front and rear wheels or rollers 22 and 24 arranged to engage respectively the front and rear rails 8 and 10 of the line space frame. The carriage is acted upon by the usual metallic band 26 having one end attached to the carriage as shown in Figure 2 and connected with the usual spring drum 28 which tends yieldingly to move the carriage constantly in a right hand direction along the rails of the line space frame. The letter spacing movement of the carriage is controlled by the usual escapement mechanism indicated as a whole at 30, this escapement mechanism preferably having substantially the same construction arrangement and mode of operation of the parts as the escapement mechanism shown and described in the patent to Foothorap, No. 1,203,519, dated October 31, 1916, except as to the mechanism controlled from the space bar for operating the same.

Carriage return mechanism

The machine is also provided with power operated mechanism for returning the carriage to the left either to full return or partial return position (see Figures 1, 22, 23, 34, 35, 36 and 37) to the right of its full return position after it has advanced along the line space frame in the operation of printing a line. The machine illustrated in the present application is provided with an electric driving motor 32 mounted on a suitable bracket secured to the line space frame with which it travels as in Foothorap Patent No. 1,904,127, referred to above. The motor is arranged to be driven continuously during the use of the machine and is provided with the usual electrical connections 33 forming a circuit controlled by an ordinary manually operated switch 35.

The motor is provided with a shaft 34 carrying a belt pulley 36 which is connected by a belt 38 with a pulley 40 journaled upon a fixed shaft 42 (see Figure 22) having its ends supported respectively in a socket in the upright extension 44 on the left hand member 6 of the line space frame and in a socket in a boss 46 secured to the plate 48 attached to a lateral extension 50 on said left hand member 6 of the line space frame. Attached to the pulley 40 is a spiral gear 52 meshing with a spiral gear 54 secured to the shaft 56 rotatably mounted in bearings respectively in the extension 44 and in a collar or sleeve secured to the plate 48. The shaft 56, which is longitudinally fixed in its bearings, is arranged to drive the longitudinally movable shaft 60 which is also mounted in suitable bearings in the line space frame and the driving connection between the shaft 56 and the shaft 60 is arranged to accommodate the longitudinal movement of the shaft 60. In the construction shown a cross bar 62 is secured to the inner end of the shaft 56 and engages in a slot 64 formed between the projections 66 extending laterally from a disk 68 attached to the end of the longitudinally movable shaft 60. The slot between the projections 64 is sufficiently deep to allow considerable longitudinal movement of the shaft 60 while maintaining the cross bar 62 engaged in said slot.

The driving connections between the shaft 60 and the type carriage comprise a bevel gear 70 (see Figures 34 and 37) having a bearing portion or sleeve 72 engaging in a bearing in a portion 74 of the line space frame, to which sleeve the gear is secured, and having a central bushing 76 to which the sleeve 72 is fixed. The driving connection between the shaft 60 and the gear comprises a key 78 secured to the shaft and engaging in a key way or groove 80 in the bushing 76, this construction being provided to accommodate the longitudinal movement of the shaft while the gear remains stationary.

The bevel gear 70 meshes with a bevel gear 82 fixed to the forward end of the countershaft 84 mounted in a suitable bearing in the line space frame. To the rear end of the shaft 84 is fixed a gear 86 meshing with a gear 88 secured to the rear end of the carriage return countershaft 90 also mounted in suitable bearings in the line space frame and having the driving member 92 of the carriage return clutch secured thereto. The driven member 94 of said clutch is fixed to one end of a sleeve 96 rotatable and longitudinally movable on the shaft 90, upon which is mounted the relatively wide carriage return pinion 98 meshing with the teeth of the rack 100 secured to the carriage 20.

Except for the driving connections above described, the carriage return mechanism of the present machine has substantially the same construction, arrangement and mode of operation of parts as the corresponding mechanism illustrated and described in applicant's Patent No. 2,283,401, dated May 19, 1942.

The carriage return drive mechanism is thrown into operation by moving the sleeve 96 longitudinally of the shaft 90 to engage the driven member 94 of the carriage return clutch with the driving member 92 thereof and the carriage return drive mechanism is thrown out of operation when the carriage reaches a predetermined point in its return movement by moving the sleeve 96 longitudinally of the shaft 90 to disengage the driven member of the clutch from the driving member thereof. The sleeve 96 is moved longitudinally of the shaft 90 to engage and disengage the carriage return clutch by means comprising a carriage return bail and connections between the same and the sleeve having substantially the same construction, arrangement and mode of operation as the corresponding mechanism shown and described in the above Foothorap patent.

The mechanism for controlling the movement of the clutch sleeve 96 to engage the driven member of the carriage return clutch with the driving member and to disengage the driven member from the driving member comprises a clutch shifting arm 102 fixed to a rock-shaft 104 mounted in bearings in the line space frame, said arm having its free end engaged in a groove 106 in the sleeve. A clutch shifting arm 108 is secured to the other end of the shaft 104 and is provided with a lateral locking lip 110 engaged by a hooked latch 112 journaled on a trip rock-shaft 114 extending across the machine and supported in bearings in the line space frame. A fan-shaped trip arm 116 fast on the trip shaft 114 extends rearwardly between two studs 118 and 120 projecting respectively from the hooked latch 112 and from the clutch shifting arm 108, a normally tensioned spring 122 connecting the two studs to form a yielding link therebetween and normally maintaining the hooked latch 112 engaged with the clutch shifting arm 108 to retain the members of the carriage return clutch disengaged.

A tripping bail 124 is mounted at the outer ends of the standards 126 secured to the trip rock-shaft 114. This tripping bail normally occupies a rearward position as shown in Figure 34, to maintain the members of the carriage return clutch disengaged. The bail is automatically swung forwardly as the carriage reaches the end of a line to throw in the carriage return clutch and cause the carriage to be returned to full return position, by mechanism (not shown herein) having the same construction and mode of operation as the corresponding mechanism illustrated and described in applicant's Patent No. 2,283,401, dated May 19, 1942. The machine is also provided with mechanism for swinging the bail forwardly to engage the carriage return clutch upon depression of any one of a plurality of carriage return keys. Automatic mechanism is also provided which, when the carriage reaches the desired return position, swings the bail rearwardly to disengage the carriage return clutch.

The key operated mechanism for actuating the bail to throw in the carriage return clutch comprises a rock-shaft 128 journaled in bearings carried by the type carriage, to which shaft is fixed an arm 130 arranged to engage the rear face of the bail 124 as shown in Figure 35. To the other end of the rock-shaft 128 is secured a second arm 131 which carries a stud 132 engaging in a slot in the downwardly extending arm of a lever 134 pivoted on the side plate of the type carriage at 136. Another arm 138 of the lever is provided with a lip 140 arranged normally to engage a rigid pin 142 projecting laterally from the side plate of the type carriage as shown in Figure 34, the parts being shown in this figure in the positions which they assume when the bail 124 is in its rearward position with the members of the carriage return clutch disengaged. The rock-shaft 128 is acted upon by a coil spring 144 which normally holds the shaft in position with the bail actuating arm 130 in its rearward position as shown in Figure 34.

The lever 134 is swung rearwardly to actuate the rock-shaft 128 and the bail actuating arm 130 to cause the engagement of the carriage return clutch by means comprising a key lever 146 also pivoted at 136 on the side plate of the type carriage and provided with a by-pass pawl 147 pivoted at 148 on the lever and arranged to engage the lip 140 on the lever 134. This pawl is acted upon by a coil spring 150 which tends to swing the same to the left (Figures 34 and 35) and maintains the same in engagement with the stud 142, the pawl having a cam face on its left hand side which engages said stud.

With the above construction, upon the depression of the key lever 146, the lever 134 is first swung to the left by the engagement of the pawl with the lip 140 thereby swinging the rock shaft 128 and the bail actuating arm 130 in a direction to cause the engagement of the carriage return clutch and the pawl is then cammed off the lip 140. Upon the release of the key lever, the lever and pawl are restored to the positions shown in Figure 34 so that the pawl will be in position again to engage the lip 140 on the lever 134, said lever having been restored to its normal position by the action of the spring 144.

The machine is provided with mechanism for arresting the return movement of the carriage selectively with the carriage in fully returned position or with the carriage in either of two partial return positions, as illustrated and described in applicant's Patent No. 2,283,401. This mechanism comprises a key lever 152 having a lost motion connection with the key lever 146 through a stud 153 mounted on lever 146 and engaging in a slot in the lever 152. The lever 152 carries on its lower end a protrudable stop 154 arranged to be projected downwardly to different positions so as to engage selectively the stop blocks or arresters 158 and 160 of different heights, adjustably mounted on the longitudinally movable draft rod 162. A slide 164 is attached to the right hand end of the draft rod and carries a stop projection 166 arranged to engage a stop 167 on the line space frame. The mechanism for actuating the carriage return bail 124 to disengage the carriage return clutch prior to the stopping of the carriage, comprises a longitudinally movable bar 168 connected with and actuated from the slide 164, the left hand end of which bar is arranged to engage a cam 170 (see Fig. 1) secured to the right hand end of the carriage return bail. To stop the carriage in full return position, an abutment or stop plate 171 is secured to and depends from the left hand side of the carriage and is arranged to engage a stop block or arrester 173 adjustably mounted on the draft rod 162 as the carriage approaches the end of its full return movement. The stop plate extends downwardly a predetermined distance below the carriage so as to pass over the arresters 158 and 160 during the return of the carriage and to engage the arrester 173 which projects above the latter two arresters.

All of the parts of the mechanism for stopping the return movement of the carriage, above briefly described, have substantially the same construction, arrangement and mode of operation as the corresponding parts shown and described in applicant's Patent No. 2,283,401. When either the lever 146 or the lever 152 is quickly depressed and released the carriage return mechanism is thrown into operation and the movement of the carriage is stopped with the carriage in fully returned position by the engagement of the fixed stop 171 on the carriage with the arrester 173. When the lever 146 is depressed and held in depressed position, the carriage return mechanism is thrown into operation and the carriage is arrested in partial return position by the engagement of the stop 154 with the arrester 158. When the lever 152 is depressed and held in depressed position, the carriage return mechanism is thrown into operation and the carriage is stopped in another partial return position, to the right of the first partial return position, by the engagement of the stop 154 with the arrester 160.

The machine is provided with a type action and with a power driven mechanism for actuating the type bars, having substantially the same construction arrangement and mode of operation of parts as the corresponding mechanisms illustrated and described in applicant's Patent No. 2,239,023, dated April 22, 1941.

*Type action (see Figure 3)*

The present machine is provided with a series of type bars 172 each pivoted at 174 to a hanger 176 secured to the semi-circular type bar ring 178 suspended below the deck 180 of the carriage. The type bars are respectively acted upon by coil springs 177 which operate to retract the bars and tend to retain them in their normal positions in engagement with a semi-circular buffer ring 181.

The tail of each of the type bars is connected by a link 182 with an elbow lever 184 pivoted at 186 upon a hanger 188 depending from the deck 180. Each elbow lever is connected by a link 190 with the forward end of a sub-lever 192 pivoted at 194 upon a support 196 secured to the upper face of the deck 180. The rear end of the sub-lever 192 is connected by a link or push rod 198 with a horizontally arranged intermediate lever 200 journaled on a fulcrum bar 202 extending across the rear of the key carriage. Each of the intermediate levers 200 is acted upon by a coil spring 204 which assists the retracting spring 177 in yieldingly holding the parts of the mechanism in the normal positions shown in Figure 3.

The forward ends of the intermediate levers 200 project through slots 206 in the front wall of the type carriage casing and the upper edges of the ends of the levers are arranged to engage a cushion bar 208 mounted in a channel 210.

*Power driven type bar actuating mechanism (see Figure 3)*

In the present machine, power driven mechanism is provided for swinging the intermediate levers 200 in a downward direction about the fulcrum bar 202 to actuate the type bars. This mechanism comprises a longitudinally movable transmitting link 212 pivotally connected to the intermediate lever 200 by means of a stud 214 and held in place by a spring clip 216. The transmitting link is pivoted at 218 to a radius arm or lever 220 which is journaled on a rod 222 seated in a longitudinal slot in a bed 224 secured to the cover plate 226 of the type carriage. Said mechanism also comprises a longitudinally movable driving link 228, the lower end of which is pivoted at 230 to the radius arm 220. A pawl 234 is pivoted at 236 to the driving link and is provided with two teeth arranged to engage the teeth of a continuously rotating toothed or fluted shaft 238 mounted in bearings in the type carriage. The lower end of the driving link is acted upon by a coiled spring 232 which tends to swing the link in a clockwise direction about the pivot 230 and to maintain normally the link substantially in the position shown in Figure 3 with the pawl 234 in engagement with a fixed inclined arresting plate 240 extending across the type carriage, in which position the pawl is disengaged from the toothed shaft. In order to engage the pawl with the shaft, the driving link 228 is swung to the left (Figure 3) about the pivot 230. This movement of the link brings the lower tooth of the pawl first into position to be engaged by the toothed shaft. The engagement of one of the teeth on the shaft with the lower tooth of the pawl, swings the pawl about its pivot until the movement of the pawl is limited by the engagement of a lateral projection 242 on the pawl with the body of the link. This movement of the pawl swings the upper tooth thereof into position to be engaged by the succeeding tooth on the toothed shaft and the driving link 228 is then driven in a downward direction to actuate the transmitting link 212 and the intermediate lever 200 downwardly.

The driving links are swung to the left to engage the respective pawls carried thereby with the toothed shaft by mechanism actuated by the keys of the keyboard. This mechanism comprises a drag link 244 connected at its left hand end (Figure 3) with an upwardly extending arm of the key lever 246 and having a shoulder 248 adjacent its right hand end arranged to engage a pin 250 mounted on the driving link 228. The left hand end of the drag link is connected with the upwardly extending arm of the key lever 246 by means of a stud 252 mounted on the link and engaging in a slot 254 in said arm of the key lever and a coil spring 256 which normally holds the stud 252 seated in the left hand end of the slot. Each of the key levers 246 is pivoted on a shaft 258 common to the keys of all the banks and is provided with a forwardly extending arm on which is fixed a key 260. The end of the upwardly extending arm of each of the key levers, extends through a guide slot 262 formed in a guide plate 264 secured to the upper portion of the frame of the type carriage and the movement of the key lever is limited by the engagement of said arm with the ends of the guide slot. Each of the key levers is acted upon by a coil spring 265 which normally maintains the upwardly extending arm thereof in engagement with the rear end of the guide slot.

With this construction, upon the depression of the key 260 of the key lever, the upwardly extending arm thereof will be swung forwardly or to the left (Figure 3) to engage the pawl 234 with the toothed shaft 238. In the event that the movement of the link 228 is limited before said arm of the key lever reaches the forward end of the guide slot 262, the spring 256 will yield to allow the movement of the key lever to continue to its limiting position.

When the key is depressed to actuate the key lever to swing the driving link to the left to engage the pawl with the toothed shaft, the movement of the driving link is limited by the engagement of the pawl with said shaft. As the driving link is carried downwardly by the rotary movement of the shaft, the link is swung to the left, during the latter part of its movement, by the engagement of the pawl contacting tooth of the shaft with the upper tooth of the pawl, the movement of said tooth of the shaft then having a substantial component toward the left (Figure 3). In order to limit this swinging movement of the driving link and cause the disengagement of the pawl from the tooth of the shaft at the desired time in the actuation of the type bar mechanism, a series of stop plates 266 are adjustably mounted on the guide plate 264 and are arranged to be engaged respectively, by the upper ends of the driving links to limit the swinging movement thereof. These stop plates are mounted on the guide plate 264 for adjustment toward and from the upper ends of the respective driving links to adjust the time in the actuation of the driving links at which said links engage the respective stop plates and thereby adjust the time in the actuation of each type bar mechanism at which the pawl is disengaged from the toothed shaft. To this end each of the plates 266 is formed with a slot 267 (see Figures 43 and 44) in which engages a screw 268 by which the stop is secured to the plate 264.

As is well known to those skilled in the art, by adjusting the time at which the pawl is disengaged from the fluted shaft, the force of the type impression may be regulated. When the pawl is disengaged from the shaft at a relatively early point in the actuation of the driving link, the type bar will be actuated to strike a relatively light blow upon the paper and when the pawl is disengaged from the fluted shaft at a point relatively late in the actuation of its driving link, the type bar will be actuated to strike a relatively heavy blow upon the paper.

The free rear ends of the drag links 244 project through guide slots 268ᵃ (see Figs. 41 and 42) formed in the upper end of the arresting plate 240. The bottom walls of these slots limit the downward movement of the drag links under the influence of the springs 256 as the driving links move downwardly to actuate the type bars.

The trailing ends of the driving links 228 travel up and down and move forwardly and rearwardly in guide slots 269 formed in a transverse bar 270 supported on the frame of the type carriage.

*Interlock for driving links (see Figures 3 and 42)*

An interlock mechanism is provided for preventing more than one of the driving links from being swung forwardly into operating position at the same time. To this end a longitudinal channel or groove 271 is formed in the bar 270 and a series of interlocking balls 272 is confined in this groove between suitable adjusting members (not shown) arranged at the ends of the groove and acting as pilots for springs pressing against the balls at the respective opposite ends of the series to center the series in the groove as shown in applicant's Patent No. 2,239,023.

As is usual in this type of interlock, the combined spaces between the balls and between the end balls and the confining studs is just equal to the width of a single driving link. This series of balls is so arranged that when one of the driving links is swung forwardly into driving position the upper end of the link is engaged between two balls of the series. This takes up all the space between the pawls and between the end balls and the confining studs so that, if any key lever is depressed to swing another of the driving links forwardly, the movement of the link will be limited before the corresponding pawl engages the toothed shaft.

*Escapement mechanism (see Figures 2, 3 and 38)*

The present machine, as stated above, is provided with an escapement mechanism for controlling the letter spacing movement of the type carriage preferably having substantially the same construction, arrangement and mode of operation of parts as the corresponding mechanism illustrated and described in the patent to Foothorap, No. 1,203,519, except as to the mechanism for controlling the escapement from the space bar. This escapement mechanism comprises a carriage feed rack 273 secured to the rear rail 10 of the line space frame and a feed pinion 274 journaled on a shaft 275 having its ends engaged in suitable supports on the frame of the type carriage. To this pinion is secured an escapement wheel 276 controlled by escapement dogs 277 and 278 operated from the universal bar by means of the usual draw wire. This draw wire indicated at 279, is connected at its upper end with an arm 280 (see Figure 3) secured to a rock-shaft 281 arranged transversely of the type carriage. Arms 282 are secured to this rock-shaft from which is suspended a universal bar 284. This bar extends beneath the several intermediate levers 200 and is arranged to be engaged by an abutment screw 285 mounted in each of said levers. The depression of the universal bar 284 by the downward movement of any one of the intermediate levers 200 swings the rock-shaft 281 in a counter-clockwise direction (Figure 3) thereby swinging upwardly the arm 280 to swing the holding dog 277 out of operative position and to swing the spacing dog 278 into operative position. The rock-shaft is acted upon by a return spring 287 connected with an arm 289 fixed to the shaft which acts to turn the rock-shaft back in a clockwise direction upon the release of the universal bar 284 by the intermediate lever 200. This movement of the rock-shaft swings the arm 289 back downwardly and allows the draw wire 279 to descend and the spacing dog 278 is swung out of operative position and the holding dog 277 is swung back into operative position. The movement of the spacing dog out of operative position is limited by means of pin 291 mounted in a fixed arm 293 extending from a bracket constituting one of the supports for the escapement mechanism, said pin being engaged by an arm on the dog to limit the movement of the dog.

The escapement mechanism is controlled from the space bar by mechanism having substantially the same construction, arrangement and mode of operation of parts as the corresponding mechanism illustrated and described in applicant's Patent No. 2,239,023. This mechanism comprises devices operated by power for swinging the rock-shaft 281 in a counter-clockwise direction (Figure 3) to throw out the holding dog 277 and to throw in the spacing dog 278 and the parts are restored to their normal positions by the action of the restoring spring 287.

*Column totalizer mechanisms (see Figures 1, 3 and 18)*

The present machine has provision for supporting a series of computing registers or totalizers in position to be actuated by the mechanism controlled by the numeral keys as shown in applicant's Patent No. 1,904,127. The machine is provided with a register bar 286 supported at its ends upon uprights 288 attached to the line space frame and upon this bar may be mounted a column register or any number of column registers having any desired location along the bar. Each of these registers may have any suitable construction, for example, the register construction illustrated and described in the patent to Foothorap, No. 1,994,639, dated March 19, 1935. As shown and described in said patent, the register is provided with a base plate 290 having on its lower face cooperating fixed and movable clamping members 292 and 294 for clamping the register in position on the register bar. The clamping member 294 is preferably operated by a hand screw (not shown) to clamp the register in proper position as determined by the engagement of the forward end of a locator lever 296 in openings 298 (see Figure 18) in the register bar. Each register comprises the usual series of number wheels 300, value wheels 301 and idler gears 303 connecting the number and value wheels (see Figure 3), with the usual transfer mechanism (not shown) and with the usual transfer reset slide 302. The series of number wheels 300 includes one for each denomination which can be set up in the totalizer, these wheels being arranged side by side and in axial alignment.

*Driving mechanism for totalizers (see Figs. 2, 3 and 4)*

The type carriage is provided with power driven mechanism for actuating the totalizing mechanism of the column totalizers or registers to set up numbers in the totalizer wheels. This mechanism is controlled by the numeral keys of the typewriter keyboard. The said mechanism comprises a master wheel 304 secured to a shaft 306 carried by the type carriage and arranged to mesh with the teeth of one of the number wheels 300 in each denominational position of the type carriage with relation to a coulmn totalizer, the master wheel being moved step by step from one of the number wheels 300 to the succeeding wheel by the movement of the carriage under control of the escapement mechanism, after each accumulating operation.

The master wheel 304 is located at about the middle of the type carriage at the rear thereof and extends rearwardly from the carriage into position to engage the gears 300 of the totalizer mechanisms of the column registers. The master wheel is fixed to a short shaft 306 journaled in bearings in brackets 308 and 310 secured to the type carriage. To the shaft is fixed a pinion 312 which is constantly in mesh with a gear 314 fixed to a shaft 316 mounted for rotative and axial sliding movements in the brackets 308 and 310. When the mechanism is set for addition, this gear also meshes with a gear 318 attached to the main differential actuator shaft 320 extending across the type carriage and journaled in bearings 320a supported on the frame of the carriage. The gear 314, when the machine is set for subtraction, is demeshed from the gear 318 and meshes with a gear section 321 of a twin gear 321, 321a journaled on a shaft 322 supported in the bracket 310. The other section 321a of said twin gear is constantly in mesh with the gear 318 and, when the machine is set for addition, the twin gear rotates idly.

*Power driven differential actuator mechanism (see Figures 2, 3, 5, 6, 7, and 8)*

The shaft 320 is rotated differentially to impart differential movements to the master wheel 304 and to the totalizer mechanism of the register to enter the desired numbers in the register by mechanism selectively controlled from the several numeral keys of the type bar actuating and controlling mechanism. The several mechanisms for differentially rotating the shaft under control of the numeral keys from 3 to 9 inclusive, to enter corresponding numbers in the register, all have the same general construction, arrangement and mode of operation of parts, these mechanisms differing only in the respects hereinafter pointed out to vary the rotative movement imparted to the shaft.

Each of these mechanisms comprises a longitudinally movable rack bar 324, pivotally suspended at 326 on an arm 328 which is pivoted on a shaft 330 extending across the type carriage and supported in the end plates or brackets 239. These arms are acted upon by a bail 332 also pivoted on said shaft and normally held yieldingly in depressed position by a spring 334 (see Figure 2), the bail engaging the upper sides of said arms. The downward movement of the bail is adjustably limited by a stop lever 336 (see Figures 60 and 61) pivoted at 335 on one of the side plates and held in adjusted position by means of a screw 340 engaging in a slot 342 in the lever.

Each of the racks 324 is provided, on the rear side thereof with a series of downwardly inclined teeth 344 arranged to engage the teeth of a gear 346, fixed to the shaft 320, the teeth of the gear being inclined in a clockwise direction. Each of the rack bars is also provided on its forward side with a series of downwardly inclined teeth 348 arranged to engage the teeth of a continuously rotating power driven toothed or fluted shaft 350 extending across the type carriage and journaled in bearings carried by the end plates 239.

Each of the rack bars is normally held in a position intermediate between the shaft 350 and the corresponding gear 346 as shown in Figure 3, in which it is disengaged from both shaft and gear. The mechanism for holding each rack in this position comprises a pin 352 secured in the bar adjacent the lower end thereof and engaging in a recess 354 in a lever 356 pivoted at 358 on an upright supporting plate or bracket 360 secured to the cover plate 226. This lever is acted upon by a coil spring 362 which tends to swing the lever upwardly and yieldingly holds the pin engaged in the recess with the pin in contact or substantially in contact with the lower edge of a fixed cam plate 364 attached to the upright plate 360.

In order to throw into operation the differential mechanism for entering a given digit in the totalizer of a register, the rack bar 324 corresponding to this digit is swung forwardly to engage the teeth on the forward side of the rack bar with the teeth of the continuously rotating shaft 350. By the engagement of the rack bar with the shaft, the rack bar is moved longitudinally upward and the corresponding arm 328 and the bail 332 are swung upwardly by the movement of the rack bar against the action of the spring 334. When the rack bar has been moved upward the distance required for the subsequent action thereof, it is swung rearwardly to disengage the teeth on the forward side thereof from the shaft 350, this movement being limited to prevent the engagement of the teeth on the rear side thereof at this time with the gear 346. The rack bar is then moved longitudinally downward by the action of the bail 332 under the influence of the spring 334 to a constant position, which is substantially the same for all of the several bars. At a predetermined point in the downward movement of the rack bar, the bar is swung farther to the rear to engage the teeth on the rear side of the bar with the gear 346, and, during the continued downward movement of the bar, the gear is rotated to actuate the totalizer to enter the corresponding digit in the register.

The several mechanisms for swinging the rack bars forwardly to engage said bars selectively with the continuously rotating shaft 350 are operated from the several corresponding intermediate levers 200 connected with the numeral type bars as these levers are moved downward respectively to actuate the type bars corresponding to the numeral keys. These mechanisms, however, are rendered operative only when the master wheel 304 is in position to engage and actuate one of the wheels 300 of the totalizer mechanism of a register. The position of the type carriage when the master wheel is in position to operate the totalizer mechanism of a register, will be, in certain instances, hereinafter referred to as the position of the carriage when in the zone of a register.

The mechanism for swinging each of the rack bars forwardly comprises a lever 366 (one for each rack bar) (see Figs. 3, 5, 6, and 7) pivotally suspended at 368 upon an arm 370 secured to a rock-shaft 372 extending across the type carriage and supported in bearings in the end plates thereof. The lever 366 projects at its lower end through a guide slot 374 in the cover plate 226, and is formed on its left hand side with a projection 376 arranged to engage the pin 352. The rock-shaft 372 is acted upon by a coil spring 378 attached to an arm 380 on said shaft which normally maintains the arm 370 and the lever 366 in lowered position with the projection 376 below the pin 352. The lever 366 is connected by a link 382 with a plate 384 fixed to the upper end of an arm 386 secured to one of the intermediate levers 200.

The levers 366, when the carriage is not in the zone of a register, occupy their lowered positions as shown in Figure 3. Under certain conditions, when the carriage is in the zone of a register, the levers 366 assume the elevated positions shown in Figures 5, 6 and 7.

With this construction, when the lever 208 of a numeral type bar mechanism is swung downwardly to actuate the type bar, the corresponding lever 366 is swung forwardly through its connection with the arm 386. If the lever 366 is, at this time, in lowered position, the projection 376 thereon will not engage the pin 352 and this movement of the lever 366 will not affect the position of the rack bar 324. However, if the lever 366 is then in elevated position, the projection 376 on the lever 366 will engage the pin 352 on the rack bar as said lever is swung forwardly and the rack bar will be swung forwardly therewith to engage the same with the continuously rotating shaft 350 as shown in Figure 5.

When the rack bar is engaged with the shaft 350, the bar is moved upwardly by the action of the shaft for the distance required for its subsequent action and is then swung rearwardly to disengage the same from the shaft by means of a pin 388 projecting downwardly from a supporting plate 390 secured to the frame of the carriage, which pin engages a laterally projecting arm 392 on the rack bar as shown in Figure 6.

During the lateral swinging movement of the rack bar forwardly to engage the same with the shaft 350, the pin 352 travels along the lower edge of the fixed cam plate 364 as indicated in Figure 8. During the upward movement of the rack bar, the pin travels along the forward edge of the cam plate which is shaped as shown in said figure and tends to guide the lower end of the rack bar and prevent it from disengaging the continuously rotating shaft. As the rack bar approaches the upper end of its movement, the pin 352 leaves the upper end of the cam plate. As the rack bar is swung rearwardly by the action of the pin 388, the pin 352 engages the forward side of a fixed guide plate 394 secured to the upright supporting plate 360 above the cam plate 364 and arranged to leave a crossover or channel 396 between the lower edge of the same and the upper edge of said cam plate. This plate 394 limits the rearward movement of the rack bar to prevent, at that time in the cycle, the engagement of the rack with the gear 346, and forms a guide for the lower end thereof during the first part of the downward movement of the bar.

During the first part of the downward movement of the rack bar, under the action of the bail 332, the pin 352 moves along the forward side of the guide plate 394 until it reaches the channel 396, the rack bar then being disengaged from the gear 346. As the pin reaches the channel, which occurs at a predetermined point in the downward movement of the rack bar, said pin is directed into said channel by the cam plate 364 which projects to the left some distance beyond the guide plate 394 as shown in Figure 8. The channel 396 is inclined downwardly and to the right (Figure 8) and, during the passage of the pin 352 through the same, the rack bar is swung rearwardly by the action of the cam plate 364, thereby engaging the rack bar with the gear 346 at a predetermined point in the downward movement of the rack bar.

During the continued downward movement of the bar under the action of the bail 332, the gear 346 is actuated to accumulate the number, corresponding to the numeral key depressed, in the number wheels of the totalizer mechanism of the column register. After the rack bar 324 is engaged with the gear 346, and the rack bar continues its downward movement, the pin 352 engages the rear edge of the cam plate 364 which forms a guide for the rack and at substantially the end of the downward movement of the rack the pin engages the projecting end of the lever 356. By the engagement of the pin with the lever, the lever is swung downwardly slightly and the pin is deflected forwardly into the recess 354 by the contacting edge of the lever which is inclined to a slight degree to the direction of downward movement of the pin, thereby again locating the rack bar in its intermediate position.

If it should happen that the pin 352 is not deflected into the recess in the lever 356 by its engagement with the right hand end of the lever at the end of the downward movement of the rack bar, but remains just below the lower end of the rear edge of the cam plate 364 with the rack bar still engaged with the gear 346, this will not affect the proper operation of the mechanism, since the rack bar will operate just as well starting from this position in the next operation of the mechanism.

The cam plate 364 and the guide plate 394 differ in size and contour for each of the several actuator racks. The position of the channel 396 or the position of the upper inclined edge of the cam plate 364 determines the point in the downward movement of the rack bar at which the rack bar is engaged with the gear 346 to actuate the totalizer mechanism and this determines the extent of actuation of said mechanism and the number which is entered therein. Thus, for example, for the number 3, the channel and the upper edge of the cam plate are located at a relatively low point in the movement of the corresponding rack bar. The shape and dimensions of cam plate 364 and the guide plate 394 for the rack bar corresponding to the numeral key 6 are such that the upper edge of the cam plate and the channel 396 are located relatively at an intermediate point in the movement of the rack bar and the shape and dimensions of the cam plate and guide plate for the rack corresponding to the numeral key 9 are such that the channel and the upper edge of the cam plate are located at a relatively high point in the movement of the rack bar.

Figure 8 clearly shows the path of the pin 352 during the upward and downward movement of an actuator rack 324 and the manner in which the lateral position of the rack is controlled by the cam plate 364 and the guide plate 394. Regardless of the dimensions and shape of the cam plates and guide plates for the racks corresponding to the numeral keys from 3 to 9, inclusive, the several mechanisms have substantially the same mode of operation.

The mechanism for actuating the gears 346 corresponding to the actuator racks for the numeral keys 1 and 2, differs in certain respects from the corresponding mechanisms for actuating the gears 346 for the numeral keys from 3 to 9, inclusive, and is illustrated in Figures 9 and 10. In the mechanism shown in these figures, the continuously rotating shaft 350, the rack supporting arms 328, the actuating bail 332, the rack controlling pin 352, the controlling lever 356, the controlling cam 364, the guide plate 394, and the upright supporting plate 360 for said cam and guide plates, all have substantially the same construction, arrangement and mode of operation as the corresponding parts of the mechanism illustrated in Figures 3 and 5 to 8, inclusive, for the numeral keys from 3 to 9, inclusive, except as to the shape and dimensions of the cam plate 364 and the guide plate 394, and that the rack bar is not engaged with the gear 346 by the action of the cam during the downward movement of the rack bar. The rack bar, indicated at 324a, in this construction, differs from the rack bar 324 in that it has teeth 348 only on the forward side thereof for engagement with the actuator shaft 350.

In this mechanism, the gear 346 is rotated during the downward movement of the rack bar by means of a pawl 398 pivoted at 399 on the arm 328 and arranged to engage the gear 346. The pawl is acted upon by a coil spring 400 which maintains the pawl constantly in engagement with said gear. This mechanism differs from the corresponding mechanism for entering the numerals from 3 to 9 inclusive, in that the extent of actuation of the gear 346 by the pawl 398 is determined by the point in the upward movement of the rack bar at which the rack bar is disengaged from the shaft 350 by the action of the pin 388a on the arm 392 of the bar. The longer the pin 388a, the earlier in the upward movement of the rack bar will said bar be disengaged from the shaft 350 and its downward movement initiated. The pin 388a for the differential mechanism for entering the digit "1" in a register is somewhat longer than the pin of the mechanism for entering the digit "2" so that the rack bar for the first mechanism is disengaged from the shaft 350 at an earlier point in its upward movement than the rack bar for the latter mechanism. During the upward movement of a rack bar the pawl 398 moves idly over the teeth of the gear 346. As a rack bar is disengaged from the shaft 350 and the bar and the arm 328 are moved downwardly by the action of the bail 332, the pawl starts its actuation of the gear 346 during the first part of the downward movement of the rack bar and rotates said gear a differential distance corresponding with the downward movement of the bar.

It will be noted that in this construction, the channel 396 between the guide plate 394 and the cam plate 364 is not inclined to the right, but is very nearly vertical as shown in Figures 9 and 10.

The mode of operation of the construction shown in Figures 9 and 10, briefly described, is as follows: Upon the depression of a numeral key corresponding to either of the digits 1 or 2, the corresponding rack bar 324a is swung forwardly by the corresponding lever 366 to engage the rack bar with the continuously rotating shaft 350. The rack bar is carried upwardly by the shaft until the arm 392 on the bar is engaged with the pin 388a to swing the bar rearwardly and thereby disengage the same from the shaft. As in the construction shown in Figures 5 to 8 inclusive, during the first part of the upward movement of the bar the pin 352 moves along the forward face of the cam 364 and passes beyond the cam as the bar approaches the end of its upward movement. As the rack bar is swung rearwardly to disengage the same from the shaft 350, its rearward movement is limited by the engagement of the pin 352 with the guide plate 394. As above stated, during the upward movement of the bar, the pawl 398 rides idly over the teeth of the gear 346. As the rack bar and the arm 328 are moved downwardly under the action of the bail 332, the pawl 398 begins its actuation of the gear 346 substantially upon the initial downward movement of the bar and continues its actuation of said gear until the bar completes its downward movement. During the downward movement of the bar, the pin 352 engages in the channel 396 thereby guiding the bar and at the end of the downward movement of the bar the pin engages the lever 356 and is deflected into the recess 354 in said lever. The vertical movement of the rack bar in this construction is a differential movement corresponding with the digit to be entered in the register and the movement imparted to the pawl 398 and to the gear 346 is a corresponding differential movement.

The downward movement of each of the rack bar suspending arms 328 is limited by means of a stop arm 402 secured at its upper end to the frame of the type carriage and extending downwardly and rearwardly beneath the forward end of the arm 328, the arm 328 engaging the end of the stop arm in the manner shown in Figure 3. These stop arms prevent overthrow of the several racks.

The present machine is provided with the usual register engaging cam lever which conditions certain parts of the machine for the actuation of the totalizer mechanism of the column register when the machine is in the zone of a register. The machine is also provided with the usual decimal trip or decimal space mechanism for causing the carriage to execute a double escapement movement in passing from the units of dollars position to the tens of cents position in the register. The machine is further provided with a manually settable element for determining the actuation or non-actuation of the totalizer mechanism of the register and for controlling the action of the decimal space mechanism when the carriage is in the zone of a column register. By adjusting this manually settable element in one position, the machine is set for writing only, the actuator mechanism for the totalizer and the decimal space mechanism then being held out of operation. By adjusting the element in another position, the machine is set for typing totals and for writing, the register actuating mechanism then being held out of operation and the decimal space mechanism being located in operative position so as to produce the proper spacing between the units of dollars and the tens of cents in writing totals. By adjusting the element in a third position, the machine is set for the actuation of the totalizer mechanism of the register and the actuation of the decimal space mechanism.

*Means for enabling differential mechanism (see Figures 2, 3, 5, 6, 7 and 11 to 18 inclusive)*

The mechanism for raising the levers 366 into operative position with relation to the pins 352 comprises one of the arms 370 secured to the rock shaft 372 and a link 406 pivotally suspended at 368 upon said arm. The link 406 extends through a suitable slot in the cover plate 226 and is formed at its lower end with a slot 410 in which engages a pin 412 secured in the left hand end of a lever 414 pivoted at 416 upon a bracket depending from the cover plate. The vertical position of the lever 414 is controlled by means of a lever 418 also pivoted at 416 on said bracket and carrying a pin 420 which engages the under side of an interposer 422 intermediate between the lever 418 and the lever 414. The interposer 422 is pivoted at 424 to an arm 426 fixed to a rock-shaft 428 supported in suitable bearings upon the under side of the cover plate 226 and is formed with a shoulder 430 upon which rests, under certain conditions, a pin 432 secured in the lever 414. Thus the interposer is supported by the lever 418 and the arm 426 and the position of the interposer longitudinally of the lever 414 is determined by the position of the arm 426 and the rock-shaft 428.

The angular position of the lever 418 is controlled by the usual register engaging cam lever. This cam lever and the construction through which it is connected to the lever 418 is similar to the corresponding construction illustrated and described in the patent to Foothorap No. 1,512,282, dated October 21, 1924. The right hand end of the lever 418 engages in a slot 434 in a vertically movable plate or slide 436 (see Figs. 11 to 14 inclusive) located on the inside of the cover plate which is connected by a pin 438 with a lever 439 located on the outside of the cover plate (see Figure 2), the pin 438 moving in a slot in the cover plate. The lever 439 is pivoted upon a stud 440 secured in a downturned portion of the cover plate and is connected by a coil spring 441 with the cam lever 442. The cam lever is also pivoted upon the stud 440 and is provided with the usual cam 444 which is engaged and depressed to depress the cam lever by a cam surface formed on the left side of a plate 446 secured to the base of the register upon the movement of the carriage into the zone of a register. The cam lever, in its downward movement, swings the lever 439 downwardly therewith by the engagement of an arm (see Fig. 2) formed on the cam lever with an eccentric stop 448 secured to the lever 439. Thus, through the connections described, when the register engaging cam is depressed by the locating of the type carriage in the zone of a register, the right hand end of the lever 418 (Figures 11 to 14 inclusive) is also depressed. The position of the rock-shaft 428 is controlled by the manually settable element for determining the condition of the machine. When the rock-shaft is at this time positioned to locate the interposer 422 in the position shown in Figures 11 and 12, the link 406 and the corresponding arm 370 will be elevated by the action of the register engaging cam lever to raise the levers 366 into operative position. When the rock-shaft 428 is positioned to locate the interposer 422 in the position shown in Figures 13 and 14, the shoulder 430 on the interposer does not lie beneath the pin 432 and the arm 407 and link 406 will not be elevated by the movement of the lever 418.

The rock-shaft 428 and arm 426 are located in the position shown in Figures 11 and 12 to condition the machine for the operation of the totalizer actuating mechanism, or to enable said mechanism. The rock-shaft and arm are located in the position shown in Figures 13 and 14 to condition the machine to disable the totalizer actuating mechanism. The mechanism for positioning the rock-shaft comprises a second arm 450 (see Figures 15, 16 and 17) extending downwardly from said shaft and carrying a pin 452 projecting laterally therefrom and engaging in a slot 454 in a lever 456 pivoted at 458 on the side plate 459 of the carriage casing. This lever is acted upon by a coil spring 457 which tends constantly to swing said lever to the right and to maintain the arm 450 in the position shown in Figures 15 and 16. A second lever 460 is also pivoted at 458 on said side plate and is connected with the lever 456 by means of a pin 461 secured to the lever 456 and engaging in a slot 462 formed in the lever 460. The lever 460 is pivotally connected at its upper end to a longitudinally movable link 463 which is supported by said lever and by a stud 464 secured in the side plate of the carriage and engaging in a longitudinal slot 466 in the link. The longitudinal position of the link is controlled by means of a manually operable setting lever 468 pivoted on a stud 470 secured in the upright plate 239 at one end of the carriage and having a slot 472 at its lower end in which engages a pin 474 secured in the link 463. The lever 468 is provided with an arm 476 extending forwardly beyond the frame of the carriage by which the lever may be manually adjusted. The lever is arranged to be adjusted in three different positions to control the condition of the machine and a detent lever 478 is pivoted at 480 on the plate 239 and is acted upon by a coil spring 482 which tends to swing the lever to engage the projection at the forward end thereof with any one of the three notches 484 in the lever 468 to hold the latter lever in any one of the three positions in which it may be adjusted.

*Decimal space mechanism (see Figures 2, 15, 16, 17 and 18)*

The decimal space mechanism of the machine is similar to the corresponding mechanism illustrated and described in Patent No. 1,512,282 referred to above, many of the parts having substantially the same construction, arrangement and mode of operation. This mechanism comprises a trip lever 486 secured to the rear end of a longitudinally movable rock-shaft 488 to the forward end of which is attached an arm 490 pivotally connected to the upper end of a rod or wire 492. The lower end of this wire is pivotally connected to a lever 494 (see Fig. 2) pivoted at 496 upon a hanger 498 suspended from the deck 180, said lever being provided with a lateral projection which engages beneath the outwardly projecting arm 500 formed on the holding pawl of the escapement mechanism. When the decimal space lever 486 is located axially in its rearward or operative position and the carriage is located so that the master wheel 304 is in the units of dollars position of a register and a numeral key is depressed, the V-shaped projection extending upwardly at the end of the lever is engaged by the V-shaped cam 502 projecting downwardly from the plate 446 secured to the base of the register. By the engagement of this cam with the decimal space lever, the lever is swung downwardly and the wire 492 is elevated to hold the escapement pawl 277 out of position to engage the escapemnt wheel 276, Fig. 38, until the carriage has executed a two space or double escapement movement. This movement of the carriage disengages the projection on the decimal space lever from the cam 502 and the parts are then restored to their normal positions by the action of the coil spring 504 on the lever 494. With the decimal space lever located in its forward position, the V-shaped projection at the end thereof will not engage the cam 502 during the passage of the carriage through the zone of a register.

The decimal space lever is moved axially into and out of position to be engaged by the cam 502 by longitudinal movement imparted to the rock-shaft 488 upon which the lever is mounted. The mechanism for moving the shaft longitudinally comprises a rock-shaft 506 mounted in suitable bearings carried by the frame of the type carriage and having on one end a downwardly extending arm connected by a link 508 (see Fig. 18) with the arm 490 on the rock-shaft 488. To the other end of the rock-shaft is secured a second downwardly extending arm 510 which is connected with lever 460 by means of a link 512. To provide a lost motion connection between the link and said lever, the link is formed with a slot 514 in which engages a pin 516 secured in the lever. The rock-shaft 488 is acted upon by a coil spring 518 which constantly tends to move the same rearwardly to locate the decimal space lever in operative position, the rearward movement of the shaft being limited by the engagement of the hub of the arm 490 with a bracket 519 through which the shaft passes. The construction above described is substantially the same as that illustrated and described in Patent No. 1,512,282 referred to above.

The lever 468 controls the axial position of the rock-shaft 488 and of the decimal space lever as well as the angular position of the rock-shaft 428. The lever 468 is shown in Figure 15 in the position in which it is adjusted for writing alone. With the lever adjusted in this position, the rock-shaft 428 is positioned to locate the interposer 422 in the position shown in Figures 13 and 14 so that the actuator mechanism for the totalizers of a register will not be thrown into operation and the decimal trip lever 486 is located axially out of position to engage the cam 502 when the carriage is located in the zone of a register. With the lever 468 in the position shown in Figure 16, the machine is conditioned for the typing of totals when the carriage is in the zone of a register. When the lever is shifted from the position shown in Figure 15 to that shown in Figure 16, the lever 460 is actuated to allow the decimal trip lever 486 to be moved rearwardly into operating position by the action of the spring 518, but the lever 456 remains stationary, the pin and slot connection between the lever 456 and the lever 460 allowing this movement of the latter lever independently of the lever 456. With the lever 468 in the position shown in Figure 17, the machine is conditioned for the actuation of the totalizer mechanism of a register when the carriage is in a register zone. When the lever 468 is shifted from the position shown in Figure 16 to that shown in Figure 17, the lever 456 is actuated to turn the rock-shaft 428 to locate the interposer 422 in the position shown in Figures 11 and 12 so that the actuating mechanism for the totalizer will be thrown into operation upon the depression of a numeral key when the carriage arrives in the zone of a register. During this shift of the lever 468, the link 512 and the connections between the same and the decimal trip lever remain stationary, the relative movement between the lever 460 and the link being permitted by the lost motion connection between these parts.

The reverse operations take place upon shifting the lever 468 from the position shown in Figure 17 to that shown in Figure 16 and from the position shown in Figure 16 to that shown in Figure 15 and will be readily understood by those skilled in the art.

Devices for preventing misoperation of shaft 320 (see Figures 19 and 20)

In order to prevent overthrow of the shaft 320 at the end of the register actuating movement of each actuator rack 324, a ratchet wheel 520 having its teeth facing in the direction of rotation of the shaft 320 is fixed to said shaft outside of the right hand frame plate 239 of the carriage and a pawl 522 is pivoted at 524 on said plate and is arranged to engage the teeth of said ratchet wheel. The pawl is normally held out of engagement with the ratchet wheel by means of a coil spring 526, the movement of the pawl under the action of the spring being limited by a pin 528 fixed to the plate 239. The pawl 522 is swung downwardly into engagement with the ratchet wheel by means of a forwardly projecting arm 530 secured to the bail 332 with a rearwardly projecting arm 532 formed on the pawl 522. As the bail swings downwardly with an actuator rack during the register actuating movement of said rack, the arm 530 on the bail engages the arm 532 on the pawl as the rack approaches the end of its operative movement and the pawl is thus swung downwardly into engagement with the ratchet wheel 520, the parts being arranged and timed so that the engagement of the pawl with the ratchet wheel will occur substantially as the rack completes its operative movement.

In order to prevent retrograde movement of the shaft 320 a ratchet wheel 534 is fixed to the left hand end of the shaft outside the left hand frame plate 239 of the carriage, the teeth of this wheel facing in a direction opposite to the direction of operative movement of the shaft (see Figure 21). A holding pawl 536 is pivoted at 538 on a fixed support 540 secured in spaced relation to the plate 553 (see Figs. 2 and 21) which forms part of a crossfooter casing and the pawl is acted upon by a coil spring 544 which maintains the pawl constantly in engagement with the teeth of the ratchet wheel.

Crossfooter register mechanisms

As shown clearly in Figure 2 of the drawings, the shaft 320 is extended beyond the side plates 239 of the type carriage at each end of said carriage and right and left hand cross-computing registers or crossfooters 546 and 548 are mounted at the respective ends of the carriage. The totalizer mechanisms of these crossfooters are connected respectively with the ends of said shaft for operation by the shaft. The totalizer mechanisms of the crossfooters preferably are substantially identical and each of these mechanisms has the same general construction arrangement and mode of operation of parts as the corresponding mechanism illustrated and described in patent to Foothorap, No. 2,145,254, dated January 31, 1939.

The mechanism for driving the totalizer of each crossfooter (see Fig. 66) comprises a master wheel 550 mounted on a shaft 552 to rotate therewith but shiftable longitudinally of the shaft to select the denomination of the totalizer mechanism corresponding with the denomination in which the master wheel 304 is located with relation to the column register. The master wheel is driven by mechanism similar to that shown and described in Foothorap Patent No. 1,847,429, dated March 1, 1932, and in Foothorap Patent No. 2,032,691, dated March 3, 1936. The master wheel shaft 552 is journaled in bearings in the side plates 553 (see Fig. 2) of the crossfooter frame and is driven from the actuator shaft 320 through a gear 554 fixed to said shaft and meshing with a gear 556 journaled on and shiftable axially of the shaft 558 fixed to one of the side plates 553. When the machine is set for addition, the gear 556 is arranged to mesh with a gear 560 secured to the master wheel shaft. To set the crossfooter mechanism for subtraction, the gear 556 is shifted axially out of engagement with the gear 560 and into engagement with one section of a twin gear 562. The gear 562 is journaled on a shaft 564 secured to the adjacent side plate 553 and the other section of said gear is constantly in mesh with the gear 560, the gear 562 rotating idly when the machine is set for addition.

The value indicating wheels 566 are journaled on a shaft 568 mounted in the supporting plates 569 of the crossfooter frame and are arranged to be driven in opposite directions respectively, for addition and subtraction by toothed denominational number wheels 570 journaled side by side on the shaft 572 supported in the crossfooter frame plates 569 and connected with the value indicating wheels by intermediate gears 574 and 576. The master wheels of the two crossfooter registers are respectively shifted axially step by step to the right, looking at the front of the machine, into engagement successively with the wheels 570 to select the denominations corresponding to the denominations of the column register wheels successively engaged by the master wheel 304 by mechanism described later in this application.

Each crossfooter register is provided with a two-way transfer mechanism of the type illustrated and described in Patents No. 2,032,691 and No. 2,145,254, referred to above. This mechanism (see Fig. 29) includes a series of transfer heads 578, one for each denomination, mounted to rock upon a fixed shaft 580 to either side of a central normal position. Rocking movement of a transfer head is effected initially by the engagement of a wide tooth on the corresponding denominational number wheel 570 with a trip member 582 on the head arranged in the plane of said tooth to rock the head in one direction or the other at the time in the movement of said wheel at which a transfer is required. Movement of the head is continued in the direction in which it is initially rocked by actuating mechanism including a bell crank actuator lever 584 pivoted at 586 on the frame of the crossfooter, a spring 588 connected with the downwardly extending arm of the lever and urging the forwardly extending arm of the lever toward the axis of the head and a link connection 590 between the head and the latter arm of the actuator lever. The arrangement of each head and its actuating mechanism is such that, in the normal position of the parts, they assume a dead center position providing a toggle lock resisting the action of the spring 588, in which position they are yieldingly held by a pivoted detent 592 urged by a spring 594 against a roller 596 mounted on one end of the link 590. Combined carrying fingers and locking dogs 598 tensioned by springs 600 are mounted on each head and are each provided with a projection 602 arranged in the plane of the next higher denominational number wheel 570 to impart the carrying step of movement to said wheel upon the rocking of the head.

Transfer resetting mechanism for crossfooter registers (see Figures 29 to 33 inclusive)

After each of the transfer heads 578 is rocked into inclined position in the manner above described, to execute a carry, the head remains in this position until it is positively restored to the normal or upright position shown in Figure 29. The present machine is provided with mechanism which operates, immediately after the master wheel 304 leaves the units of cents position in a column register, to automatically restore the transfer mechanism of the crossfooter or crossfooters which may be then in operation. This mechanism comprises a rod or shaft 604 carried by spaced arms 606 secured to a rock-shaft 608 mounted to turn in bearings in the crossfooter frame. In restoring the transfer mechanism, the rock-shaft 608 is turned in a counter-clockwise direction (Figure 29) thereby swinging the rod 604 downwardly into engagement with the projecting ends 584ª of any of the actuator levers 584 which may have been swung upwardly out of normal position by the rocking of a transfer head, thereby swinging the horizontally extending arms of said levers downwardly therewith. This restores the links 590 and the transfer heads to their normal positions shown in Figure 29.

The mechanism for thus actuating the rock-shaft 608 comprises an arm 610 secured to the rock-shaft, a lever 612 fixed to a rock-shaft 614 mounted in bearings 615 on the frame of the carriage and links 616 connecting the arm 610 with the lever 612. The rock-shaft 608 is turned in the opposite direction by mechanism comprising an arm 615ª secured to said rock shaft, and a lever 617 pivoted at 619 on the frame of the crossfooter mechanism and connected with the arm 615ª by a link 621. The lever 617 is acted upon by a coil spring 623 which constantly tends to swing the same in a counter-clockwise direction (Figure 29) and thereby to turn the rock-shaft 608 in a clockwise direction.

The lever 612 is connected by a pitman 618 with a crank pin 620 fixed in a disk 622 journaled on a screw stud 624 threaded into a supporting bar or block 626 (see Fig. 31) secured to one of the side plates of the frame of the carriage, the pitman having a lost motion connection with the lever 612 by means of a stud 628 secured in the lever and engaging in a slot 630 in the pitman. The disk 622 constitutes one element of a one revolution clutch for actuating the pitman 618 and the arm 612. Pivoted at 636ª on the disk is a pawl 632 arranged to engage the teeth of a ratchet wheel 634 journaled on the hub of the disk 622 (see Figure 31). The pawl is acted upon by a leaf spring 638 which tends to swing the pawl into engagement with the teeth of the ratchet wheel 634. A gear wheel 640 is fixed to the hub of the ratchet wheel 634 and is continuously driven by means of a gear wheel 642 secured on an extension on the shaft 238 projecting beyond the adjacent side plate of the carriage.

The pawl 632 is held out of engagement with the ratchet wheel 634 during the movement of the master wheel 304 past the denominational number wheels 305 of a column register until the master wheel passes from the number wheel of the units of cents position by means of a detent lever 644 pivoted at 646 on a bracket 648 attached to the frame of the carriage, which lever carries a detent stud 650 arranged to engage the tail of the pawl as shown in Figure 29. The lever 644 is acted upon by a coil spring 652 which normally holds the lever yieldingly in position with the stud 650 in engagement with the pawl, the movement of the lever under the action of the spring being limited by means of a stop pin 654. When the master wheel 304 passes from the units of cents position in a register, the lever 644 is swung in a clockwise direction, (Figures 32 and 33) thereby disengaging the stud 650 from the tail of the pawl 632 to allow the same to be engaged with ratchet wheel 634 by the spring 630. Upon the engagement of the pawl with the ratchet wheel 634, the disk 622 is given a single rotation by said wheel and, during this movement of the disk, the lever 612 is swung downwardly by the pitman 618 thereby actuating the rock-shaft 608 and the rod 604 to restore the transfer mechanism. Immediately after the lever 644 is actuated to cause the stud 650 to release the pawl 632, said lever is, itself, released by its actuating mechanism and, when the tail of the pawl has passed the stud, the lever is swung back to normal position by the spring 652 thereby locating the stud in the path of the tail of the pawl. As continued rotation of the disk 622 engages the tail of the pawl with the stud 650, the pawl is again disengaged from the teeth of the ratchet wheel 634, and the disk 622 comes to rest.

The present machine is provided with mechanism for moving the master wheel 550 (Fig. 63) of each of the crossfooter mechanisms from denomination to denomination along the series of numeral wheels 570 during the passage of the master wheel 304 of the column register actuating mechanism through the several denominations of a column register, said first mechanism having the same general construction, arrangement and mode of operation of parts as the corresponding mechanism illustrated and described in Patent No. 2,145,254, and in part in Patent No. 2,032,691, referred to above. Each master wheel 550 is shifted by a master wheel carriage 655 (see Figs. 1 and 2) movable on a guide 657 in the direction of the axis of the wheel and connected by a link 659 to a forwardly extending crank arm 661 fixed to the upper end of a vertical rock-shaft 663 mounted to turn in bearings in the crossfooter framework. A rearwardly extending arm 665 is fixed to the lower end of said shaft and is connected by a link 654a with one of a pair of longitudinally slidable coupling bars 656 and 656a (see Figs. 29, 32, and 33), one for actuating each of the master wheel carriages. These bars are mounted side by side between a pair of laterally spaced housing plates 658 secured to the frame of the type carriage and said bars slide between upper and lower series of rolls 660. The rock-shafts 663 are each acted upon by a coil spring 662 connected, in one crossfooter, with the arm 661 and, in the other crossfooter, with the arm 665 which tends to swing the shaft in a direction to maintain the corresponding carriage 655 in starting position with the master wheel 550 in a position just above the first numeral wheel 570. These springs, acting through the connecting mechanism, urge the coupling bars 656 and 656a to the left (Figures 32 and 33). A coupling dog 666 is pivoted at 668 upon each of the coupling bars and is acted upon by a coil spring 670 which tends to swing the same upwardly into position to engage and interlock with a lug 672 on the base of each column register. A pin or stud 674 is mounted on each of the coupling dogs 666 and engages in an elongated slot 676 formed in the adjacent housing plate 658, the stud cooperating with cams formed at the opposite ends of the slot to swing the dogs downwardly out of engaging position with relation to the lug 672 on the column register.

Normally the dogs 666 lie in their upper or operative positions, one behind the other as illustrated in Figures 29 and 32, with the pins 674 located in the left hand portions of the corresponding slots 676 and adjacent to the respective cams at the ends of the slots (see Figure 32). When the carriage has advanced the printing point to a position within one letter space of a column position on the work sheet on which a number is to be printed or a position at which the master wheel 304 of the column register actuating mechanism is within one space of the first number wheel 300 on a column register, the coupling dog or dogs 666 which are in operative position will engage the lug 672 on the column register and will hold the corresponding slide or slides stationary during the continued advance of the carriage. Because of the relative movement of the carriage upon which the crossfooter mechanisms are mounted and the slides 656 and 656a, the corresponding master wheel or wheels 550 will be advanced from denomination to denomination across the corresponding series of numeral wheels 570. When the master wheel 304 advances one step beyond the lowest denominational order of a column register, the pin on each coupling dog, which is engaged with the lug 672, is engaged by the cam at the right hand end of the corresponding cam slot 676 and the dog is depressed out of engagement with the lug thereby releasing the corresponding coupling slide. Each rock-shaft 663 is then swung by the corresponding spring 662 in a direction to carry the master wheel 550 back to its normal or starting position and the corresponding coupling slide is moved back to the left to its starting position shown in Figure 32. Figure 33 shows the coupling slides and associated parts in the positions which they assume when the coupling dogs have disengaged the lug 672 on the column register and the slides have been moved part way back to their starting positions.

The clutch control detent lever 644 is swung in a clockwise direction (Figures 32 and 33), to throw the one revolution clutch into operation to actuate the resetting mechanism for each of the crossfooters, by the retracting movement of either of the coupling slides, following the release of the coupling dog from the lug 672, under the action of either of the springs 662. The mechanism for swinging the detent lever 644 from the movement of the slides, comprises a connecting lever 678 pivoted at 680 on the detent lever 644 and connected by the spring 652 with the bracket 648, this spring normally holding the connecting lever in the position shown in Figures 32 and 33 with relation to the detent lever with a projection 682 on the connecting lever in engagement with a stop pin 684 fixed to the detent lever. Thus, with the levers in the relative positions shown in these figures, the spring 652 tends to swing the detent lever 644 in a counter-clockwise direction. To enable the connecting lever 678 to be actuated from the coupling slides, the lever is provided with two downwardly extending projections 686 and 686a, the projection 686a being arranged in front of and extending below the projection 686 as shown clearly in Figures 29, 32 and 33. The projection 686a is arranged to be engaged by a connecting pin 688 secured in the slide 656 and extending forwardly therefrom through a slot in the forward housing plate 658. The projection 686 is arranged to be engaged by a connecting pin 688ª fixed in a bar 690 rigidly secured to the slide 656ª, said pin also extending forwardly from the slide through a slot in the forward housing plate 658. The length of the pin 688ª is such that it does not project forwardly far enough to engage the projection 686ª as shown in Figure 29. In order to enable the projections 686 and 686ª to by-pass the pins 688 and 688ª when the coupling slides are held stationary during the advance of the carriage, each of the projections is provided with a cam face 691 arranged to engage the corresponding pin.

The above described mechanism has the following mode of operation: Referring to the mechanism controlled by the coupling slide 656, when the slide is in its normal left hand position, with relation to the housing plates 658 as shown in Figure 32, the connecting pin 688 is located in the position shown in this figure with relation to the projection 686ª on the connecting lever 678. When the slide is held stationary by the engagement of the coupling dog 666 with the lug 672 on a column register, the connecting pin 688 is engaged with the cam 691 on the projection 686ª and the laterally extending arm of the connecting lever 678 is lifted to allow the pin to pass the projection after which the connecting lever is swung back to its normal position by the spring 652, these movements of the lever being produced without affecting the detent lever 644 which remains in its normal clutch disengaging position. When the coupling slide 656 is released by the action of the coupling dog, and the slide is moved back to the left by the slide actuating springs (Figures 32 and 33) the connecting pin 688 engages the right hand side of the projection 686ª thereby swinging the detent lever 644 into the position shown in Figure 33 to set in operation the one revolution clutch. During this movement of the detent lever 644, the connecting lever 678 swings as a unit therewith, thereby carrying the projection 686ª upwardly beyond pin 688 and the pin is restored to its normal position shown in Figure 32, by the movement of the coupling slide. After the pin 688 passes beyond the connecting lever 678, the levers 644 and 678 are restored to their normal positions as shown in Figure 32 by the action of the spring 652 so that the stud 650 on the lever 644 will again engage the tail of the pawl 632 to disengage the clutch as the disk 622 completes a revolution.

The one revolution clutch is tripped in the same manner by the action of the coupling slide 656ª, the pin 688ª on this slide acting on the connecting lever 678 to swing the detent lever 644 to trip the clutch during the retracting movement of the slide.

The one revolution clutch shown in Figure 29, is arranged to reset the transfer mechanisms of both the cross-footers in the event that the several transfer mechanisms have been operated during the passage of the carriage through the zone of a column register. To this end the rockshaft 614 is extended across the rear of the type carriage and one of the arms or levers 612 is attached to each end of the shaft. Mechanism connected with each of these levers having substantially the same construction as that shown in Figure 29 is provided for restoring the transfer mechanism of each crossfooter. In the present application it has been considered necessary to show this mechanism only as applied to the left hand crossfooter.

The present machine is provided with the usual cam lever 692 (see Fig. 2) pivoted at 694 on the frame of the carriage and having a cam arranged to engage the roller on the forward end of the transfer resetting slide 302 (see Fig. 3) of a column register during the return movement of the carriage to reset the transfer mechanism of the register. This lever is provided with a slot which receives the end of an arm 696 on the lever 439 so that the lever 692 is depressed below the slide 302 during the advance of the carriage past the zone of a register. This construction is shown in Foothorap Patent No. 2,145,254. The cam or cam plate 444 on the lever 442 is arranged to be depressed below the plate 446 (see Fig. 3) on the base of the register during the advance of the carriage. During the return of the carriage, the cam plate 444 is lifted above the plate 446 on the register by engagement of the under side of the cam plate 444 with the plate 446 and the cam plate rides along the upper side of the plate. When the carriage is moved in a return direction, it is important that the carriage shall not be stopped at a point in the midst of a register zone and an accounting operation started from this point since the transfer mechanism of the register which may have been actuated during the preceding operation may not then be completely reset and the differential actuator mechanism will not then be rendered operative by the depression of the numeral keys. To prevent letter space movement of the carriage when the carriage has been moved in a return direction only partially through the zone of a register and thereby to prevent the operator from proceeding with the writing of a number to be computed, the plate 446 on the register is provided, on its upper side, with a series of teeth 700 (see Figure 18) arranged to be engaged by the forward edge of the cam plate. This construction is shown in the patent to Dench, No. 1,183,280, dated May 16, 1916.

*Driving mechanism (see Figures 22 to 28 inclusive)*

The various operating parts of the machine are driven from the electrical driving motor 32 which is arranged to be in continuous operation while the machine is in use. The connections through which shaft 56 is driven from the motor 32 have been described above. The toothed or fluted shafts 238 and 350 are driven through driving connections from the shaft 56. In order to enable the force with which the several type engage the work sheets to be varied, to vary the type impressions, the driving connections between the shaft 56 and the toothed shaft 238 are constructed and arranged to enable the toothed shaft to be driven at varying speeds.

In the present construction the driving connections between the shaft 56 and the shafts 238 and 350 comprise a series of pulleys 702, 702ª, 702ᵇ of different sizes journaled on the shaft 56, a pulley 703 journaled on a hollow bearing 706 secured in the frame plate 48 and having a series of steps 704, 704ª and 704ᵇ of different sizes arranged in reverse order, and a series of belts 708, 708ª, 708ᵇ passing about the corresponding pulleys and steps of the two series. The pulleys 702, 702ª and 702ᵇ are held longitudinally on the shaft 56 between a collar 710 secured in the frame plate 48 and a collar 712 secured on the outer end of the shaft and the pulleys are held in slightly spaced relation by spacing collars 714 mounted on the shaft. The pulleys 702, 702ª and 702ᵇ are arranged to be selectively connected to the shaft 56 for rotation therewith by means of a resilient connecting or shift bar 716 mounted in a suitable groove 718 in the shaft and provided at its left hand end (Figures 25 and 26) with a rounded projection 720 arranged to engage selectively in the respective grooves 722 formed in the several pulleys. The shift bar 716 is secured to a carrying ring 723 supported for longitudinal movement on the shaft 56 and said ring is shifted longitudinally of the shaft to shift the connecting bar 716 by means of a hand lever 724 pivoted at 726 on the line space frame and carrying at its rear end a pin 728 engaging in a groove in the ring. In order to hold the ring and the connecting bar in adjusted position, a detent lever 730 is pivoted at 732 on a hanger secured to the plate 48 and is acted upon by a coil spring 734 which tends to swing the same forwardly as shown in Figure 22. This detent lever is provided with a series of recesses 736 arranged to receive a pin 738 mounted on the hand lever 724. By an adjustment of the hand lever the pulleys 702, 702ª and 702ᵇ may be selectively connected with the shaft 56 to drive selectively the pulley 703. The belts 708, 708ª and 708ᵇ are respectively acted upon by idle pulleys 740 journaled on a shaft secured at one end to the frame plate 48.

The pulley 703 is arranged to drive the shaft 744 preferably square in cross section and supported at one end by means of a plate 746 secured to the outer side of pulley 703 and having a square opening in which the shaft 744 fits. The other end of the shaft 744 is journaled in a bearing formed in the forward end of an arm 748 secured to the rear rail 10 on the line space frame as shown in Figure 3. The shaft 744 is connected in driving relation to a pulley 750 supported upon a suitable bearing on the carriage 20 and movable in opposite directions with the carriage, the connection between the pulley and the shaft 744 being arranged to permit this relative movement. As shown in Figure 24, the pulley 750 is journaled on a hollow bearing member 752 secured in a downwardly extending arm on a bracket 754 attached to the carriage 20 and the pulley is provided with an end wall 756 having a square opening through which the shaft 744 passes. In order to cause the pulley to travel axially with the carriage at all times during the advance and return movements of the carriage, a retaining arm 758 is secured to the bracket 754 and is arranged to engage in a groove in the pulley.

The pulley 750 is connected by belts 760 with a pulley 762 secured to the end of the shaft 238 extending beyond the corresponding side plate of the carriage at the left hand end thereof. Upon the shaft 238 is fixed a gear 764 which meshes with a gear 765 attached to the end of the shaft 350 extending beyond said side plate.

Through the connections described, the shaft 238 may be selectively driven from the motor at three different speeds determined by the adjustment of the hand lever 724. When a heavy impression of the type upon the work sheets is desired, the hand lever is adjusted to connect the pulley 702 with the shaft 56 to drive the shaft 238 at a relatively high speed. In a corresponding manner when a medium or light impression of the type on the work sheet is desired, the hand lever is adjusted respectively to connect the pulley 702ª or the pulley 702ᵇ with the shaft to drive the shaft 238 at medium speed or a relatively low speed.

The shaft 14 is driven in opposite directions from the shaft 60 under control of the usual knee levers to advance and retract the line space frame over the platen. The driving connections intermediate between the shaft 14 and the shaft 60 comprise a gear 766 (see Fig. 22) fixed to the shaft 14 and meshing with a gear 768 fixed to a clutch sleeve 770 surrounding and rotatably mounted on the shaft 60 and held from longitudinal movement thereon by means of an arm 772 secured to the line space frame and engaging in a groove in the clutch sleeve. Said mechanism also includes a gear 774 fixed to the shaft 14, an idle pinion 776 journaled on a pin 778 secured in an arm 780 attached to the line space frame, said pinion meshing with the gear 774. The pinion also meshes with a gear 782 fixed to a clutch sleeve 784 rotatably mounted on the shaft 60 and held from longitudinal movement thereon by means of the arm 780 which engages a groove in the clutch sleeve. A double clutch member 786 is fixed to the shaft 60 and is arranged to be engaged selectively with the clutch sleeve 770 or with the clutch sleeve 784 by the longitudinal movement of the shaft 60.

The shaft 60 is moved longitudinally to engage said clutch member 786 selectively with said clutch sleeves to drive the line space frame forwardly or rearwardly by means of the usual knee operated bail. This bail, shown in Figure 22 and indicated at 788 extends along the left hand side rail of the platen frame substantially parallel therewith and is arranged to engage in a peripheral groove in the disk 68 which is secured to the left hand end of the shaft 60 as shown in Figure 22. This bail is mounted in the usual manner upon arms secured to and extending upwardly from a rock-shaft arranged along side the left hand side bar of the platen frame and is operated from knee levers located on opposite sides of said frame. The construction for supporting the bail, the knee levers and the construction for swinging the bail in opposite directions from the movement of the knee levers preferably have substantially the same construction, arrangement and mode of operation of parts as the corresponding mechanism illustrated and described in the patent to Foothorap, No. 1,904,127, and is not shown or described in this application.

As stated above, the machine is provided with an escapement mechanism of the type illustrated and described in Patent No. 1,203,519. This mechanism is also shown and described in applicant's Patent No. 2,239,023, dated April 22, 1941.

When the universal bar 284 is depressed by the downward swinging movement of an intermediate lever 200 produced in actuating a type bar to print, the spacing dog or pawl 278 (see Figs. 2 and 38) is swung into operative position and the holding dog 277 is swung out of operative position thereby allowing the escapement wheel 276 to execute a part of the escapement movement. When the universal bar 284 moves back upwardly following the upward movement of the intermediate lever 200, the spacing dog 278 is swung out of operative position and the holding dog 277 is swung back into operative position thereby allowing the escapement wheel and the carriage to execute the second step of an escapement movement. The parts are preferably constructed and arranged so that the first step in the escapement movement of the carriage is relatively small and that the greater part of the escapement movement occurs in the second step.

*Escapement locking mechanism (see Figures 50 to 53 inclusive)*

The present machine is provided with mechanism which operates so that, with the machine adjusted for computing, when the carriage is within a register zone, and a numeral key is depressed to throw the corresponding differential actuator rack 324 into operation, the first step in the escapement movement of the carriage will take place but that the escapement mechanism is locked to prevent the second step in the escapement movement of the carriage until the differential actuator rack has completed its operation.

The mechanism for locking the escapement to prevent the second step in the escapement movement from taking place until an actuator rack has completed its operation is shown particularly in Figures 50 to 53 inclusive. As shown in these figures, an arm 790 is secured to and preferably formed integral with one of the arms 282 from which the universal bar 284 is suspended and is provided, at its upwardly extending end, with a stud 792 arranged to be engaged by the hooked end of a locking lever 794 pivoted at 796 on the carriage. The locking lever is acted upon by a coiled spring 797 which tends constantly to swing the same into locking position. When the carriage is out of the zone of a register, the locking lever 794 is held substantially in the unlocking position shown in Figure 50 out of the path described by the stud 792 during the back and forth movements of the arm 790 produced by the type bar mechanism in operating the escapement. The locking lever is then held in this position by means of the arm 380 fixed to the rock-shaft 372 which engages a rearwardly extending contact finger 779 secured to an arm on the locking lever 794. With the machine adjusted for computing, when the carriage moves into the zone of a register, the arm 380 is swung upwardly by the movement of the rock-shaft into substantially the position shown in Figures 51 and 52. The locking lever 794, however, does not then swing into locking position under the action of the coil spring 797 but is held out of locking position until a differential actuator rack is moved upwardly in the first part of its operative movement.

The mechanism for holding the locking lever from swinging into locking position when the type carriage has moved into the zone of a register, but before the actuation of a differential actuator rack comprises a detent lever 800 pivotally suspended at 802 on the forward end of an arm 804 pivoted coaxially with the bail 332 and secured in any suitable manner to said bail to swing therewith. The detent lever 800 is acted upon by a coil spring 806 which constantly tends to swing the same to the right, Figures 50, 51 and 52. The detent lever is provided with two spaced arms 808 and 810 of different lengths connected by a bridge 812. The shorter arm 808 of the lever is arranged to engage a laterally extending projection 814 (see Figure 53) formed on the locking lever 794. When the locking lever is held in its normal or unlocking position by the arm 380, the projection 814 on the locking lever is slightly spaced from the arm 808 of the detent lever. Starting with the parts in their normal positions, as shown in Figure 50, as the arm 380 is swung upwardly in the manner above described, the locking lever 794 is swung slightly by the action of its actuating spring to engage the projection 814 thereon with the arm 808 of the detent lever, the detent lever then holding the locking lever out of locking position.

The detent lever is actuated to release the arm 808 from the locking lever by means of a bail 816 (see Figure 2) extending across the carriage and having its ends mounted to turn in bearings in the side plates 239 thereof. The bail is acted upon by a coil spring 817 (see Figure 7) which tends to swing the same rearwardly and the rearward movement of the bail is limited by a stop plate 819 secured to the cover plate 226. This bail is provided with a contact plate 818 arranged to engage the longer arm 810 of the detent lever. When any one of the numeral type bar mechanisms is actuated, the bail is engaged by a contact face 820 (see Fig. 50) formed at the upper end of the corresponding arm 386 and the bail is thereby swung forwardly into engagement with the arm 810 of the detent lever to swing the lever forwardly therewith. In the event that the locking lever 794 is then held out of locking position by the detent lever, as in the case when the type carriage is in the zone of a register, the movement of the detent lever under the action of the bail carries the arm 808 thereof out of engagement with the locking lever and allows the locking lever to be swung into locking position. The downward swinging movement of the intermediate lever 200 actuates the universal bar 284 to swing the arm 790 substantially into the position shown in Figure 51 in which the stud 792 is above the shoulder at the lower end of the locking lever so that it will be caught by the locking lever to locking the escapement mechanism as the intermediate lever swing back upwardly. The escapement mechanism is operated to cause the carriage to execute the first step of its escapement movement during the downward movement of the intermediate lever, but the second step in the escapement movement is prevented until the operation of one of the differential actuator rack bars.

Figure 51 shows the positions of the parts at this point in the operation of the mechanism.

The upward swinging movement of the intermediate lever 200, during the latter part of the actuation of the type bar mechanism, swings the arm 386 rearwardly to release the bail 816. Upon the release of the bail, the bail and the detent lever 800 are swung rearwardly by the action of the springs 806 and 817, thereby carrying the arm 808 of the detent lever against the forward face of the projection 814 on the locking lever (see Fig. 53). The locking lever remains in locking position to lock the escapement until the last part of the operative movement of the differential rack bar which is thrown into operation by the depression of a numeral key.

As the bail 332 is swung upwardly by the operative movement of a differential rack bar, the arm 804 and the detent lever 800 are carried upwardly therewith, and, when the shorter arm 808 of the detent lever reaches a point above the projection 814 on the locking lever, the detent lever is swung rearwardly by its actuating spring thereby placing said arm 808 above the projection on the locking lever as shown in Figure 52. Then as the bail is swung downwardly during the downward movement of the differential rack bar, the arm 808 on the detent lever swings the locking lever out of locking position with relation to the stud 792 allowing the escapement mechanism to operate under the action of the spring 207 to cause the carriage to execute the second step in the escapement movement.

There is a possibility that, when the carriage is in the zone of a register and a numeral key has been depressed to throw the corresponding type bar actuating mechanism into operation, the said actuating mechanism might be again thrown into operation by a second depression of the key before the corresponding differential actuator has completed its cycle unless means is provided to prevent such a misoperation. Thus, by short stroking, the driving link 228 of the type bar mechanism might be swung forward to engage the corresponding pawl with the power shaft 238 by a second depression of the key when said link is at some distance below the upper limit of its movement. In addition to making two type impressions at the same point on the paper, this second operation of the type bar mechanism might result in improper action of the escapement mechanism or in the jamming or locking of the differential mechanism. The present machine is provided with means for delaying the return of a numeral key lever after the corresponding key is depressed to prevent such a misoperation (see particularly Figures 3, 41 and 42). This means comprises a contact plate 822 secured to the slotted arresting plate 240.

This contact plate is attached to the arresting plate by means of screws 824, a spacing plate 826 being interposed between the arresting plate and the contact plate to locate the contact plate in the desired position. When the type bar mechanism is in its normal position, the rear ends of the drag links 244 lie above the contact plate as shown in Figure 3. Upon the depression of a numeral key to engage one of the pawls 234 with the fluted shaft 238, the rear end of the corresponding drag link is carried forward beyond the contact plate 822 and when the driving link 228 is moved downwardly, through the engagement of the shaft with the pawl, the rear end of the drag link is carried down in front of the contact plate substantially as shown in Figure 41. Then, upon the release of the key, the rear end of the drag link engages the contact plate and prevents the return of the key lever until the driving link 228 approaches its upper position. At this time the drag link is engaged by a pin 250 fixed in the driving link 228 and the drag link is lifted to disengage the rear end thereof from the contact plate allowing the key and the drag link to be restored to their normal positions. While a key is held depressed by the engagement of the rear end of the drag link with the contact plate, a second type bar actuation cannot, of course, be produced by the operation of this key.

Delay in the return movement of letter and character key levers is not required, inasmuch as there are no differential mechanisms corresponding to these keys. The plate 822 is therefore provided with slots 822ᵃ (Fig. 42) to receive the rear ends of the drag links 244 connected with the letter and character key levers and the plate 822 therefore is not engaged by the ends of these drag links.

The machine is preferably provided with back space mechanism preferably having substantially the same construction as the back space mechanism illustrated and described in the patent to Foothorap, No. 1,203,520, dated October 31, 1916. This back space mechanism which is not shown in this application, is operated from the usual back space key lever.

*Mechanism for preventing return movement of carriage and for locking carriage return mechanism while carriage is in zone of a register (see Figures 2, 39, and 40)*

The present machine is provided with mechanism for preventing return movement of the carriage or a back spacing movement of the carriage when the machine is set for computing and the carriage is located in the zone of a register. This mechanism is shown particularly in Figures 39 and 40. The machine is provided with a gear 832 mounted on a short shaft 834 journaled in bearings in brackets 836 (one of which is shown in Figure 39), secured to the frame of the carriage, this gear forming part of a ribbon driving mechanism having the same general construction as the corresponding mechanism shown in the patent to Foothorap, No. 1,286,573, dated December 3, 1918. This gear meshes with the escapement rack bar 273 which is secured to the line space frame so that the gear rotates during either the advance or return movement of the carriage. In order to lock this gear against rotation when the carriage is in the zone of a register, a pawl 838 is pivoted at 840 on one of the brackets 836 and is arranged to engage the teeth of the gear. The mechanism for actuating the pawl comprises a lever 842 also pivoted at 840 on said bracket and carrying a pin 844 against which an arm on the pawl is normally held by a tension spring 846 to hold the pawl in position with relation to the lever 842. Said lever is acted upon by a coil spring 848 which tends to swing the lever in a clockwise direction (Figure 39). The lever 842 is connected by means of a link 850 with a bell crank lever 852 pivoted at 854 on a bracket attached to the deck 180 of the carriage and this lever is connected by a link 856 with a second bell crank lever 858 secured to a rock-shaft 860 mounted to turn in bearings in the bracket 855 and in a second bracket 862 secured to the deck of the carriage. Upon the rear end of the shaft 860 is fixed a locking arm 864 for the carriage return mechanism and the movement of the lever 842, the rock-shaft 860 and the parts connecting said lever with the rock-shaft under the action of the spring 848 is limited by a pin 866 mounted in the bracket 862 and arranged to be engaged by the arm 864.

The arm 864, when swung into locking position as shown in Figure 40, is arranged to be engaged by a projection on a collar 868 secured on the rock-shaft 128 of the carriage return mechanism, this shaft being rocked in the direction indicated by the arrow in said figure to throw the carriage return clutch into engagement. The other arm of the bell crank 858 is connected by a link 870 with an arm 872 on the rock-shaft 372.

When the carriage is out of the zone of a register, the arm 872 occupies its lowered position, the locking pawl 838 is out of engagement with the gear 832 and the locking arm 864 is out of blocking position with relation to the projection on collar 868 all as shown in Figure 39.

As clearly indicated in the above description, when the machine is set for computing, upon the entry of the carriage into the zone of a register, the rock-shaft 372 is turned in a direction to lift the arm 872. The locking pawl is thereby swung into locking engagement with the gear 832 and the locking arm 864 is swung into blocking position with relation to the shoulder on collar 868 as shown in Figure 40. The engagement of pawl 838 with gear 836 will prevent back spacing movement of the carriage 20 but will permit advance movement of the carriage, the pawl swinging in a clockwise direction on its pivot against the action of the spring 846 during such advance movement. The locking arm 864, when in the position shown in Figure 40, will prevent the turning movement of the rock-shaft 128 required to engage the carriage return clutch so that the carriage return drive mechanism cannot be rendered operative to return the carriage.

When the carriage leaves a register zone, the rock-shaft 372 is released, the arm 872 is depressed and the parts are restored to their normal positions, as shown in Figure 39 by the action of the coil springs 378 and 848.

Clear signal printing mechanism (see Figures 62 to 67 inclusive)

The machine is provided with two clear signal printing mechanisms, one for the right hand and one for the left hand crossfooter. These mechanisms have substantially the same construction and both mechanisms will be clearly understood from the description of the mechanism for the right hand crossfooter which is shown particularly in Figures 62 to 67 inclusive. The mechanism for the right hand crossfooter comprises a clear signal type bar and mechanism for actuating the same from the fluted shaft 238 all of which have substantially the same construction as the letter and figure type bars and the respective mechanisms for actuating these type bars from the fluted shaft. The key lever and the mechanism actuated by the key lever for connecting the type bar operating mechanism with the fluted shaft also have substantially the same construction as the corresponding mechanism for the letter and numeral type bars.

The mechanism for actuating the clear signal type bar comprises a longitudinally movable driving link 228ª (Fig. 63) and a pawl 234ª mounted on said link and arranged to be engaged with the fluted shaft 238 by the lateral movement of the driving link. The connections between the driving link and the type bar (not shown) have substantially the same construction as the corresponding mechanism illustrated in Figure 3. The mechanism for swinging the link comprises a drag link 244ª connected with the upwardly extending arm of the clear signal key lever 246ª by a pin-and-slot connection as in the construction shown in Figure 3 and by the coil spring 256ª and having a shoulder arranged to engage a pin 250ª on the driving link. The key lever 246ª is pivoted on the shaft 258 and is provided with a forwardly extending arm upon which is mounted a key 260ª.

When the value indicating wheels of the right hand crossfooter are out of zero position, movement of the clear signal key lever 246ª to connect the drive link 228ª with the fluted shaft is prevented so that a clear signal cannot then be printed. This preventing mechanism is arranged to allow the movement of the clear signal key lever to throw the operating mechanism for the clear signal printing type bar into operation when the value indicating wheels of the crossfooter are located at zero positions. The mechanism for thus controlling the movement of the clear signal key lever comprises a bell crank detent lever 873 pivoted at 874 on a downwardly extending portion of the cover plate in the slots in which the several key levers engage and the downwardly extending arm of said bell crank is provided with an inclined shoulder 875 arranged normally to be positioned below the key lever as shown in Figure 62 when the parts are in their normal positions. The horizontally extending arm of the bell crank 873 is arranged to engage in an opening in an arm 876 secured to a rock-shaft 877 mounted to turn in bearings in the crossfooter frame and said arm is acted upon by a coil spring 878 which tends to swing the arm in a counterclockwise direction (Figure 63) and to maintain the parts substantially in the positions shown in Figure 62. Fixed on the rock-shaft 877, are a series of feeler or contact arms 879 arranged to enter between the intermediate gears 574 and engage, respectively, collars 880 secured to the several gears so as to turn therewith. Each of these collars is cut away at one point so as to form a recess to receive the projection 881 formed at the upper end of each of the feeler arms 879. These recesses are located with relation to the corresponding intermediate gears 574 so that they lie in position to receive the projections 881 on the several feeler arms only when the corresponding value indicating wheels are in zero positions.

When one or several value indicating wheels are out of zero position, the peripheries of the corresponding collars 880 are in position to be engaged by the projections 881 on the feeler arms 879. If downward pressure is exerted upon the clear signal key 260ª, this tends to swing the bell crank lever 873 in a counter-clockwise direction (Figures 62 and 64) and to swing the arm 876, the rock-shaft 877, and the feeler arms 879 in a clockwise direction (Figure 63). If any one of the value indicating wheels is out of zero position when pressure is exerted upon the key 260ª, movement of the detent bell crank 873, the arm 876, the rock-shaft 877 and the feeler arms 879 is prevented by the engagement of one or more of the feeler arms with the peripheries of one or more of the collars. The detent lever 873 therefore prevents movement of the key lever to throw the type bar actuating mechanism into operation. When all of the value indicating wheels of the crossfooter are in zero positions and pressure is exerted upon the clear signal key, the recesses in the collars 880 are in positions to receive the projections 881 on the feeler arms allowing said arms, the rock-shaft 877, the arm 876 and the detent lever 873 to move into the positions shown respectively in Figures 64 and 65. This allows the key lever to be actuated to throw the type bar operating mechanism into operation.

Locking means for type bar actuating mechanism (see Figures 34, 35, 36, 42, 46, 47, 49, and 50 to 61 inclusive)

The machine is provided with means for locking the type bar actuating mechanisms out of operation under various conditions to prevent misoperations of the machine. This locking mechanism comprises a locking bail 882 consisting of a plate extending across the carriage and arranged to engage the upper ends of the driving links 228. This bail is mounted upon a bar 883 having pintles 884 at its ends respectively engaging in bearings in the end plates 239 of the carriage to support pivotally the bail. The bail is normally held in its upper or unlocking position as shown in Figure 3 in which it is not engaged by the upper ends of the driving links 228, when these links are swung forwardly by the depression of a key to throw the type bar operating mechanism into operation, the upward movement of the bail being limited by its engagement with a stop bar 886 secured to the frame of the carriage. The bail is acted upon by a coil spring 887 connected with an arm 887ª secured to the bail, which tends to swing the bail downwardly into locking position, in which its rear edge is located to be engaged by the upper ends of the driving links 228 to prevent these links from being swung forwardly into type bar actuating positions as shown in Figs. 42 and 61. The movement of the bail under the action of the spring is limited by a stop pin 887ᵇ secured in the adjacent frame plate 239 and arranged to be engaged by a projection on the arm 887ª.

*Mechanism for controlling locking bail from differential actuator mechanism (see Figures 50, 51, and 52)*

Mechanism is provided for causing the locking bail to swing downwardly into locking position after the driving mechanism for a numeral type bar has been thrown into operation by the depression of a numeral key and the corresponding differential actuator rack 324 has been engaged with the fluted driving shaft 350 to lock the driving links 228 corresponding to all other keys out of operation until the actuator rack has substantially completed its operative movement. This prevents the driving mechanism for another type bar from being thrown into operation before the completion of the cycle of the differential mechanism.

The mechanism for thus controlling the action of the locking bail 882 comprises a control lever 888, shown in Figs. 50, 51, and 52 and also in Figs. 60 and 61, pivoted upon a stud 890 secured in one of the side plates 239 of the carriage and engaging in a slot 891 in said lever. The lever 888 is acted upon by a coil spring 892 of considerably greater strength than the spring 887 for the locking bail which normally maintains the lever in its upper position with the stud 890 in engagement with the lower end of the slot 891. The control lever 888 is provided with a contact arm 893 arranged to engage the under side of the locking bail 882 and with a second contact arm 894 arranged to engage the under side of the bail 332 of the differential mechanism. When all of the differential actuator racks are in their lowered positions and the differential bail 332 operated by said racks is also in lowered position, the control lever 888 is normally held substantially in the position shown in Figures 3 and 50 by the engagement of the differential bail 332 with the arm 894 of the lever. The stud 890 then occupies the lower end of the slot 891 and the locking bail 882 is held in its upper or unlocking position by the engagement of the arm 893 on the control lever 888 with the under side of the bail. When an actuator rack is engaged with the fluted driving shaft 350 and the rack is moved upwardly under the action of said shaft, carrying the differential bail 332 upwardly therewith, the movement of said bail allows the control lever 888 to swing in a counter-clockwise direction (Figures 3 and 50) about the stud 890 thereby allowing the locking bail 882 to be swung downwardly into locking position as shown in Figure 52. The locking bail remains in locking position until the actuator rack approaches the end of its downward movement. At this time, the differential bail 332, as it swings downwardly with the rack, again engages the arm 894 of the control lever 888 and swings said lever in a clockwise direction about the stud 890 thereby swinging the locking bail 882 back upwardly to unlocking position.

By the locking mechanism above described, after the differential mechanism for entering a given digit in a column register has been set in operation by the action of the type bar actuating mechanism resulting from the depression of a corresponding numeral key, the connection of the driving mechanism for any other type bar with the driving shaft 238 during the cycle of the actuator mechanism is prevented. This prevents the differential mechanism corresponding to any other numeral type bar from being set in operation during the cycle of the differential mechanism which is in action.

*Mechanism for controlling locking bail from carriage return mechanism (see Figures 34, 35, 36, 49, 60, and 61)*

The locking bail 882 is also swung downwardly into locking position during the return movement of the carriage to prevent the actuation of a type bar mechanism at this time. The mechanism for controlling the locking bail to produce this action comprises an intermediate bell crank lever 897 (see Figure 49) pivoted on the stud 890 and having a pin 898 secured in one arm thereof for engaging the arm 893 of the control lever 888. To the other arm of the bell crank lever 897 is secured a pin 899 arranged to be engaged by a cam face formed on an arm 900 of a vertically movable control bar 901. The control bar 901 is pivotally supported on a stud 902 secured in an arm 903 of a lever 904 and the control bar is guided at its upper end by means of the stud 890 which engages in a slot 905 in the bar. The construction of the lever 904 is clearly shown in Figure 49. The lever is provided with spaced side members to receive the ends of a pivot shaft 906 supported in the spaced side plates of a bracket 907 secured to the upper side of the deck 180, the shaft being held from longitudinal movement in the bracket by collars 908 secured to the shaft. The lever 904 is acted upon by a coil spring 909 which tends to swing the lever in a clockwise direction (Figure 35) or in a direction to depress the arm 903 thereof and the movement of the lever under the action of the spring is limited by the engagement of a pin 910 secured in the arm 903 thereof with a bar 911. The lever 904 is provided with a downwardly extending arm 912 arranged to be engaged by a locking plate or lever 913 (see Figures 34, 35 and 36) pivoted at 914 to the under side of the deck of the carriage and acted upon by a coil spring 915 which normally holds the same in its rearward position. The locking lever or plate 913 is provided with a rearwardly extending projection 916 arranged to be engaged by the carriage return bail 124.

When the carriage return bail 124 is swung forwardly by the depression of the key lever 146, or the key lever 152, to engage the carriage return clutch, the lever 913 is swung forwardly therewith, and, through the engagement of the latter lever with the arm 912, the lever 904 is swung in a direction to raise the control bar 901. By this movement of the bar, the intermediate lever 897 is swung in a counter-clockwise direction (Figures 60 and 61) by the action of the cam face formed on the arm 900 of said bar against the pin 899 and the control lever 888 is swung therewith in the same direction about the point of engagement of the arm 894 with the differential bail 332 by the action of the pin 898 on the arm 893 of said lever, the slot 891 permitting this movement of the lever. This movement of the control lever allows the locking bail 882 to be swung downwardly by its actuating spring into locking position, as shown in Figures 42 and 61.

When the carriage return bail is swung rearwardly at the end of the carriage return movement by the engagement of the bar 168, with the cam 170 on the bail, the lever 913 is swung rearwardly to its normal position by the action of the spring 915 and the lever 904 is swung back to normal position by the action of the spring 909 thereby lowering the control bar. During the downward movement of the control bar, the control lever 888 is swung back in a clockwise direction about the point of engagement of the arm 894 with the differential bail 332 by the action of the spring 892 thereby restoring the locking bail 882 to unlocking position as shown in Figure 60.

*Mechanism for controlling locking bail from decimal space mechanism (see Figures 54 to 59 inclusive)*

In order to prevent a type impression while the carriage is executing the decimal space movement, the machine is provided with mechanism for locking the type bar actuating mechanisms out of operation at this time. This mechanism comprises (see Figures 54 to 59 inclusive) a lever 917 pivoted at 918 on a downwardly extending portion of the cover plate 226 and having a lateral projection at its right hand end arranged to be engaged by the decimal trip lever 486 which lies above the same as shown in Figures 2 and 57. The lever 917 is acted upon by a spring 919 which normally holds the same in the position shown in Figure 2 and in full lines in Figure 57 with said projection engaging the under side of the decimal trip lever which then occupies its upper position. The left hand end of the lever 917, is formed with a rearwardly extending arm 920 which engages in a grove 921 in a rod 922 mounted for vertical movement in a bearing in the cover plate 226. The upper end of this rod passes loosely through a relatively large opening in a lateral projection 923 in a retaining lever 924 pivoted on a stud 925 secured in the adjacent side plate 239 of the carriage and a coil spring 926 surrounding the rod 922 and interposed between the cover plate and the projection 923 normally holds said lever in position with said projection in engagement with a nut 927 on the rod and also tends to move the rod upwardly in its bearing in the cover plate. The retaining lever 924 preferably has substantially the construction shown in Figures 58 and 59 and is mounted upon an enlarged portion of the stud 925 as shown in Figure 59. A control slide 928 is mounted for limited sliding movements on the stud 925 and upon a similar stud 929 secured in the adjacent side plate of the carriage and engaging in slots 930 formed in the slide, the slide being spaced from the adjacent side plate by means of spacing collars 931 as shown in Figure 59. This construction allows the control slide to slide upwardly and downwardly in an inclined direction substantially parallel with the direction of these slots. The control slide is acted upon by a coil spring 932 which tends to move the same to its upper position as shown in Figure 56. The movement of the control slide under the action of said spring is controlled by the stud 792 on the arm 790 connected with the escapement mechanism which is arranged to engage a spring plate 933 attached to the slide. This arm and stud swing in a counter-clockwise direction from the position shown in full lines in Figure 56 to that shown in dotted lines in said figure during the actuation of the escapement mechanism to effect the first step in an escapement movement of the carriage and are swung back in a clockwise direction to the position shown in full lines in Figure 56 during the actuation of the escapement mechanism to effect the second step in the escapement movement.

The decimal space lever 486 is so constructed and arranged that, with the state control lever 468 in total or compute positions as shown respectively in Figs. 16 and 17, when the carriage moves into the units of dollars position in the register, the decimal space lever is depressed to a predetermined degree as shown in dotted lines in Figure 57, but not sufficiently to move the holding pawl of the escapement mechanism out of holding position. This movement of the decimal space lever swings the lever 917 into the dotted line position shown in said figure and the rod 922 is thereby lifted to allow the retaining lever 924 to be swung by the action of the spring 926 to engage the lateral projection 936 on the lever with the upper side of the arm 937 on the control slide.

At all times except when the carriage is in units of dollars position of a register or is executing a decimal space movement, the retaining lever 924 is held substantially in the position shown in Figure 54 so that it has no effect on the movement of the control slide 928.

When the carriage is out of the zone of a register, the control bar or slide 928 tends to move back and forth during each cycle of operations respectively initiated by the depression of the letter or numeral keys, between the position shown in Figure 54 and that shown in Figure 56 under the action of the stud 792 and the spring 932. The movement of the bar upwardly, however, is limited by the engagement of the end of an arm 934 on the slide with the end of a downwardly bent projection 935 on the locking bail 882, the said bail then being located in unlocking position as shown in Figure 54. The control slide and cooperating parts operate in the same manner as above described during each cycle of operations resulting from the depression of the letter or numeral keys when the carriage is located in the zone of a register, but out of the units of dollars position and the state control lever 468 is adjusted in "write" position as shown in Fig. 15 or in "total" position. The same operation of the control slide and coacting parts is produced during each cycle when the carriage is located in the units of dollars position of a register, with the state control lever 468 adjusted in "write" position and the letter or numeral keys are depressed.

When the carriage is located in the units of dollars position of a register, the lever 468 is adjusted in "total" position and a numeral key is depressed, the control slide and coacting parts operate in a manner similar to that described above during the following cycle except that in this case, because of the action of the decimal space lever 486, the lever 924 is released to the action of the spring 926 and the lateral projection 936 on said lever is yieldingly engaged with the arm 937 of the control slide during the movement of the slide.

When the carriage is located in the zone of a register, but out of the units of dollars position with the lever 468 adjusted in compute position and a numeral key is depressed, in the following cycle, the control slide is moved slightly upwardly upon the counter-clockwise movement of the arm 790 and the stud 792 produced in effecting the first step in the escapement movement of the carriage, until the movement of the slide is limited by the engagement of the arm 934 with the end of the projection 935 on the locking bail. As the actuator bail 332 (Fig. 3) is swung upwardly by the upward movement of the differential actuator rack bar 324 corresponding to the depressed key, the lever 888 (Figs. 60 and 61) is released by said bail and the locking bail 882 then is swung downwardly into locking position by its actuating spring 885. This allows the control slide to be moved by the spring 932 into the position shown in Figure 56 with the arm 934 located above the projection 935 on the locking bail.

When the stud 792 is released by the locking lever 794 upon the downward movement of the actuator bail 332 (Figs. 50 to 53 inclusive), the arm 790 and said stud are swung in a clockwise direction by the action of the spring 207. This moves the control slide 928 back into the position shown in Figure 54 thereby disengaging the arm 934 from above the projection 935 on the locking bail and the locking bail is moved back to unlocking position by the action of the actuator bail on the control lever 868.

With the carriage in units of dollars position in a register and the state control lever 468 in compute position when a numeral key is depressed, in the following cycle the control slide 928 is first moved upward slightly upon the counter-clockwise movement of the arm 790 and stud 792 produced in effecting the first step in the escapement movement of the carriage until its movement is limited by the projection 935 on the locking bail and when the bail is moving downwardly into locking position, the control slide is moved upwardly into the position shown in Figure 56 in substantially the same manner as in the last described condition.

The control slide is retained in the position shown in Figure 56 to hold the locking bail 882 in locking position during the second step in the escapement movement of the carriage and during the following decimal space movement of the carriage by the retaining lever 924 which, upon the upward movement of the control slide, is swung into the position shown in Figure 56 with the projection 936 below the shoulder on the arm 937 by the action of the spring 926. As the differential actuator bail 332 descends, during the downward movement of the actuator rack preceding the decimal space movement of the carriage, said bail engages the control lever 868 and swings the same downwardly about the point of engagement of the arm 893 with the locking bail, the slot 891 in the control lever permitting this movement of the lever. The arm 790 and stud 792 are swung back to their normal positions following the downward movement of the actuator bail.

The control slide 928 is thus retained in the position shown in Figure 56 by the retaining lever 924 during the second step in the escapement movement of the carriage preceding the decimal space movement and during said decimal space movement. As the carriage executes the latter part of its decimal space movement, the decimal space lever 486 is swung upwardly to its normal position. During the last part of this movement of the decimal space lever, the lever 917 which follows the movement of the decimal space lever under the action of the spring 919, through the connections described, swings the retaining lever 924 in a counter-clockwise direction (Figures 54, 55 and 56) to disengage the projection 936 on the lever from the shoulder on the arm 937 on the control slide 928. Upon its release by the retaining lever, the slide is moved downwardly to its normal position by the spring 933 which is stronger than the spring 932 and is placed under tension by the movement of the arm 790 and the stud 792 to their normal positions. The movement of the slide releases the locking bail 882 and the lever 888 is then swung upwardly to its normal position by the action of the spring 802 thereby swinging the bail 882 upwardly to unlocking position.

*Tabulating mechanism (see Figures 1, 2, 46, 47, and 48)*

The machine is provided with a decimal tabulating mechanism for the carriage controlled by a series of decimal tabulating key levers 938 and with a column tabulating mechanism controlled by a column tabulating key lever 939. These mechanisms preferably have substantially the same construction, arrangement and mode of operation of parts as the corresponding mechanisms shown and described in the patent to Foothorap, No. 1,280,697, dated October 8, 1918. As disclosed in said patent, mechanism connected with the respective decimal tabulator key levers 938 is provided for advancing selectively the tabulator stops 939$^a$ (see Figs. 2 and 46) for the different denominations upon the depression, respectively, of said levers and mechanism connected with the column tabulator key lever 939 is provided for advancing the units tabulator stop 939$^a$ upon depression of the lever.

The column tabulator lever 939 is pivoted at 946 on the frame of the carriage and is acted upon by a coil spring 947 which tends to swing the same in a clockwise direction (Figure 48). The column tabulator lever is connected by a link 948 with a sub-lever 949 pivoted upon a stud 950 secured in a bracket attached to and extending upward from the deck 180. The rear end of this sub-lever is arranged to engage the upper side of a collar 951 secured upon the vertically movable release rod 943.

Each of the decimal tabulating key levers 938 is pivoted at its rear end and is arranged to rest upon a bail 940 (see Fig. 48) pivoted upon bearing studs 941 secured in brackets depending from the cover plate, said bail being normally held in elevated position by a spring 942. The forward part of the bail 940 is pivotally connected with the upper end of the release rod 943 which extends through an opening in the deck 180 of the carriage and the lower end thereof is pivotally connected with the carriage release lever 944 (see Figs. 46 and 47). The release lever 944 is pivoted at 945 upon a hanger suspended from the deck of the carriage and its right hand end (Figures 46 and 47) is turned or bent laterally so as to engage beneath an arm on the holding dog 277 of the escapement mechanism.

With these mechanisms, upon the depression of any one of the decimal tabulator levers 938 or upon the depression of the forward portion of the column tabulator lever 939, the rod 943 will be depressed to actuate the lever 944 to release the holding dog 277 from the wheel 276 of the escapement mechanism.

The present machine embodies means for locking the type bar actuating mechanism out of operation during the tabulation of the carriage. When the lever 944 is swung in a direction to release the holding dog, the lever 904 (see Figure 49) is actuated by the lever 944 to lift the control bar 901 and thereby swing the control lever 888 in a direction to allow the locking bail 882 to be swung downwardly into locking position. The connecting mechanism for actuating the lever 904 from the lever 944 comprises an intermediate lever 952 (see Figs. 46 and 47) pivoted on a stud 953 secured in a hanger depending from the deck 180 and resting on the laterally projecting portion of the lever 944. The intermediate lever 952 is provided with an arm 954 extending laterally and upwardly from the body of the lever and engaging beneath a laterally and downwardly projecting arm 955 (see Figs. 46, 47, and 49) formed on the lever 904 and located forwardly of its pivotal point. Through this connecting mechanism, the lever 904 will be actuated to lift the control bar 901 and to cause the movement of the locking bail into locking position upon the actuation of the lever 944 by the depression of any one of the decimal tabulator key levers 938 or by the depression of the column tabulator key lever 939 and the control bar 901 will be held in its upper position and the locking bail will remain in locking position as long as the tabulator key lever is depressed. When the tabulator key lever is released the lever 944 will be swung back into normal position by the spring 942 (Fig. 48) acting on the bail 940 and the lever 904 will be actuated by the spring 909 to depress the control bar 901 and allow the locking bail to be swung into unlocking position by the action of the spring 892 on the control lever 888.

The machine is provided with the usual subtraction key lever 956 (see Figs. 60 and 61) pivoted on the shaft 202. This lever is acted upon by a coil spring 957 which normally maintains the same in its upper position in engagement with the stop pad 208. The key lever is connected in a well known manner with the longitudinally movable shift rod or wire 958 (see Fig. 2), for shifting the gear 314 into subtraction position. The key lever is connected with the shift rod by mechanism comprising a rock-shaft 959 extending from the front to the rear of the carriage and a link 960 connecting the key lever with a laterally extending arm 960ª on the forward end of said rock-shaft. The shift rod 958 is connected at one end with an arm 960ᵇ (Figs. 2 and 60) on the rear end of said rock-shaft and at its other end is connected with a shift lever 961 pivoted at 862 on the frame of the carriage and connected at its upper end with the gear 314 to shift the same axially in opposite directions upon the movement of the shift lever. The arm 960ᵇ of rock-shaft 959 is connected by a shift rod 963 (Figure 2) with a shift mechanism within the left hand cross-footer 548 for shifting the gear 556 (Fig. 63) axially between addition and subtraction positions. The shift lever 961 is also connected by a shift rod 963ª with a shift mechanism in the right hand crossfooter 546 for shifting the gear 556 between addition and subtraction positions. It is not considered necessary to illustrate or describe the shift mechanism for either of the crossfooters.

When the key lever 956 is in elevated position, the driving mechanisms respectively for the master wheel 304 and for the master wheels 550 of the crossfooters are in addition positions. When the subtraction key lever is depressed, the driving mechanisms for the respective master wheels are shifted to subtract positions.

In order to prevent misoperation, it is desirable that the type bar actuating mechanism corresponding to the numeral type bars should be locked out of operation during the shifting of the subtract key from one position to another and the present machine is provided with mechanism for securing this result. The machine is provided with a locking lever 964 (Figs. 60 and 61) pivoted at 965 upon a bracket 966 secured to and extending upwardly from the lateral extension of one of the side plates of the casing at the forward portion of the carriage. Said lever is provided with a rearwardly extending projection 967 arranged to be engaged by a pin 968, secured in the key lever 956, when the locking lever 964 is in locking position as shown in Figure 60. The locking lever 964 is acted upon by a coil spring 969 which tends to maintain the same in locking position and the movement of the lever under the action of the coil spring is limited by the engagement of an arm 970 on the lever with a laterally extending stop 971 formed on the bracket 966. The lever is provided with a finger piece 972 extending upwardly from the body of the lever which may be engaged by one finger of the operator while an adjacent finger actuates the key lever 956.

Figure 60 shows the parts in the positions which they assume when the subtraction key is in its upper position and the locking lever 964 is in locking position, the projection 967 on the lever being located below the pin 968 on the key lever so as to prevent the depression of the key lever into subtract position. When the operator desires to move the key lever to subtract position, he first swings finger piece 972 on the locking lever 964 rearwardly thereby swinging the locking lever into the position shown in Figure 61 to disengage the projection 967 from below the pin 968 and then depresses the key lever. Upon the release of the locking lever with the key lever held depressed, the locking lever will be swung back into locking position by the spring 969 thereby locating the projection 967 above the pin 968 on the key lever. The locking lever is operated in a similar manner when it is desired to release the key lever and allow the same to be shifted back into add position by the action of the spring 957.

In order to lock the actuating mechanism for the type bars out of operation during the shift of the subtraction key lever, the locking lever 964 is extended downwardly and is connected at its lower end with the longitudinally movable control bar or slide 911 (see Figs. 49, 60 and 61) mounted to slide between spaced pins 974 secured to and projecting upwardly from the deck 180. As stated in the previous description, the pin 910 secured in the arm 903, rests on the upper edge of the bar or slide 911. The slide is provided adjacent its rear end with an inclined or cam face 975, arranged to engage the pin 910 to actuate and control the arm 903 and the control bar 901.

When the locking lever 964 is in its normal or locking position, the control slide 911 is located so that the pin lies at the lower end of the inclined or cam face 975 on the slide. As the locking lever is swung into unlocking position, the control slide 911 is moved forwardly and the cam face 975, acting on the pin 910, lifts the arm 903 and the control bar 901 as shown in Figure 61 thereby, through the mechanism previously described, actuating the control lever 888 to allow the locking bail 882 to be swung down into locking position. As the locking lever 964 is swung back into locking position, after the shift of the subtract lever 956, the slide 911 is moved rearwardly to its normal position and the pin 910, the arm 983 and the control bar 901 descend to the positions shown in Figure 60, thereby allowing the control lever 888 to swing the locking bail back upwardly into unlocking position.

The machine is preferably provided with mechanism for locking the manually adjustable state control lever 468 in compute position when the carriage is located in the zone of a register (see Figures 68, 69, and 70). As has been described above, when the carriage enters the zone of a register, the lever 442 (Fig. 2) is swung downwardly and the rear or right hand end of the lever 418 (Figures 11 and 12) is swung downwardly therewith. In the construction shown in Figures 68, 69 and 70, the lever 418 is provided with an extension 976 having a rounded upper edge arranged to engage a cam face 977 formed on a downwardly turned projection 978 on a locking slide bar 979. This slide bar is slidably secured to the under side of the deck 180 of the carriage by means of screws 980 engaging in slots 981 in the slide bar and is formed at its left hand end (Figures 69 and 70) with a recess 982 arranged to receive the lower end of an arm 983 on the lever 468, projecting downwardly through a slot 984 in the plate 226, this arm being located to engage in the recess 982 only when the lever 468 is in "compute" position.

The slide bar 979 is acted upon by a coil spring 985 connecting the projection 978 on the bar with the lever 418 which tends to maintain the slide bar in its right hand or unlocking position in which it is out of position to engage the arm 983 on the state control lever.

When the carriage is outside the zone of a register, the forward end of the lever 418 then being in depressed position, the slide bar 979 is held by the spring 985 in its unlocking position. As the carriage enters the zone of a register and the forward end of the lever 418 is elevated, the locking bar 979 is moved to the left (Figures 69 and 70) into locking position by the engagement of the rounded edge of the extension 976 on the lever 418 with the inclined cam face 977 on the projection 978 on the locking slide. If the state control lever 468 is in "compute" position when the carriage enters the register zone, the arm 983 on said lever is then located in a position opposite the recess 982 in the locking slide and said arm is engaged in the recess by the locking movement of the slide to lock the lever 468 in position. If the state control lever 468 is in "write" or "total" position when the carriage enters the register zone, the arm 983 on the lever is not then located opposite the recess 982 in the slide and the lever 468 is not locked in position by the movement of the slide.

The machine is preferably provided with mechanism for locking the numeral keys from depression during a cycle of operation of the differential actuator mechanism. Without this lock, the power mechanism for actuating the type bars is locked out of operation during an actuator cycle, but the numeral keys might be depressed. If a numeral key is depressed during an actuator cycle, the operator might think a figure had been entered in the register. The locking of the keys at this time constitutes a signal to the operator that no operation has been produced by pressure exerted upon a key.

The mechanism for locking the numeral keys during an actuator cycle (see Figs. 43, 44 and 45) comprises a longitudinally movable slide 986 slidably secured to the upper side of the guide plate 264 by means of screws 987 engaging in slots 988 in the slide. The slide is provided with forwardly extending locking arms 989 formed with laterally extending locking projections 990 arranged to be engaged in front of the upwardly extending arms on the numeral key levers 246 to prevent actuation of said levers by the depression of the corresponding keys. The slide 986 is acted upon by a coil spring 991 which tends constantly to move the same longitudinally into locking position as shown in Figure 44. The slide is maintained out of locking position when the differential actuator racks are out of operation and the actuator bail 332 is in lowered position by means of a forwardly extending arm 992 formed on a plate 993 secured to the under side of the actuator bail 332 and arranged to engage the inclined upper surface of an arm 994 formed at and extending obliquely downwardly from the rear end of a bar 995 secured at its forward end to the slide 986. With this construction, the slide 986 is maintained in unlocking position as shown in Figure 43 when the differential actuator mechanism is out of operation. When one of the differential actuator racks is thrown into operation and the actuator bail 334 is swung upwardly, the arm 992 releases the bar 995 and the slide 986 is moved laterally to the left (Figures 43 and 44) into position to lock the numeral keys as shown in Figure 44 by the spring 991. When the actuator bail 332 is swung downwardly during the latter part of the movement of the actuator rack, the arm 992 on the bail engages the inclined arm 994 on the bar 995 and actuates the bar to move the slide 986 back to the right out of locking position as shown in Figure 43.

As above indicated, the position of the carriage when the master wheel 304 is in mesh with or in position to actuate any one of the number wheels 300 of a register is referred to in the specification and claims as the position of the carriage when in the zone of a register.

It is to be understood that the invention is not limited to the form thereof illustrated and described in this application or to the particular construction and arrangement of parts in which it is shown as embodied, but that the invention may be embodied in other forms and may include other constructions within the scope of the claims.

Having explained the nature and object of the invention and having illustrated and described a construction embodying the invention in its preferred form, what is claimed is:

1. In a machine of the class described having power means, a series of selectively operable control devices, a corresponding series of actuators, a register, and operating mechanism for the register all constructed and arranged to enter numbers digit by digit in the register; means controlled by the said devices for selectively connecting the actuators with the power means to move the actuators in one direction, mechanism for disconnecting the actuators from said power means, means for moving the actuators in the opposite direction when disconnected from said power means and fixed cams respectively for moving the actuators transversely with relation to the latter movements thereof into engagement with the register operating mechanism at different points in the latter movements of the actuators to cause differential operation of the register by the several actuators.

2. In a machine of the class described having a series of actuators, a register, and operating mechanism for the register all constructed and arranged to enter numbers digit by digit in the register; means for selectively moving the actuators in one direction while disconnected from said operating mechanism and for then moving the actuators in the opposite direction and mechanism comprising fixed cams for moving the actuators in directions transverse to the latter movements thereof to engage the actuators with the register operating mechanism, during their return movements, when the actuators are in different positions, to cause the actuators to operate differentially the register.

3. In a machine of the class described having a rotatable toothed driving member, a series of control devices, a register, and operating mechanism for the register constructed to enter numbers digit by digit in the register and comprising a rotatable toothed driven member; a series of longitudinally movable actuator rack bars having teeth respectively for engagement with the teeth of the driving and driven members, means controlled by said devices for selectively moving the rack bars laterally in one direction to engage the same with the driving member to move said bars longitudinally in one direction, mechanism for moving the rack bars laterally in the opposite direction out of engagement with the driving member, means for then moving the rack bars longitudinally in the opposite direction and mechanism for shifting the rack bars into engagement with the driven member at different points in the latter movements thereof to cause differential operation of the register.

4. In a machine of the class described having power means, a series of keys, a corresponding series of actuators, a register, and operating mechanism for the register all constructed and arranged to enter numbers digit by digit in the register; means controlled by the keys and ineffective when the register operating mechanism is out of the zone of a register for selectively connecting the actuators with the power means to move the actuators in one direction, mechanism for rendering the latter means effective by the movement of the register operating mechanism into the zone of a register, devices for disconnecting the actuators from the power means to discontinue said first movement and to release the same from control of the power means, spring actuated mechanism for imparting return movements to the actuators while released from control of said power means and means for connecting the actuators with the register operating mechanism at different points in the return movements of the actuators to cause differential operation of the register during the return movements of the several actuators.

5. In a machine of the class described having power means, a series of selectively operable control devices, a corresponding series of actuators normally disconnected from the power means, a register, and operating mechanism for the register constructed to enter numbers digit by digit in the register; means for supporting the register and said operating means for relative movement to carry the operating means into and out of the zone of a register and from denomination to denomination of the register, a series of levers for selectively connecting said actuators with the power means located in ineffective positions when the register operating mechanism is out of the zone of the register, means for moving said levers into effective positions upon the movement of the register operating mechanism into the zone of the register, means controlled by said control devices for selectively operating said levers to connect the actuators with the power means to move the actuators in one direction, devices respectively for disconnecting the actuators from the power means to discontinue said first movement of the actuators and to release the same from control of the power means, mechanism for connecting the actuators with the register operating mechanism when the actuators are in different positions and spring means for moving the actuators in the opposite direction while released from control of the power means to actuate differentially the register.

6. In a machine of the class described having power means, a series of devices arranged for selective actuation, a corresponding series of actuators normally disconnected from the power means, a register, and operating mechanism for the register constructed to enter numbers digit by digit in the register, means for supporting the register and said operating means for relative movement to carry the operating means into and out of the zone of a register and from denomination to denomination of the register; a series of longitudinally and laterally movable levers for selectively connecting the actuators with the power means located in ineffective position when the register operating mechanism is out of the zone of the register, means for moving said levers longitudinally into operative positions upon the movement of the register operating mechanism into the zone of the register, means controlled by said devices for selectively operating the levers to connect the actuators with the power means to move the actuators in one direction, devices respectively for disconnecting the actuators from the power means, mechanism for connecting the same with the register operating mechanism when the actuators are in different positions and means for moving the actuators in the opposite direction to actuate differentially the register.

7. In a machine of the class described having power means, a register, operating mechanism for the register constructed to enter numbers digit by digit in the register and a series of selectively operable devices; a corresponding series of longitudinally movable pivoted actuator bars, means controlled by said devices for selectively swinging the actuator bars laterally in one direction into engagement with the power means to move the bars longitudinally in one direction, means for moving the bars longitudinally in the opposite direction when disengaged from said power means, devices respectively for swinging the bars laterally in the opposite direction out of engagement with the power means and mechanism for swinging said bars still farther in the latter direction into engagement with the register operating mechanism when the bars are in different longitudinal positions to cause differential operation of the register by the several actuator bars.

8. In a machine of the class described having power means, a register, operating mechanism for the register constructed to enter numbers digit by digit in the register and a series of devices arranged to be selectively operated; a corresponding series of longitudinally movable pivoted actuator bars, means controlled by said devices for selectively swinging the actuator bars laterally in one direction into engagement with the power means to cause the bars to be moved longitudinally in one direction by said power means, devices for swinging the bars laterally in the opposite direction out of engagement with the power means, means for moving the bars longitudinally in the opposite direction upon disengagement of the same from said power means and mechanism for connecting the bars with said operating mechanism during the latter movement thereof when the actuator bars are in different longitudinal positions to cause differential operation of the register by the several actuator bars.

9. In a machine of the class described having power means, a register, operating mechanism for the register constructed to enter numbers digit by digit in the register and a series of devices arranged to be selectively actuated; a corresponding series of longitudinally movable pivoted actuator bars, means controlled by said devices for selectively swinging the actuator bars in one direction into engagement with the power means to move the actuator bars longitudinally in one direction, devices for swinging the actuator bars in the opposite direction out of engagement with the power means, means for moving the actuator bars longitudinally in the opposite direction when disengaged from said power means and mechanism for controlling the lateral positions of the bars and for moving the same laterally into engagement with said operating mechanism respectively at predetermined points in the latter longitudinal movements of said bars to cause the same to operate differentially the register.

10. A machine of the class described having power means, a series of selectively operable devices, a corresponding series of longitudinally movable pivoted actuator bars, a register, operating mechanism for the register, means controlled by said devices for selectively swinging the actuator bars in one direction into engagement with the power means to move the actuator bars longitudinally first in one direction, devices for swinging the actuator bars in the opposite direction out of engagement with the power means, means for moving the actuator bars longitudinally in the opposite direction when disengaged from said power means and fixed cams for controlling the lateral positions of the bars during their return movement to cause the same to operate differentially the register.

11. A machine of the class described having power means, a series of selectively operable devices, a corresponding series of differential actuators, a register, operating mechanism for the register, means controlled by said devices for selectively connecting the actuators with the power means to move the actuators initially in one direction, a common bail operated by each of the actuators during the movement thereof in the latter direction and acting to move the actuators in the opposite direction when disengaged from the power means, devices for disconnecting the actuators from the power means and means for operatively connecting differentially the actuators with the register operating mechanism to cause the movement of the actuators in the latter direction to actuate differentially said mechanism.

12. In a machine of the class described having a laterally movable carriage, a register mechanism and differential operating mechanism for the register, one of which mechanisms is supported on the carriage for lateral movement with relation to the other, said differential mechanism comprising a series of differential actuators each having movements in opposite directions during each cycle, a series of devices arranged for selective actuation, means controlled by said devices for causing the differential operation of the register by said actuators selectively and power means for moving the actuators; an escapement mechanism for causing a step by step movement of the carriage upon the successive actuation of said devices, a bail arranged to be moved by and with each of said actuators during the movement thereof in the first direction, the bail following the return movement of the actuator and locking means for the escapement controlled by said bail to lock the escapement during movement of an actuator.

13. A computing machine having, in combination, a carriage movable transversely, a register mechanism and differential operating mechanism for the register, one of which mechanisms is supported on the carriage for movement therewith, said differential mechanism comprising a series of differential actuators each having movements in opposite directions during each cycle, a series of selectively operable devices, means controlled by said devices for selectively causing the actuators to actuate the register, an escapement mechanism for causing a step by step movement of the carriage upon the successive actuation of said devices, a common bail arranged to be moved by and with each of said actuators during the movement thereof in the first direction, the bail following the return movement of the actuator and locking means for the escapement controlled by said bail to lock the escapement during the first part of the movement of the bail with an actuator in the first direction and to unlock the escapement adjacent the end of the return movement of the bail.

14. An accounting machine having, in combination, a register, mechanism for operating said register for addition or subtraction including a reversing gearing, power means for operating said mechanism normally disconnected therefrom, a manually operable member, mechanism operated by said member for shifting said gearing, means for connecting said mechanism with the power means and mechanism for preventing said first mechanism from being connected with the power means when said manually operable member is in an intermediate position.

15. An accounting machine having, in combination, a register, mechanism for operating said register for addition or subtraction including a reversing gearing, power means for operating said mechanism, a manually operable device, mechanism operated by said device for shifting said gearing and means for locking said mechanism from being operated by said power means when said device is in an intermediate position, said locking means being manually adjustable from unlocking to locking position and from locking to unlocking position respectively while the condition of the gearing is maintained.

16. An accounting machine having, in combination, a register, differential operating means for the register, a power driven actuator for said means normally disconnected therefrom, mechanism for connecting the differential operating means with the actuator, a reversing gearing through which the register is driven, a manipulative device, mechanism operated by said device for controlling said gearing, said device being arranged when in one position to adjust the gearing to drive the register in one direction and when in another position to adjust the gearing to drive the register in the opposite direction, a locking structure for preventing the differential mechanism from being connected with the actuator constructed and arranged to be moved under manual control into locking and unlocking positions and means located in accordance with the position of the locking structure to prevent the manipulative device from being moved from one position to another when the locking structure is in unlocking position.

17. An accounting machine having, in combination, a register, differential mechanism, power means, mechanism for actuating said register from said differential mechanism including a reversing gearing, a manually adjustable device for controlling said gearing arranged when in one position to adjust the gearing to drive the register in one direction and when in another position to adjust the gearing to drive the register in the opposite direction, a locking structure for preventing the differential mechanism from being driven by said power means constructed and arranged to be adjusted under manual control into locking and unlocking positions and a shiftable interlock lever located in accordance with the position of the locking structure to prevent said manually adjustable device from being moved from one position to another when the locking mechanism is in unlocking position.

18. An accounting machine having, in combination, a register, power means, mechanism arranged to be operated by said power means for actuating differentially the register comprising gearing constructed to drive the register in opposite directions, a manually operable device for controlling said gearing arranged when in one position to adjust the gearing to drive the register in one direction and when in another position to adjust the gearing to drive the register in the opposite direction, a manually controlled locking structure for preventing the actuating mechanism from being operated by the power means and an interlock lever located in accordance with the position of the locking structure to prevent the manually operable device from being moved from one position to another when the locking structure is in unlocking position, said interlock lever being arranged to be shifted manually out of effective position.

19. In an accounting machine having a carriage movable in opposite directions across the machine, a register and differential operating mechanism for the register, the combination of power operated mechanism for imparting return movements to the carriage, and means for preventing the latter mechanism from operating to return the carriage when the carriage is in the zone of the register comprising a register engaging cam, a lever operated by said cam, a second lever arranged to be operated by the first lever, a longitudinally movable link connected with the second lever, a rock-shaft, an arm on said rock-shaft connected with the link and mechanism operated by the rock-shaft for preventing the carriage return mechanism from being thrown into operation when the carriage is in the zone of a register.

20. In an accounting machine having a carriage movable in advance and return directions, a register and differential operating mechanism for the register, the combination of power operated mechanism for returning the carriage, and means for preventing the latter mechanism from operating to return the carriage when the carriage is in the zone of the register comprising a register engaging cam, a lever operated by said cam, a second lever, an adjustable state control device, a movable interponent between said levers adjusted by said device through which the second lever is operated from the first lever when said device is set for computing, a longitudinally movable link connected with the second lever, a rockshaft, an arm on said rock-shaft connected with the link and means operated by the rock-shaft for preventing the carriage return mechanism from being thrown into operation when the carriage is in the zone of a register.

21. A typewriting machine having, in combination, power means, a series of longitudinally movable operator bars, key levers, devices respectively connected with the key levers for moving the respective operator bars transversely to connect the same with the power means and thereby drive said bars longitudinally in one direction, locking means to prevent the return movement of a key lever and devices operated by the return longitudinal movement of a corresponding operator bar to release the key lever from said locking means.

22. A typewriting machine having, in combination, power means, a series of actuators, a series of key levers, a corresponding series of actuator shifting members movably connected with the key levers for shifting the actuators into engagement with the power means, contact means engaged by said members respectively upon the initiation of the operation of the corresponding actuators to hold said levers in key depressed position and abutments on the actuators for engaging said members to release the same from said contact means upon the return of the actuators.

23. In a machine of the class described, a continuously driven toothed roller, a series of longitudinally and laterally movable actuators, a projection carried by each of said actuators for engaging the roller, a series of key levers, draft links connected with the respective key levers and each having an abutment arranged to engage an abutment carried by a corresponding actuator to move the actuator laterally into position to engage the projection carried thereby with the roller and thereby drive the respective actuators in one direction, a contact device arranged to engage the draft link to prevent the return of the key lever and means carried by the actuator to move the draft link to disengage the same from said contact device upon the reutrn movement of the actuator.

24. In a machine of the class described, a continuously rotating toothed driving roller, a register, a series of differential mechanisms for actuating the register to enter numbers digit by digit each comprising a toothed differential rack arranged to be engaged with said roller to drive the rack longitudinally in one direction, means for engaging said rack with the roller, mechanism for disengaging the rack from the roller at a point in its longitudinal movement required for its subsequent operation, means for returning the rack longitudinally in the opposite direction, a toothed wheel drivably connected with the register and means connected with the rack for actuating the wheel during the return movement of the rack.

25. In a machine of the class described, a continuously rotating toothed driving shaft, a register, a series of differential mechanisms for actuating the register to enter numbers digit by digit therein each comprising a toothed differential rack arranged to be engaged with said roller to drive the rack longitudinally in one direction, means for engaging said rack with the roller, mechanism for disengaging the rack from the roller at a point in its longitudinal movement required for its subsequent operation, means for returning the rack longitudinally in the opposite direction, a toothed wheel drivably connected with the register and teeth on the rack for engaging the wheel during the return movement of the rack to actuate the register.

26. In a machine of the class described, having power means, a series of selectively operable control devices, a corresponding series of actuators normally disengaged from the power means, a register and operating mechanism for the register all constructed and arranged for the entry of numbers digit by digit in the register; means for normally imparting a substantially uniform relative step by step movement to the register and the operating mechanism during each cycle of operations to move the operating mechanism into and out of the zone of a register and to change their denominational relation, power operated mechanisms normally disconnected from the power means, means controlled by said devices for connecting said mechanisms selectively with the power means, means operated by said mechanisms for selectively connecting the actuators with the power means to move the actuators first in one direction, devices for disconnecting the actuators from the power means to discontinue said first movement, means for then moving said actuators in the opposite direction, mechanism for connecting the actuators with the register operating mechanism at different points in the latter movements of the actuators to actuate differentially the register, mechanism for causing a decimal spacing relative movement of the register and the operating mechanism and means for locking said power operated mechanisms out of engagement with the power means during the relative decimal spacing movement of the register and the operating mechanism.

27. In a machine of the class described, having power means, a series of selectively operable control devices, a corresponding series of actuators normally disengaged from the power means, a register and operating mechanism for the register, all constructed and arranged for the entry of numbers digit by digit in the register; means for normally imparting a substantially uniform relative step by step movement to the register and the operating mechanism during each cycle to move the operating mechanism into and out of the zone of the register and to change their denominational relation, power operated type bar mechanisms normally disconnected from the power means, means controlled by said devices for connecting said type bar mechanisms selectively with the power means, means operated by said type bar mechanisms for connecting the actuators selectively with the power means to move the actuators first in one direction, devices for disconnecting the actuators from the power means to discontinue said first movement, means for then moving the actuators in the opposite direction, mechanism for connecting the actuators with the register operating mechanism at different points in the latter movement of the actuators to actuate differentially the register, mechanism for causing a decimal spacing movement to be imparted to the register and the operating mechanism and means for locking said type bar mechanisms out of engagement with the power means during the relative decimal spacing movement of the register and the operating mechanism.

28. In a machine of the class described, having power means, a series of selectively operable control devices, a corresponding series of actuators, a register and operating mechanism for the register, all constructed and arranged to enter numbers digit by digit in the register; power operated mechanisms normally disconnected from the power means and arranged to be selectively connected with the power means by said devices, means operated by said mechanisms for selectively connecting the actuators with the power means to move the actuators first in one direction, devices for disconnecting the actuators from said power means to discontinue said first movement, mechanism for moving the actuators in the opposite direction upon their disconnection from said power means, mechanism for connecting the actuators with the register operating mechanism at differential points in the latter movement of the actuators to actuate differentially the register, and means for locking said power operated mechanisms corresponding to other actuators out of connection with the power means during the operative cycle of one of said actuators.

29. In a machine of the class described, having power means, a series of selectively operable control devices, a corresponding series of actuators, a register and operating mechanism for the register, all constructed and arranged to enter numbers digit by digit in the register; power operated type bar mechanisms normally disconnected from the power means and arranged to be selectively connected with the power means by said devices, means operated by said type bar mechanisms for selectively connecting the actuators with the power means to move the actuators first in one direction, devices for disconnecting the actuators from said power means to discontinue said first movement, mechanism for moving the actuators in the opposite direction upon their disconnection from said power means, mechanism for connecting the actuators with the register operating mechanism at different points in the latter movement of the actuators to actuate differentially the register and means for locking said type bar mechanisms corresponding to other actuators out of connection with the power means during the operative cycle of one of said actuators.

30. An accounting machine comprising a carriage movable in advance and return directions, power means, a register, and operating mechanism for the register relatively movable in a direction of movement of the carriage to carry said operating mechanism into and out of the zone of the register and from denomination to denomination of the register, differential actuating mechanism for the register normally disconnected from the power means, a series of power-operated type bar mechanisms normally disconnected from the power means, a series of selectively operable devices for connecting said type bar mechanisms selectively with the power means, devices respectively actuated by the type bar mechanisms for connecting the differential actuating mechanism with the power means, mechanism for enabling the latter devices, adjustable means for rendering said last mechanism either operative or inoperative when said operating mechanism enters a register zone, and means controlled by said enabling mechanism for preventing return movement from being imparted to the carriage when said operating mechanism is in the zone of the register.

31. In a machine of the class described, having power means, a series of selectively operable control devices, a corresponding series of differential actuators, a register, and operating mechanism for the register, all constructed and arranged to enter numbers digit by digit in the register; means controlled by said devices for selectively connecting the actuators with the power means to move the actuators first in one direction, mechanism for disconnecting the actuators from said power means to discontinue said movement of the actuators in the first direction and to release the actuators from control of the power means, spring-actuated means for moving the actuators in the opposite direction upon their release from the control of the power means and mechanism for connecting the actuators with the register operating mechanism at differential points in the latter movements of the actuators to actuate differentially the register.

32. In a machine of the class described having power means, a series of selectively operable devices, a corresponding series of actuators, a register and operating mechanism for the register, all constructed and arranged to enter numbers, digit by digit, in the register; means controlled by said devices for selectively connecting the actuators with the power means to move the actuators first in one direction, mechanism for disconnecting the actuators from the power means to discontinue said first movement and to release the actuators from the control of the power means, spring means for moving the actuators in the opposite direction while released from control of the power means and means for drivably connecting the actuators with the register operating mechanism when the actuators are in different positions to actuate differentially the register.

33. In a machine of the class described having power means, a series of selectively operable devices, a corresponding series of actuators, a register and operating mechanism for the register, all constructed and arranged to enter numbers, digit by digit, in the register; means controlled by said devices for selectively connecting the actuators with the power means to move the actuators first in one direction, mechanism for disconnecting the actuators from the power means to discontinue said movement of the actuators in the first direction and to release the actuators from control of the power means when the actuators are in different positions, spring actuated means for moving the actuators in the reverse direction upon their release from the control of the power means and mechanism for connecting the actuators with register operating mechanism upon their disconnection from the power means to actuate differentially the register.

34. In a machine of the class described having power means, a series of type bar mechanisms, devices arranged for selective manual actuation to connect the type bar mechanisms selectively with the power means, a corresponding series of actuators, a register, and operating mechanism for the register, all constructed and arranged to enter numbers, digit by digit, in the register; means operated by the respective type bar mechanisms for selectively connecting the actuators with the power means each during the advance stroke of a type bar to move the actuators in one direction, means for disconnecting the actuators from the power means, means for moving the actuators in the opposite direction upon their disconnection from the power means and mechanism for connecting the actuators with the register operating mechanism when the actuators are in different positions to cause differential operations of the register.

35. In a machine of the class described having power means, a series of type bar mechanisms, a series of selectively operable control devices for connecting the type bar mechanisms selectively with the power means, a corresponding series of actuators, a register, and operating mechanism for the register, all constructed and arranged to enter numbers, digit by digit, in the register; means actuated by the respective type bar mechanisms during the advance strokes of said mechanisms to connect selectively the actuators with the power means to move the actuators first in one direction, mechanism for disconnecting the actuators from the power means to discontinue said first movement and to release the actuators from the control of the power means, spring actuated means for moving the actuators in the opposite direction upon their release from control of the power means, and mechanism for connecting the actuators with the register operating mechanism when the actuators are in different positions to actuate differentially the register.

36. In a machine of the class described, a frame, a carriage movable transversely on said frame, a register and mechanism for operating the register, one of which is mounted on the carriage for denominational selecting movement, power means, a series of independently movable selectively operated differential actuators, a series of selectively operable devices, means controlled by said devices for connecting said differential actuators selectively with the power means to move the actuators in one direction, mechanism for disconnecting the actuators from the power means, a common bail operated by each of said actuators during the movement of the actuators in the first direction and arranged to move the actuators in the reverse direction, mechanism for connecting the actuators with the register operating mechanism during the latter movement thereof to actuate the register, an escapement mechanism for producing step-by-step movements of the carriage upon the successive actuation of said devices, a reciprocating member, means controlled by said devices to reciprocate said member to operate the escapement, a locking device for said member, means for moving said locking device into locking position as the movement of a differential actuator is initiated and means controlled by said bail for moving the locking device back into unlocking position as the differential actuator completes its movement.

37. In a machine of the class described, a frame, a carriage movable transversely on said frame, a register, and mechanism for operating the register, one of which is mounted on the carriage for denominational selecting movement, power means, a series of selectively operable devices, a series of longitudinally movable differential actuator bars, means controlled by said devices for selectively connecting said bars with the power means to move said bars longitudinally in one direction, mechanism for disconnecting said bars from the power means, a common bail operated by each of said bars during the movements of the bars in the first direction and arranged to move the bars longitudinally in the opposite direction when disconnected from the power means, means for connecting said bars with the register operating mechanism during the latter movements of the bars to operate the register, an escapement mechanism for producing a step-by-step movement of the carriage upon the successive actuation of said devices, an oscillating lever, means controlled by said devices to oscillate said lever to operate the escapement, a locking device for said lever, means for moving said locking device into locking position as each differential actuator bar is thrown into operation and means operated by said bail for moving the locking device back into unlocking position as the differential actuator bar completes its movement.

38. An accounting machine having, in combination, a frame, a carriage movably mounted on the frame, means for moving the carriage in an advance direction, mechanism for imparting return movements to the carriage, a register, power means, differential mechanisms for actuating differentially the register to enter numbers digit by digit therein, said differential mechanisms being normally disengaged from the power means, power operated mechanisms for causing the engagement selectively of the differential mechanisms with the power means, a movable bail mounted on said frame, manipulative means mounted on the carriage to operate the bail to throw the mechanism for returning the carriage into operation, locking means for locking said power operated mechanisms out of engagement with the power means and means for shifting said locking means into locking position upon operating the bail to throw the carriage return mechanism into operation and for shifting the locking means out of locking position upon the movement of the bail to throw out the carriage return mechanism.

39. An accounting machine having, in combination, a carriage, a register, operating means for the register mounted on the carriage, means for supporting the register and carriage for relative movement to locate the operating means in and out of the register zone, differential actuating mechanisms for the register, selectively operable means for controlling said mechanisms to cause the same to enter numbers, denomination by denomination, in the register, mechanism for enabling said differential mechanisms when the carriage is in the register zone comprising a register engaging cam, a device adjustable to different positions to determine whether or not the differential mechanisms shall be enabled when the carriage is in the zone of a register, means for locking said device in position comprising a lever pivoted on the carriage, a connection between the lever and the register engaging cam for actuating the lever from said cam, a longitudinally movable locking slide for locking said device and a connection between the locking slide and said lever for moving the slide into locking position when the carriage enters the zone of a register.

40. An accounting machine having, in combination, a carriage, a register, operating means for the register mounted on the carriage, means for supporting the register and carriage for relative movement to locate the operating means in and out of the register zone, differential actuating mechanisms for the register, selectively operable means for controlling said mechanisms to cause the same to enter numbers, denomination by denomination, in the register, means for enabling said differential mechanisms when the carriage is in the zone of a register comprising a register engaging cam, a device adjustable to different positions to determine whether or not the differential mechanisms shall be enabled when the carriage is in the zone of a register, means for locking said device in position comprising a forwardly and rearwardly extending lever pivoted on the carriage to swing on a horizontal axis, a connection between the rear end of the lever and the register engaging cam for swinging the lever from the cam, a longitudinally movable locking slide, a cam on said slide arranged to be engaged by the lever to move the slide transversely of the lever and means on the slide for locking said device in position when the carriage enters the zone of a register.

41. An accounting machine having, in combination, power means, a register, operating mechanism for the register, a series of differential actuators, a series of manipulative devices, means controlled by said devices for selectively connecting the actuators with the power means to move the actuators in one direction, a common bail moved by each of said actuators during the said movement thereof, means for moving the bail to move the actuators respectively in the reverse direction, mechanism for connecting the actuators with the register operating mechanism during the latter movement of an actuator to actuate the register, means for locking the manipulative devices from actuation and mechanism controlled by said bail for moving the locking device into locking position when the operation of a differential actuator is initiated and for moving the locking device out of locking position when the movement of the actuator is completed.

42. An accounting machine having, in combination, power means, a register, a series of power-operated mechanisms extending across the machine, a series of manipulative devices for connecting said power-operated mechanisms selectively with the power means, a series of differential actuators for operating the register, means actuated by said power-operated mechanisms for connecting the differential actuators respectively with the power means, a common bail engaged by each of said differential actuators and moved in one direction thereby during the actuation of a differential actuator by the power means, a spring for moving the bail in the opposite direction to actuate the differential actuators in a corresponding direction and means for connecting the differential actuators with the register during the latter movement thereof when the actuators are in different positions to actuate differentially the register.

43. An accounting machine having, in combination, power means, a register, a series of power-operated mechanisms extending across the machine, a series of manipulative devices for connecting said power-operated mechanisms selectively with the power means, a series of differential mechanisms comprising differential actuators for operating the register, means actuated by said power-operated mechanisms for connecting the differential actuators respectively with the power means, a common bail engaged by each of said differential actuators and moved in one direction thereby during the actuation of a differential actuator by the power means, a spring for moving the bail in the opposite direction to actuate the differential actuators in a corresponding direction, means for connecting the differential actuators with the register during the latter movement thereof when the actuators are in different positions to actuate differentially the register, locking means for locking the power-operated mechanisms out of engagement with the power means and means controlled by said bail for causing said locking means to move into locking position as the movement of a differential mechanism is initiated and to move out of locking position when the movement of a differential mechanism is completed.

44. In a machine of the class described having power means, a series of selectively operable control devices, a corresponding series of differential actuators, a register, and operating mechanism for the register all constructed and arranged to enter numbers digit by digit in the register; means controlled by said devices for selectively connecting the actuators with the power means to move the actuators first in one direction, devices for disconnecting the actuators from the power means to discontinue said first movement, a bail operated by each of said actuators during the movement of the actuator in the first direction, a spring acting on the bail to move the same and thereby the actuators in the opposite direction, mechanism for connecting the actuators with the register operating mechanism at differential points in the latter movement of the actuators to actuate differentially the register, locking mechanism for locking said second means out of operation and means controlled by said bail for causing said locking means to move into said locking position as the movement of an actuator is initiated and to move out of locking position as the movement of an actuator is completed.

OSCAR J. SUNDSTRAND.

CERTIFICATE OF CORRECTION.

Patent No. 2,370,505. February 27, 1945.

OSCAR J. SUNDSTRAND.

It is hereby certified that error appears in the printed specification of the above numbered patent requiring correction as follows: Page 26, second column, line 66, claim 16, after the word "device" insert --and--; page 27, first column, line 24, claim 17, for "mechanism" read --structure--; and second column, line 48, claim 23, for "reutrn" read --return--; and that the said Letters Patent should be read with this correction therein that the same may conform to the record of the case in the Patent Office.

Signed and sealed this 5th day of June, A. D. 1945.

Leslie Frazer (Seal) Acting Commissioner of Patents.